US006731819B1

(12) United States Patent
Fukushima et al.

(10) Patent No.: US 6,731,819 B1
(45) Date of Patent: May 4, 2004

(54) OPTICAL INFORMATION PROCESSING APPARATUS CAPABLE OF VARIOUS TYPES OF FILTERING AND IMAGE PROCESSING

(75) Inventors: Ikutoshi Fukushima, Fuchu (JP); Takeshi Hashimoto, Hidaka (JP); Mitsuru Namiki, Hanno (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/574,507

(22) Filed: May 19, 2000

(30) Foreign Application Priority Data

May 21, 1999 (JP) .......................... 11-141491
Oct. 27, 1999 (JP) .......................... 11-305560
Jan. 14, 2000 (JP) .......................... 2000-006731

(51) Int. Cl.[7] ............................................. G06K 9/40
(52) U.S. Cl. ................................... 382/260; 382/280
(58) Field of Search ............................ 382/210, 211, 382/260, 274, 278, 280; 359/559, 561, 564; 348/49, 54; 396/209; 250/339.08; 33/547

(56) References Cited

U.S. PATENT DOCUMENTS

| 4,958,376 | A | * | 9/1990 | Leib ........................... 382/210 |
| 5,016,976 | A | * | 5/1991 | Horner et al. .............. 359/561 |
| 5,107,351 | A | * | 4/1992 | Leib et al. ..................... 359/11 |
| 5,119,443 | A | * | 6/1992 | Javidi et al. ................. 382/211 |
| 5,185,815 | A | * | 2/1993 | Brandstetter ................ 382/211 |
| 5,214,534 | A | * | 5/1993 | Kallman et al. ............ 359/561 |
| 5,361,222 | A | * | 11/1994 | Khoury et al. ................ 365/49 |
| 5,418,380 | A | * | 5/1995 | Simon et al. ................ 250/550 |

FOREIGN PATENT DOCUMENTS

JP          8-129149        5/1996  .......... G02B/27/46

* cited by examiner

Primary Examiner—Andrew W. Johns
Assistant Examiner—Shervin Nakhjavan
(74) Attorney, Agent, or Firm—Frishauf, Holtz, Goodman & Chick, P.C.

(57) ABSTRACT

An optical information processing apparatus includes an image display section for displaying information on an object to be processed as image information, an image information reading section for converting a light from a light source into collimate light and projecting the collimate light onto the image display section to read image information, a Fourier transform optical system for obtaining the Fourier transform of the image information read by the image information reading section, an image dividing section for dividing the image information subjected to Fourier transform at the Fourier transform optical system, a filtering section for filtering the phase or amplitude information in one piece of the image information divided by the image dividing section, an inverse Fourier transform optical system for obtaining the inverse Fourier transform of the image information filtered at the filtering section, a filtering image information acquiring section for taking in the image information subjected to inverse Fourier transform at the inverse Fourier transform optical system, and a Fourier transform information acquiring section for taking in the other piece of the image information divided by the image dividing section.

45 Claims, 32 Drawing Sheets

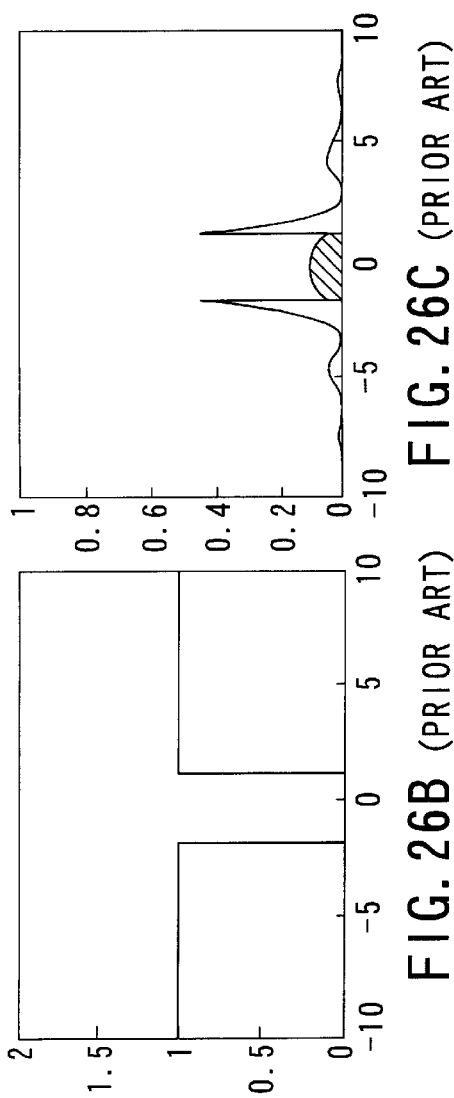
FIG. 26A (PRIOR ART)
FIG. 26B (PRIOR ART)
FIG. 26C (PRIOR ART)
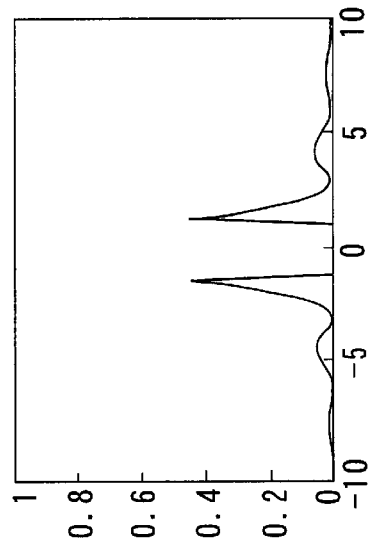
FIG. 26D (PRIOR ART)
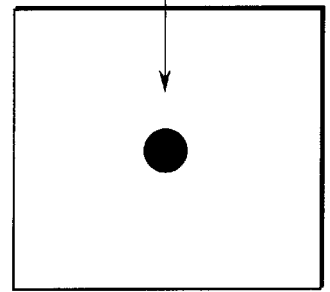
LIGHT IS PREVENTED FROM PASSING THROUGH (OR REFLECTING) NEAR A PLACE WHERE THE FREQUENCY COMPONENT IS ZERO
FIG. 26E (PRIOR ART)

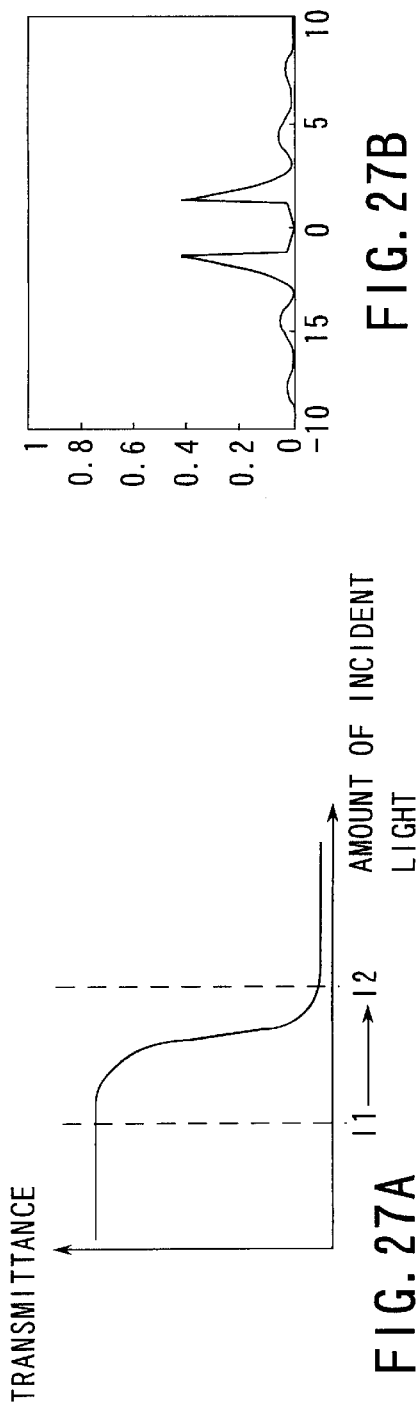
FIG. 27B
FIG. 27A
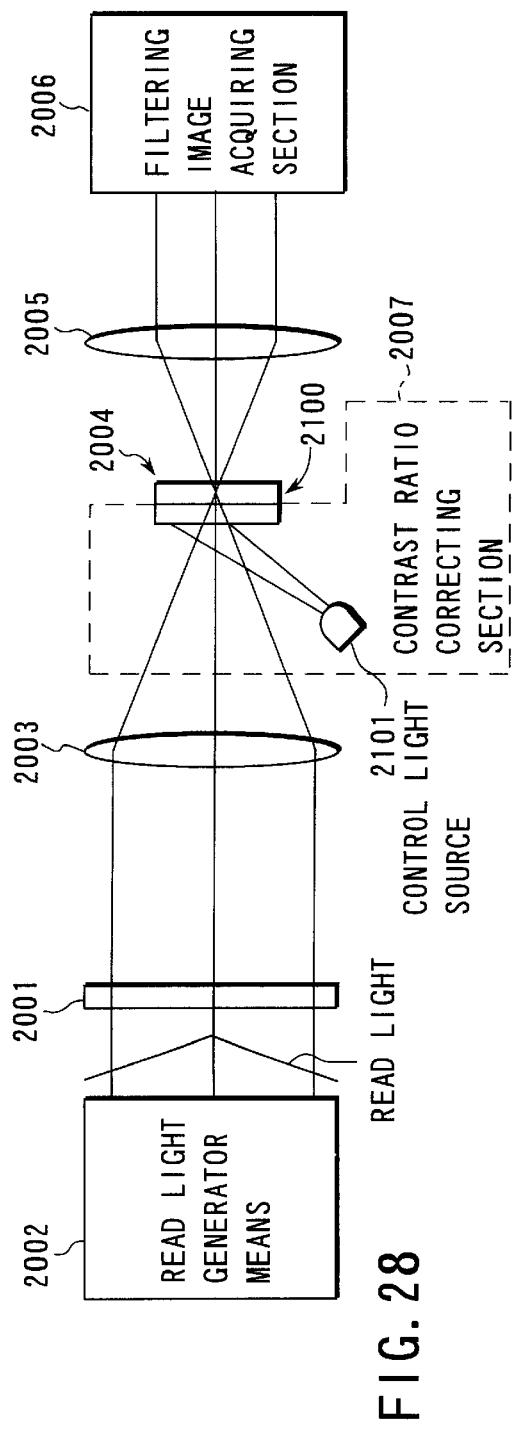
FIG. 28

OPTICAL INFORMATION PROCESSING APPARATUS CAPABLE OF VARIOUS TYPES OF FILTERING AND IMAGE PROCESSING

CROSS-REFERENCE TO RELATED APPLICATIONS

This invention is based on and claims the benefit of priority from the Japanese Patent Applications No. 11-141491, filed May 21, 1999; No. 11-305560, filed Oct. 27, 1999; and No. 2000-006731, filed Jan. 14, 2000, the entire contents of which are incorporated herein by reference.

BACKGROUND OF THE INVENTION

This invention relates to an optical information processing apparatus, and more particularly to a compact, general-purpose optical information processing apparatus capable of various types of filtering and image processing.

When various types of information, including images and signals, are recognized or classified, the degree of similarity of those to the comparison reference are generally calculated and then they are recognized or classified.

A combination of a matched filter (MSF) and a correlating unit or a joint transform correlating unit (JTC) has been used as means for calculating the degree of similarity.

While those methods have a sufficient performance in recognizing and classifying known, simple pieces of information cut off from the background, they have to process even pieces of information contributing less to recognition and classification, when directly processing images or signals with complex features. This is one factor which causes errors.

In addition, they respond sensitively even to a slight transformation, rotation, enlargement, or reduction, which often produces errors.

As for filters that allow transformation, noise, or the like, tremendous research effort has been directed toward filters using coordinate transformation, such as Fourier Mellin (FM) transformation, Synthetic Discriminate Function (SDF) filters, Circular Harmonic Expansion (CHE) filters, and other filters of these types.

As for the processing of complex objects, many investigations have been recently made of the technique for, instead of directly processing various types of information, such as images or signals, transforming them into features contributing much to recognition or classification, object by object in pre-processing, and recognizing them on a neural network or the like, using the transformed features.

In the pre-processing, correlation values obtained from the aforementioned MSF or JTC, edge images obtained through convolution by a Laplacian filter, feature extracted images obtained by wavelet transformation or Gabor transformation, Fourier spectrum images, or the like have been used.

In general, when two-dimensional images are processed, serial calculations on an ordinary computer are not practical, because it takes an extremely long time. It is therefor clear that an optical method capable of two-dimensional batch processing is superior in time.

Although having such superiority, the optical image processing method has hardly been put to practical use.

One reason is that there is no general-purpose optical information processing apparatus which enables the user or developer to execute various types of processing (optical information processing).

Although each of the various types of filters researched and developed until now has been excellent, they represent only one part of component technology in the field of practical industrial applications. They are not so convenient as electronic image processing boards commercially available at present and have often not been used in seeking the solution to the actual problems.

FIG. 37 shows the optical information processing apparatus disclosed in Jpn. Pat. Appln. KOKAI Publication No. 8-129149 form a different point of view.

With the optical information processing apparatus, the image to be processed is displayed on a first liquid-crystal display 2. Then, the image is read via a collimator lens 4 by the laser light emitted from a semiconductor laser 3. A first lens 5 performs Fourier transform optically.

Then, the image subjected to Fourier transform is produced on a second liquid-crystal display 6. Then, a filtering function form a memory 7 is displayed on the second liquid-crystal display 6, thereby filtering the image. After the filtered image is subjected to inverse Fourier transform using a second lens 8, a photodetector 9 can process the image.

The problem of the image processing apparatus the present invention tries to solve will be explained by reference to FIG. 24 schematically showing the optical information processing apparatus of FIG. 37.

The image displayed on an image display section 1101 is read by the read light generated by a read light generator section 1102.

A Fourier transform optical system 1103 obtains the Fourier transform of light that read the image and forms its Fourier transform image in the back focal plane of the Fourier transform optical system 1103.

The filtering of the Fourier transform image is done by displaying a filtering function on a filtering section 1104 located in the vicinity of the back focal plane of the Fourier transform optical system 1103.

An inverse Fourier transform optical system 1105 subjects the filtered light to inverse Fourier transform. The result is obtained by a filtering image acquiring section 1106.

In such an image processing apparatus, the spatial optical modulator, or the image display section 1101, has been only as large as a filtering liquid-crystal display with a small number of pixels and a small display area.

In recent years, however, as the liquid-crystal apparatuses and DMD (digital micromirror apparatuses) have included more and more pixels, this provides a wider selection of spatial optical modulators, which has satisfied the need for an increasing capacity of images to be processed.

At the same time, the entire computing apparatus has been required to be more compact.

To make the computing apparatus more compact, it is necessary to shorten the focal length f of the Fourier transform optical system 1103.

As shown in FIG. 24, however, when the size $W_i$ of the input image is made larger and the focal length f of the Fourier transform optical system is made shorter, the angle $2\theta_i$ of the light entering the filtering section 1104 becomes greater.

For simplicity sake, FIG. 24 shows only the DC component which has no frequency component in the frequency components included in the image displayed on the image display section 1101.

On the other hand, the light entering the filtering section 1104 further produces diffracted light through the pixel structure of the spatial optical modulator constituting the filtering section 1104.

The light passed through the filtering section 1104 spreads at a specific angle in the direction opposite to the direction of incidence. The diffracted rays each spread in a similar manner.

Consequently, the light of diffraction of 0th order (light of 0th order) from the object observed overlaps with the light of the +first-order or −first-order diffraction (the +first-order light or −first-order light), which makes it impossible to acquire the properly filtered image.

The another problem of the image processing apparatus the present invention tries to solve will be explained by reference to FIG. 25 schematically showing the optical information processing apparatus of FIG. 37.

To simplify explanation, FIG. 37 shows a cross section of the image processing apparatus taken along the optical axis and only the rays of light corresponding to the DC component whose spatial frequency component is zero in the spatial frequency components included in the image displayed on an image display section 2001.

In the image processing apparatus of FIG. 37, the image displayed on the image display section 2001 is read by the read light generated at a read light generator section 2002.

Then, the light reading the image is inputted to a Fourier transform optical system 2003, which forms the Fourier transform image of the input image on its back focal plane.

A filtering section 2004 is placed in the vicinity of the back focal plane on which the Fourier transform image is formed and filters the Fourier transform image.

The filtered light is subjected to inverse Fourier transform at an inverse Fourier transform optical system 2005. The result is obtained by a filtering image acquiring section 2006.

With such an image processing apparatus, the light concentrates in an area in the vicinity of the optical axis which corresponds to no spatial frequency component in the Fourier transform image formed at the filtering section 2004, whereas the light decreases in an area faster than the optical axis which corresponds to higher spatial frequency components.

Thus, to effect filtering accurately, a high-contrast spatial optical modulator is needed as the filtering section 2004.

In the spatial optical modulator used as the filtering section, for example, a twisted nematic liquid crystal of a frequently used type achieves only a contrast ratio of about 20:1, and a ferroelectric liquid crystal of the same type achieves only a contrast ratio of about 200:1.

Since an ordinary image often has the important information in areas other than the area where the spatial frequency component is zero, applying the contrast ratio of the spatial optical modulator, such as liquid crystal, directly to the image processing apparatus prevents the spatial frequency components near zero from being cut off sufficiently, which can cause light leaks. This might make the desired filtering impossible.

For example, consider a case where high-pass filtering is effected to prevent light in the region of almost no spatial frequency as shown in FIG. 26B, when one-dimensional distribution of the amount of light is as shown in FIG. 26A.

In this case, it would be ideal if the result of filtering would be as shown in FIG. 2D. If the contrast ratio at the filtering section that effects filtering were insufficient, light could not be cut off sufficiently, because of the amount of light is too large in the region of almost no spatial frequency. Thus, the result of filtering would be as shown in FIG. 26C, which might be different from what has been expected.

Furthermore, in an image processing apparatus as shown in FIG. 25, the spatial optical modulator, or the image display section 2001, has been only as large as a filtering liquid-crystal display with a small number of pixels and a small display area.

In recent years, however, as the liquid-crystal apparatuses have included more and more pixels, this provides a wider selection of spatial optical modulators, which has satisfied the need for an increasing capacity of images to be processed. At the same time, the entire computing apparatus has been required to be more compact.

To make the entire computing apparatus more compact, it is necessary to shorten the focal length f of the Fourier transform optical system 2003.

As shown in FIG. 25, however, when the size $W_i$ of the input image is made larger and the focal length f of the Fourier transform optical system 2003 is made shorter, the angle $2\theta_i$ of the light entering the filtering section 2004 becomes greater.

As described above, in the optical system with the large angle $2\theta_i$ of the bundle of incident rays, the components in the vicinity of the region where the spatial frequency component is zero are larger than those in the remaining areas. This requires the filtering section 2004 to have a higher contrast ratio. Therefore, use of the present special optical modulator makes it more difficult to achieve high-accuracy filtering.

BRIEF SUMMARY OF THE INVENTION

It is, accordingly, an object of the present invention to provide a compact, general-purpose optical information processing apparatus capable of various types of filtering and image processing.

Another object of the present invention is to overcome the aforementioned drawbacks and provide an optical image processing apparatus capable of obtaining correctly filtered images, making a compromise between a trend toward a larger input image and a trend toward a smaller apparatus.

Still another object of the present invention is to provide an optical image information processing apparatus capable of assuring more accurate filtering by correcting the contrast ratio which is insufficient in a spatial optical modulator with a relatively low contrast ratio usually used in filtering.

According to a first aspect of the present invention, there is provided an optical information processing apparatus comprising: an image display section for displaying information on an object to be processed as image information; an image information reading section for converting a light from a light source into collimate light and projecting the collimate light onto the image display section to read image information; a Fourier transform optical system for obtaining the Fourier transform of the image information read by the image information reading section; an image dividing section for dividing the image information subjected to Fourier transform at the Fourier transform optical system; a filtering section for filtering the phase or amplitude information in one piece of the image information divided by the image dividing section; an inverse Fourier transform optical system for obtaining the inverse Fourier transform of the image information filtered at the filtering section; a filtering image information acquiring section for taking in the image information subjected to inverse Fourier transform at the inverse Fourier transform optical system; and a Fourier transform information acquiring section for taking in the other piece of the image information divided by the image dividing section.

According to a second aspect of the present invention, there is provided an optical information processing apparatus comprising: an image display section for displaying information on an object to be processed as image information; an image information reading section for converting a light from a light source into collimate light and projecting the collimate light onto the image display section to read image information; a first Fourier transform optical system for obtaining the Fourier transform of the image information read by the image information reading section; an image dividing section for dividing the image information subjected to Fourier transform at the first Fourier transform optical system; a first filtering section for filtering the phase or amplitude information in one piece of the image information divided by the image dividing section; a first inverse Fourier transform section for obtaining the inverse Fourier transform of the image information filtered at the first filtering section; a second Fourier transform optical system for obtaining the Fourier transform of the image information subjected to inverse Fourier transform at the first inverse Fourier transform section; a second filtering section for filtering the phase or amplitude information in the image information subjected to Fourier transform at the second Fourier transform optical system; a second inverse Fourier transform section for obtaining the inverse Fourier transform of the image information filtered at the second filtering section; a filtering image information acquiring section for taking in the image information subjected to inverse Fourier transform at the second inverse Fourier transform section; and a Fourier transform information acquiring section for taking in the other piece of the image information divided by the image dividing section.

According to a third aspect of the present invention, there is provided an optical information processing apparatus comprising: an image display section for displaying information on an object to be processed as image information; an image information reading section for converting a light from a light source into collimate light and projecting the collimate light onto the image display section to read image information; a first Fourier transform optical system for obtaining the Fourier transform of the image information read by the image information reading section; a first filtering section for filtering the phase or amplitude information in the image information subjected to Fourier transform at the first Fourier transform optical system; a first inverse Fourier transform section for obtaining the inverse Fourier transform of the image information filtered at the first filtering section; a second Fourier transform optical system for obtaining the Fourier transform of the image information subjected to inverse Fourier transform at the first inverse Fourier transform section; a second filtering section for filtering the phase or amplitude information in the image information subjected to Fourier transform at the second Fourier transform optical system; a second inverse Fourier transform section for obtaining the inverse Fourier transform of the image information filtered at the second filtering section; and a filtering image information acquiring section for taking in the image information subjected to inverse Fourier transform at the second inverse Fourier transform section.

According to a fourth aspect of the present invention, there is provided an optical image processing apparatus comprising: an image display section for displaying an image to be processed; a read light generator section for generating light to read an image displayed on the image display section; a Fourier transform optical system for obtaining the Fourier transform of the image read from the image display section by the light from the read light generator section; a filtering section with a pixel structure for filtering the image subjected to Fourier transform at the Fourier transform optical system; an inverse Fourier transform optical system for obtaining the inverse Fourier transform of the light filtered by the filtering section; and a filtering image acquiring section for acquiring the image subjected to inverse Fourier transform at the inverse Fourier transform optical system, wherein the display size $W_i$ of the image display section, the wavelength $\lambda$ of the read light, the focal length f of the Fourier transform optical system, the minimum pixel-to-pixel spacing p of the filtering section, the display size $W_f$, and the incident angle $\theta_g$ to the filtering section are so selected that the diffracted light of 0th order generated at the filtering section never overlaps with another n-th order diffracted light.

Specifically, the filtering section has two axes crossing at right angles along which a large number of pixels are arranged in a matrix and, when $W_i > Wf$ holds along each of the axes, satisfies the following expression:

$$\arctan(W_i/2f) < \arcsin(\lambda/2p \cos \theta_g) \quad (1)$$

Furthermore, specifically, the filtering section has a display element for displaying a function corresponding to filtering to be done and a diffraction grating adjacent to the display element, with the pitch p of the diffraction grating satisfying $$n \times q = p \quad (2)$$

where n is a natural number, and the diffraction grating aligning with the pixel structure and satisfying the following expression in place of expression (1):

$$\arctan(W_i/2f) > \arcsin(\lambda/2q \cos \theta_g) \quad (3)$$

According to a fifth aspect of the present invention, there is provided an optical image processing apparatus comprising: an image display section for displaying an image to be processed; a read light generator section for generating light to read an image displayed on the image display section; a Fourier transform optical system for obtaining the Fourier transform of the image read by the read light generator section; a filtering section for filtering the image subjected to Fourier transform at the Fourier transform optical system; an inverse Fourier transform optical system for obtaining the inverse Fourier transform of the image filtered by the filtering section; a contrast ratio correcting section for correcting the contrast ratio of the filtering section; and a filtering image acquiring section for acquiring the image filtered at the filtering section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 26A shows a Fourier transform image of the input image;

FIG. 26B shows a filtering function;

FIG. 26C shows filtering when the contrast ratio is insufficient;

FIG. 26D shows ideal filtering;

FIG. 26E shows an example of a two-dimensional high-pass filter;

FIG. 27A shows the transmittance which makes a nonlinear change according to the amount of incident light acting on the vicinity of the Fourier transform surface by means of a filter used as a contrast ratio correcting section in the present invention;

FIG. 27B shows the result of the filtering;

FIG. 28 shows the configuration when a nonlinear filter is used as the contrast ratio correcting section in the optical image processing apparatus according to the tenth mode of the present invention;

DETAILED DESCRIPTION OF THE INVENTION

Figure 1:
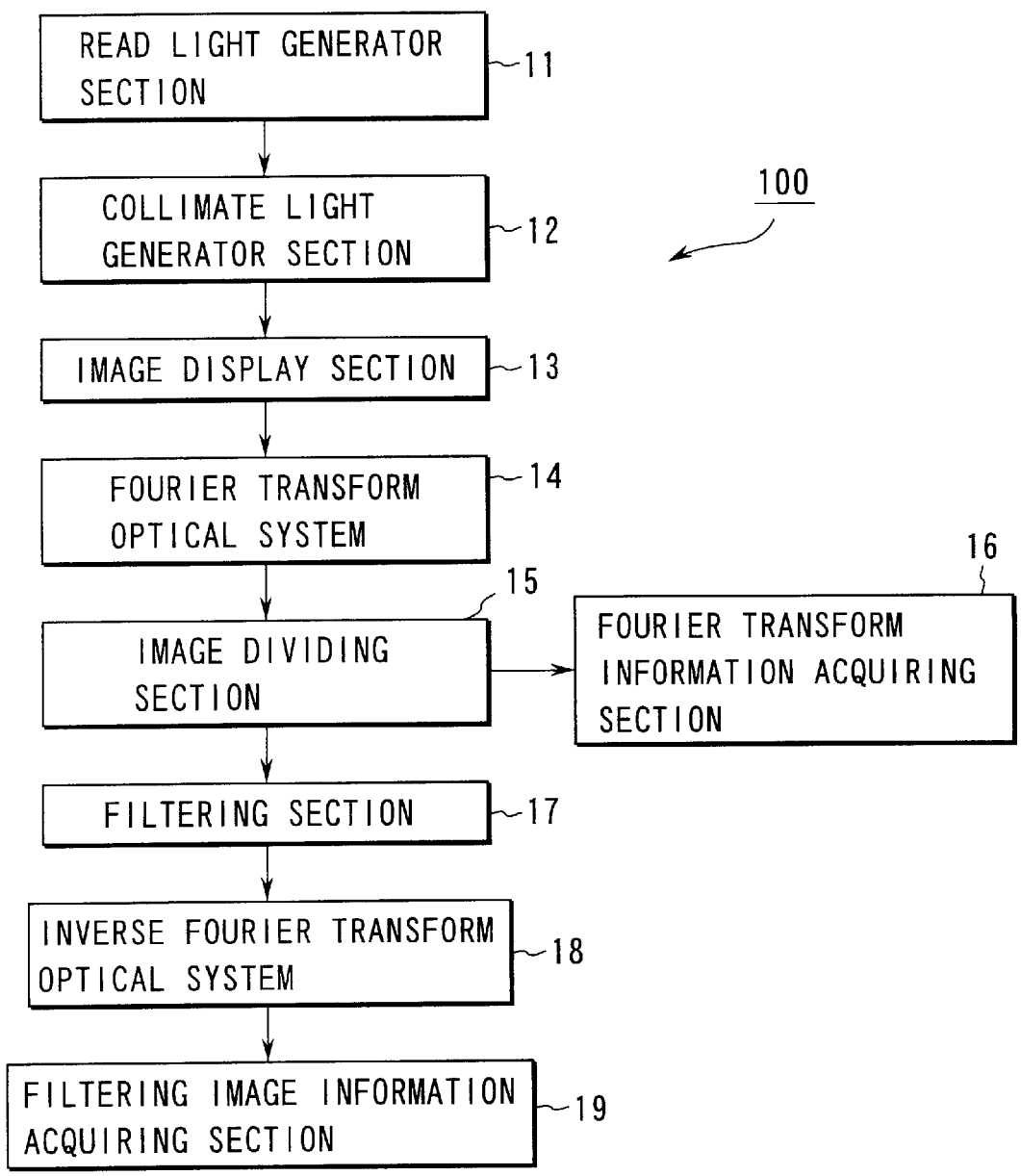
FIG. 1 schematically shows the configuration of an optical information processing apparatus 100 according to a first mode of the present invention.

Reference will now be made in detail to the presently preferred embodiments of the invention as illustrated in the accompanying drawings, in which like reference numerals designate like or corresponding parts.

Hereinafter, referring to the accompanying drawings, modes of the present invention will be explained.

First Mode (Configuration)

FIG. 1 schematically shows the configuration of a optical information processing apparatus according to a first mode of the present invention.

As shown in FIG. 1, the optical information processing apparatus according to the first mode of the invention includes an image display section 13 for displaying information on an object be processed as image information, a read light generator section 11 for generating a light to read the image information displayed on the image display section 13, a collimate light generator section 12 for converting the light generated by the read light generator section 11 into collimate light, a Fourier transform optical system 14 for obtaining the Fourier transform of the image information read from the image display section 13 using the collimate light from the collimate light generator section 12, an image dividing section 15 for dividing the image information transformed at the Fourier transform optical system 14 into two, a Fourier transform information acquiring section 16 for taking in one piece of the image information divided in two by the image dividing section 15, a filtering section 17 for filtering the phase and/or the amplitude information about the other piece of the image information divided by the image dividing section 15, an inverse Fourier transform optical system 18 for obtaining inverse Fourier transform of the image information filtered by the filtering section 17, and a filtering image information acquiring section 19 for picking up the filtering image information finally obtained by the inverse Fourier transform optical system 18.

(Effect)

With the above configuration, when an image to be recognized is displayed on the apparatus, it is possible to acquire not only the image information filtered by the filtering section 17 but also the Fourier transform image (Fourier spectrum) information obtained by the image dividing section 15 and Fourier transform information acquiring section 16.

Since the Fourier transform information indicates a distribution of spatial frequencies in a wide range the image has, combining the information with the filtered image for recognition makes the recognizing process more effective.

It is clear that the change of phase or intensity information filtering at the filtering section 17 enables various types of filtering. In addition to this, when the image to be recognized and a reference image are displayed side by side on the image display section 13 and the Fourier transform image obtained by the image dividing section 15 and Fourier transform information acquiring section 16 is fed back and displayed again on the image display section 13, the Fourier transform information acquiring section 16 obtains the result of JTC.

That is, such a process as was executable only on another conventional apparatus can be executed easily on the same apparatus of the present invention.

First Embodiment

Figure 2:
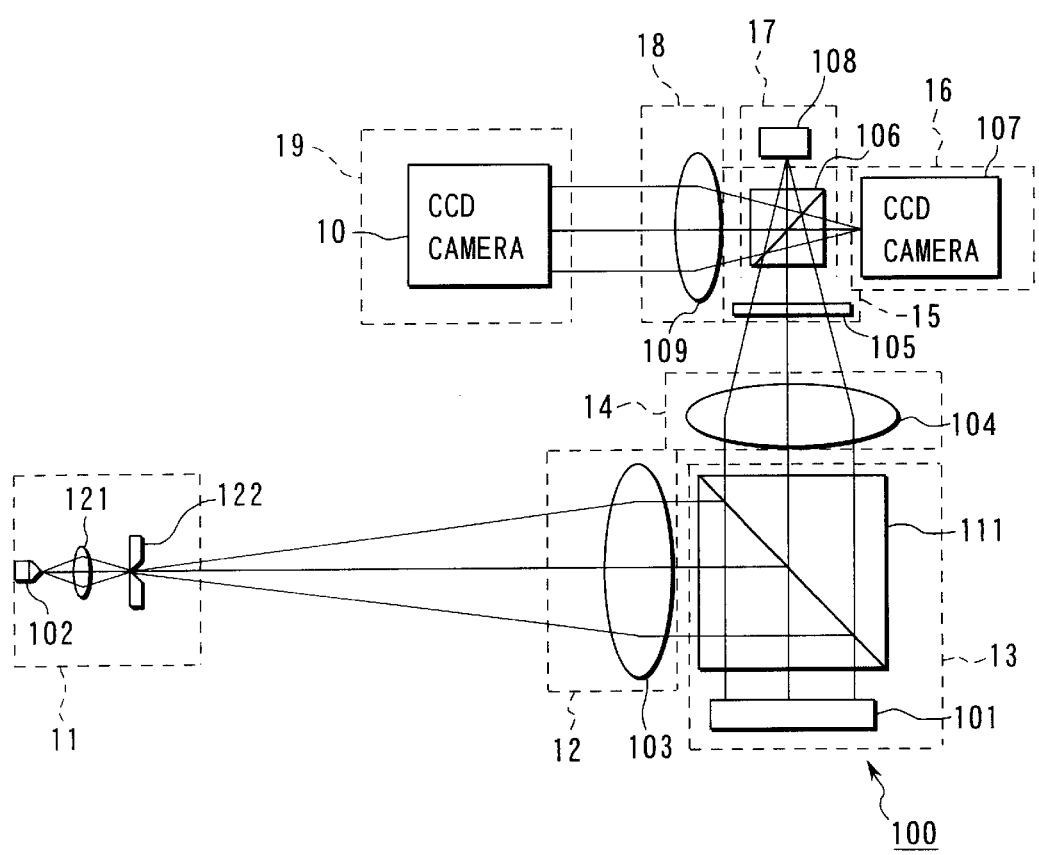
FIG. 2 shows the configuration of a first embodiment of the optical information processing apparatus 100 according to the first mode of the present invention.

FIG. 2 shows the configuration of a first embodiment of the optical information processing apparatus according to the first mode of the present invention.

In the first embodiment of the optical information processing apparatus 100 according to the first mode of the present invention, the light generated by the read light generator section 11 is converted by the collimate light generator section 12 into collimate light.

On the basis of the collimate light, the image information previously displayed on the image display section 13 is read from the image display section 13.

The Fourier transform optical system 14 subjects the read image information to Fourier transform.

The image information subjected to Fourier transform is divided by the image dividing section 15 in two.

One piece of the image information divided is taken in by the Fourier transform information acquiring section 16, whereas the phase or amplitude information (either one or both) about the other piece of the image information divided is filtered by the filtering section 17.

The inverse Fourier transform optical system 18 further subjects the filtered image information to inverse Fourier transform.

The filtered image information finally obtained from the inverse Fourier transform is picked up by the filtering image information acquiring information section 19.

In the first concrete example, the read light generator section 11 is composed of a laser diode (LD) 102, a condenser lens 121, and a pinhole 122.

The collimate light generator section 12 is composed of a collimate lens 103.

The image display section 13 is composed of a reflection-type spatial optical modulator (SLM) 101 and a polarized beam splitter 111.

The Fourier transform optical system 14 is composed of a Fourier transform lens 104.

The image dividing section 15 is composed of a $\lambda/4$ plate 105 and a polarized beam splitter 106.

The Fourier transform information acquiring section 16 is composed of a CCD camera 107.

The filtering section 17 is composed of a reflection-type spatial optical modulator (SLM) 108 and a polarized beam splitter 106.

The inverse Fourier transform optical system 18 is composed of an inverse Fourier transform lens 109.

The filtering image acquiring section 19 is composed of a CCD camera 110.

CONCRETE EXAMPLE 1

Gabor Filter

In concrete example 1, an amplitude modulation liquid crystal SLM is used as the SLM 108 of the filtering section 17. The SLM performs the following amplitude modulation:

$$\hat{G}(u, v) = \frac{\sigma^2}{2u_0 v_0} \exp\left[-\frac{\pi\sigma^2}{2}\left\{\frac{(u-u_0)^2}{u_0^2} + \frac{(v-v_0)^2}{v_0^2}\right\}\right] + \frac{\sigma^2}{2u_0 v_0} \exp\left[-\frac{\pi\sigma^2}{2}\left\{\frac{(u-u_0)^2}{u_0^2} + \frac{(v-v_0)^2}{v_0^2}\right\}\right]$$

where x and y are variables on a coordinate system in the real space, u and v are variables on a coordinate system in a Fourier plane (frequency plane), $u_0$ and $v_0$ are invariables indicating the frequencies of the oscillating components, and $\sigma$ is an invariable specifying a Gaussian envelope. Specifically, two apertures whose centers are at $(u_0, v_0)$ and $(-u_0, -v_0)$ have a Gaussian envelope.

When an image to be processed is inputted to the SLM 101 of the image display section 13, a filtered image characterized by the scale and direction determined by $u_0$ and $v_0$ appears on the CCD 110 of the filtering image information acquiring section 19.

CONCRETE EXAMPLE 2

Binary Phase Only Filter

In concrete example 2, a phase-modulation liquid crystal SLM is used as the SLM 108 of the filtering section 17. The SLM performs the following amplitude modulation $\phi$:

$$\phi \begin{cases} 0 \ldots F_r(u, v) \geq 0 \\ \pi \ldots F_r(u, v) < 0 \end{cases}$$

where $F_r(u, v)$ is the real part of the Fourier transform of a reference image $f_r(x, y)$.

When an image to be processed is inputted to the SLM 101 of the image display section 13, a correlation image appears on the CCD 1100 of the filtering image information acquiring section 19.

CONCRETE EXAMPLE 3

MSF Filter

In concrete example 3, a phase/amplitude modulation liquid crystal SLM is used as the SLM 108 of the filtering section 17. The SLM modulates the complex conjugate $F_r^*(u, v)$ of the Fourier transform of a reference image $f_r(x, y)$.

When an image to be processed is inputted to the SLM 101 of the image display section 13, a correlation image taking amplitude and phase into account appears on the CCD 110 of the filtering image information acquiring section 19.

Although a phase/amplitude modulation-type liquid crystal SLM has not been commercially available, it is expected to be put on the market in the near future, because an amplitude modulation SLM sandwiched between polarizing plates has only to be placed so close to an amplitude modulation SLM that the effect of diffraction is negligible and because research and development are now in progress.

CONCRETE EXAMPLE 4

JTC

In concrete example 4, when an image $f(x, y)$ to be processed and a reference image $f_r(x, y)$ are displayed in such a manner that they are separated by a distance of $2d(f(x-d, y)+f_r(x+d, y))$, the resulting Fourier transform image appears on the CCD 107 of the Fourier transform information acquiring section.

The Fourier transform image is displayed again on the SLM 101 of the image display section 13. The CCD 107 receives the image, which produces the image expressed by the following expression:

$$f(x-2d, y)*f_r*(x-2d, y)+f*(x+2d, y)*f_r(x+2d, y)+\text{constant}$$

This represents the cross correlation between the image $f(x, y)$ to be processed and the reference image $f_r(x, y)$.

Second Embodiment

Figure 3:
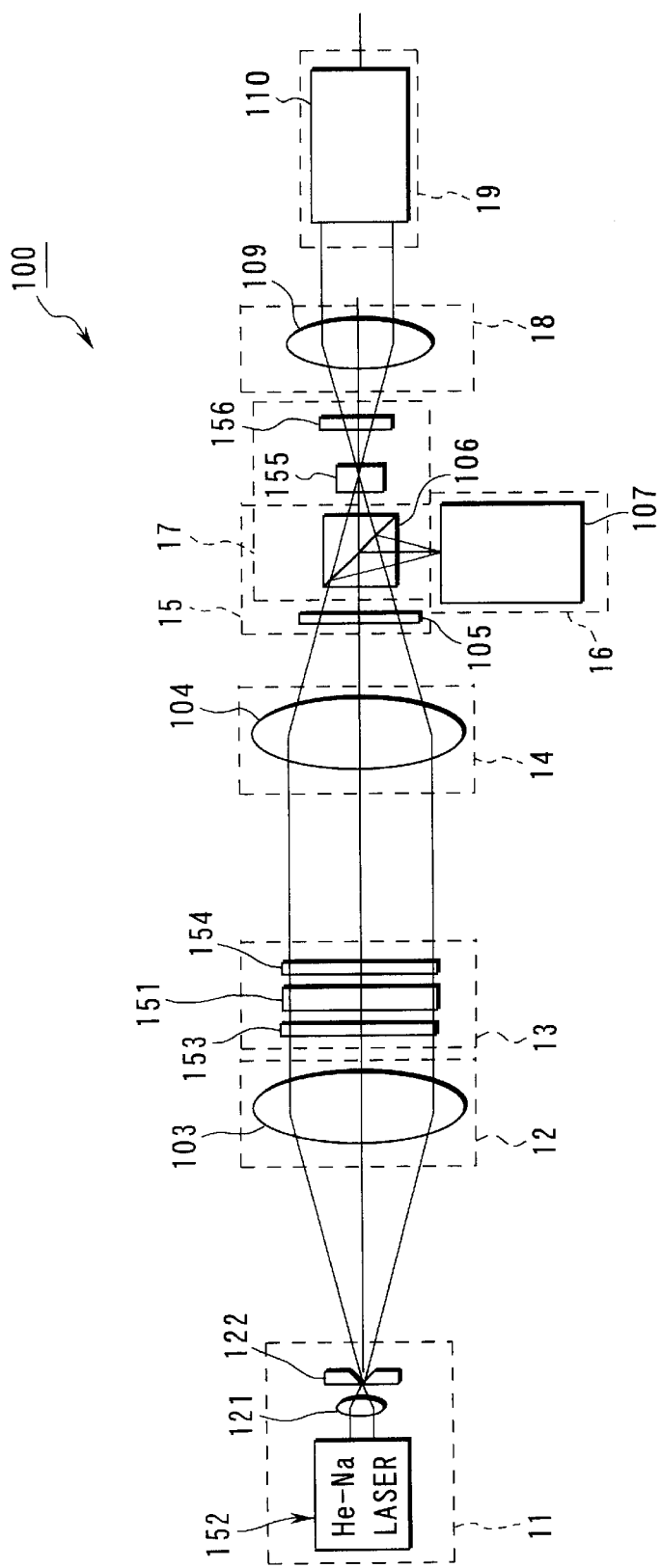
FIG. 3 shows the configuration of a second embodiment of the optical information processing apparatus 100 according to the first mode of the present invention.

FIG. 3 shows the configuration of a second embodiment of the optical information processing apparatus 100 according to the first mode of the present invention.

In the second embodiment of the optical information processing apparatus 100 according to the first mode of the invention, its effect is the same as that of the first embodiment of the optical information processing apparatus 100 according to the first mode except that the reflection-type spatial optical modulators (SLM) 101 used in the image display section 13 and filtering section 17 in the first embodiment are replaced with transmission-type ones and that the laser diode (LD) 102 in the read light generator section 11 is replaced with an He—Ne laser 152.

Accordingly, the second embodiment further differs from the first embodiment in the following points.

In the second embodiment, the read light generator section 11 is composed of the He—Na laser 152, a condenser lens 121, and a pinhole 122.

The image display section 13 is composed of a transmission-type spatial optical modulator (SLM) 151, a polarizer 153, and an analyzer 154.

Furthermore, the filtering section 17 is composed of a transmission-type spatial optical modulator (SLM) 155, a polarized beam splitter 106, and a polarizer 156.

The above-described concrete examples 1 to 4 are also applicable to the second embodiment.

Second Mode (Configuration)

Figure 4:
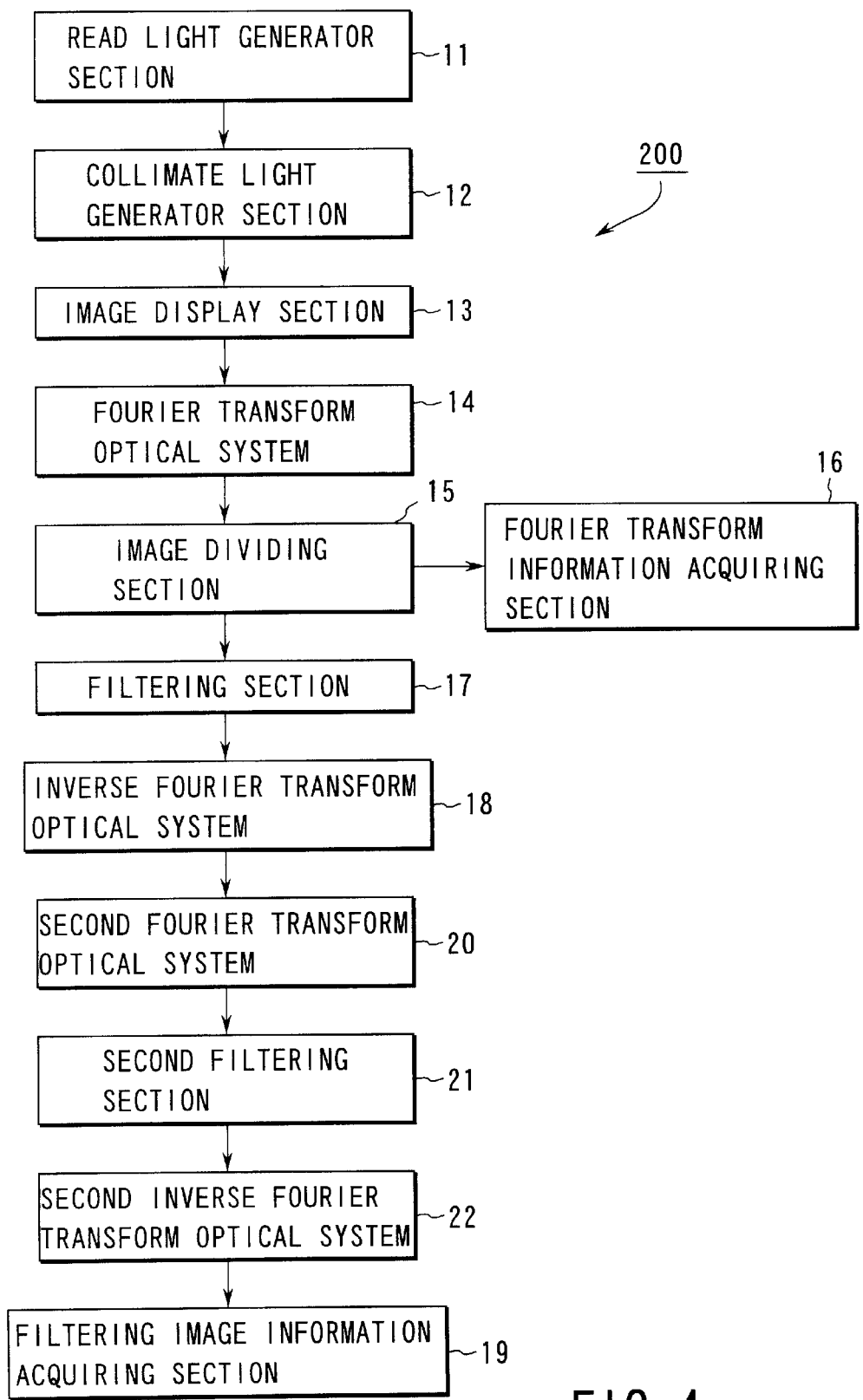
FIG. 4 schematically shows the configuration of an optical information processing apparatus 200 according to a second mode of the present invention.

FIG. 4 schematically shows the configuration of an optical information processing apparatus 200 according to a second mode of the present invention.

As shown in FIG. 4, the optical information processing apparatus according to the second mode of the present invention is such that a second Fourier transform optical system 20 for further obtaining the Fourier transform of the filtered image got by the optical information processing apparatus 100 according to the first mode, a second filtering section 21 for filtering the Fourier transform image obtained by the second Fourier transform optical system 20, and a second inverse Fourier transform optical system 22 for obtaining the inverse Fourier transform of the information filtered by the second filtering section 21 are inserted between the inverse Fourier transform optical system 18 and filtering image acquiring section 19 in the optical information processing apparatus 100 (FIG. 1) according to the first mode of the present invention.

(Effect)

With the above configuration, because the optical information processing apparatus 200 according to the second mode of the present invention not only produces the same effect as that of the optical information processing apparatus 100 of the first mode but also enables use of two optically equivalent filtering surfaces, filtering flexibility increases, which enables more effective filtering.

Since simple, low-priced spatial optical modulators (SLMs) available at present can modulate only either phase or amplitude, one is used to modulate phase and the other is used to modulate amplitude. This enables a complex-number filter to operate more accurately and directly.

Both of the spatial optical modulators may be used for phase modulation. Then, one is used to correct the aberration of the apparatus and the other is used as a phase filter, which enables more accurate filtering. Both of the spatial optical modulators may, of course, be used for amplitude modulation.

First Embodiment

Figure 5:
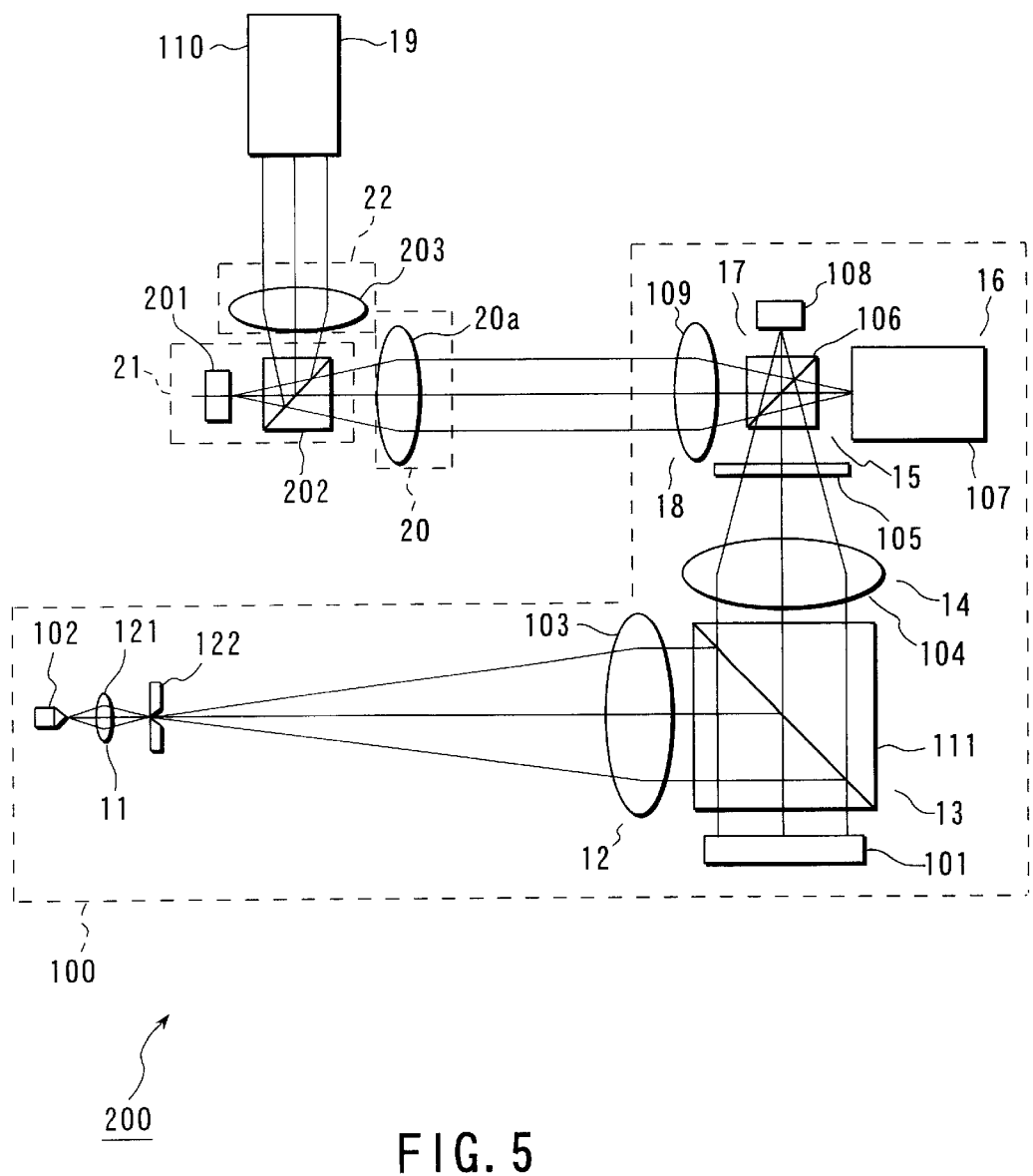
FIG. 5 shows the configuration of a first embodiment of the optical information processing apparatus 200 according to the second mode of the present invention.

FIG. 5 shows the configuration of a first embodiment of the optical information processing apparatus 200 according to the second mode of the present invention.

The first embodiment of the optical information processing apparatus 200 according to the second mode of the present invention is such that the second Fourier transform optical system 20, second filtering section 21, second inverse Fourier transform optical system 22, and filtering image acquiring section 19 are provided behind the inverse Fourier transform optical system 18 of the optical information processing apparatus 100 of the first mode. With this configuration, the second filtering section 21 further filters the image filtered by the optical information processing apparatus 100 of the first mode, thereby realizing more complex filtering.

In the first embodiment of the optical information processing apparatus 200 according to the second mode of the invention, the read light generator section 11 is composed of a laser diode (LD) 102, a condenser lens 121, and a pinhole 122.

The collimate light generator section 12 is composed of a collimate lens 103.

The image display section 13 is composed of a reflection-type spatial optical modulator (SLM) 101 and a polarized beam splitter 111.

The Fourier transform optical system 14 is composed of a Fourier transform lens 104.

The image dividing section 15 is composed of a λ/4 plate 105 and a polarized beam splitter 106.

The Fourier transform information acquiring section 16 is composed of a CCD camera 107.

The filtering section 17 is composed of a reflection-type spatial optical modulator (SLM) 108 and a polarized beam splitter 106.

The inverse Fourier transform optical system 18 is composed of an inverse Fourier transform lens 109.

The second Fourier transform optical system 20 is composed of a second Fourier transform lens 20a.

The second filtering section 21 is composed of a second reflection-type spatial optical modulator (SLM) 201 and a polarized beam splitter 202.

The second inverse Fourier transform optical system 22 is composed of a second inverse Fourier transform lens 203.

The filtering image acquiring section 19 is composed of a CCD camera 110.

CONCRETE EXAMPLE 5

SDF Filter, Morphological Filter

In concrete example 5, if a training image is $T_n(x, y)$, the SDF filter is expressed by the following expression:

$$\sum_{n=0}^{k} a_n t_n(x, y)$$

Its Fourier transform is divided into amplitude and phase components. An amplitude modulation liquid crystal SLM is used as the SLM 108 of the filtering section 17 and a phase modulation liquid crystal SLM is used as the SLM 201 of the second filtering section 21. The amplitude and phase components are displayed on the amplitude modulation liquid crystal SLM and phase modulation liquid crystal SLM, respectively.

Then, when an image to be processed is inputted to the SLM 101, an image obtained by subjecting the image to be processed to SDF filtering appears on the CCD 110 of the filtering image information acquiring section 19.

Similarly, if a structuring element (SE) is $t_{SE}(x, y)$, its Fourier transform is divided into amplitude and phase components, which are displayed on the respective SLMs. When an image to be processed is inputted to the SLM 101, an image obtained by subjecting the image to be processed to a Morphological filter appears on the CCD 110 of the filtering image information acquiring section.

CONCRETE EXAMPLE 6

Phase Only Filter+Aberration Correcting Filter

In concrete example 6, the SLM 108 of the filtering section 17 and the SLM 201 of the second filtering section 21 are both composed of phase modulation liquid crystal SLM.

When only the phase component of the complex conjugate $F_r^*(u, v)$ of the Fourier transform of the reference image $f_r(x, y)$ of the aforementioned MSF is displayed on the SLM 108 and the wave aberration of the optical system is displayed on the SLM 201, the aberration of the optical system is corrected. As a result, a correlation image related only to the phase of the reference image appears on the CCD 110 of the filtering image information acquiring section 19.

In addition, the SLM 108 of the filtering section 17 and the SLM 201 of the second filtering section 21 may be both composed of amplitude modulation liquid crystal SLM. Then, the phase components are encoded into amplitude signals, which are supplied to the SLM 108 and SLM 201. This produces a similar correlation image.

Second Embodiment

Figure 6:
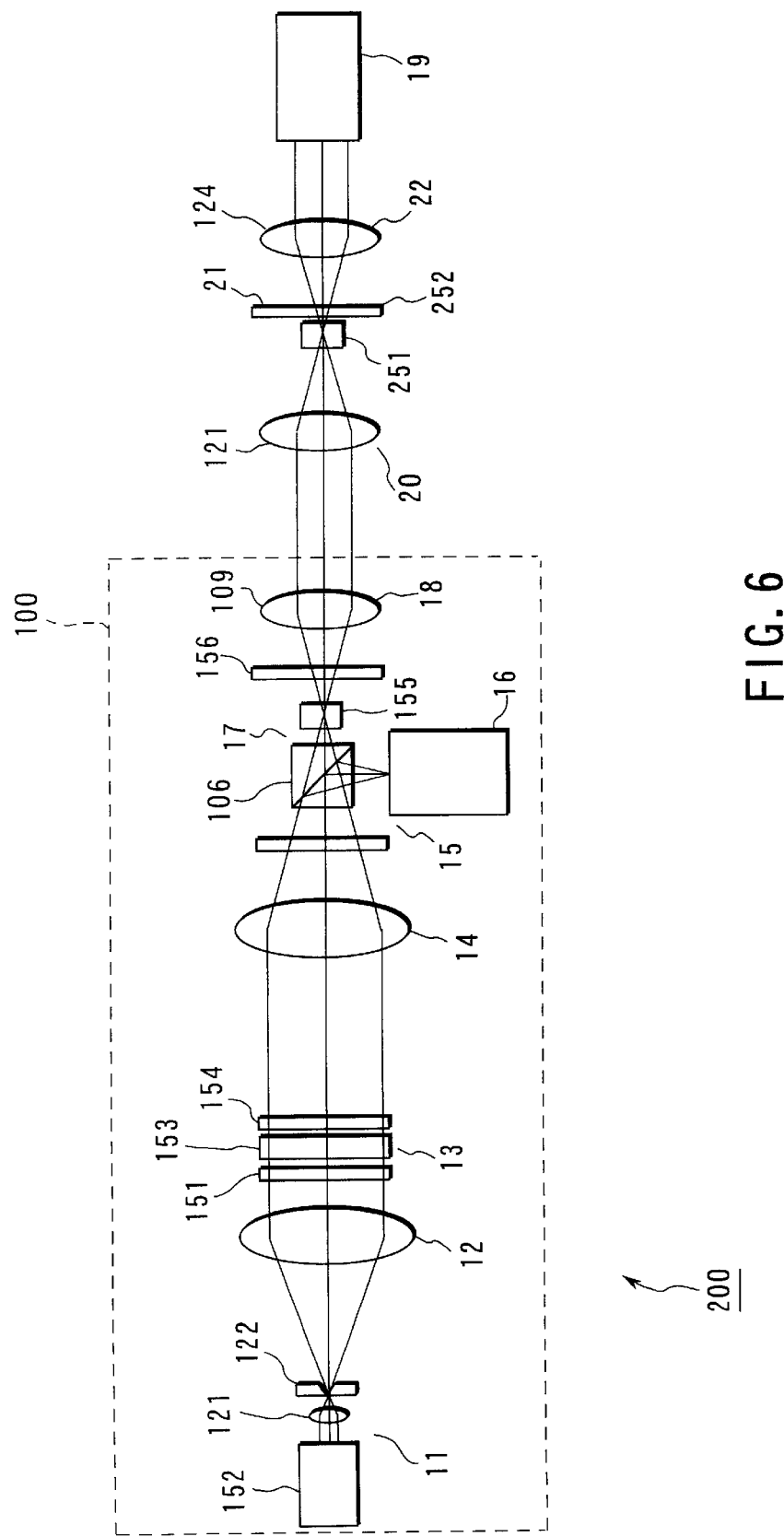
FIG. 6 shows the configuration of a second embodiment of the optical information processing apparatus 200 according to the second mode of the present invention.

FIG. 6 shows the configuration of a second embodiment of the optical information processing apparatus 200 according to the second mode of the present invention.

In the second embodiment of the optical information processing apparatus 200 according to the second mode of the invention, its effect is the same as that of the first embodiment of the optical information processing apparatus 200 according to the second mode except that the reflection-type spatial optical modulators (SLMs) used in the image display section 13, filtering section 17, and second filtering section 21 in the first embodiment are replaced with transmission-type ones and that the laser diode (LD) 102 in the read light generator section 11 is replaced with an He—Ne laser 152.

Accordingly, the second embodiment further differs from the first embodiment in the following points.

In the second embodiment, the read light generator section 11 is composed of the He—Na laser 152, a condenser lens 121, and a pinhole 122.

The image display section 13 is composed of a transmission-type spatial optical modulator (SLM) 153, a polarizer 151, and an analyzer 154.

The filtering section 17 is composed of a polarized beam splitter 106, a transmission-type spatial optical modulator (SLM) 155, and an analyzer 156.

In addition, the second filtering section 21 is composed of a transmission-type spatial optical modulator (SLM) 251 and an analyzer 252.

The above-described concrete examples 5 and 6 are also applicable to the second embodiment.

Third Mode (Configuration)

Figure 7:
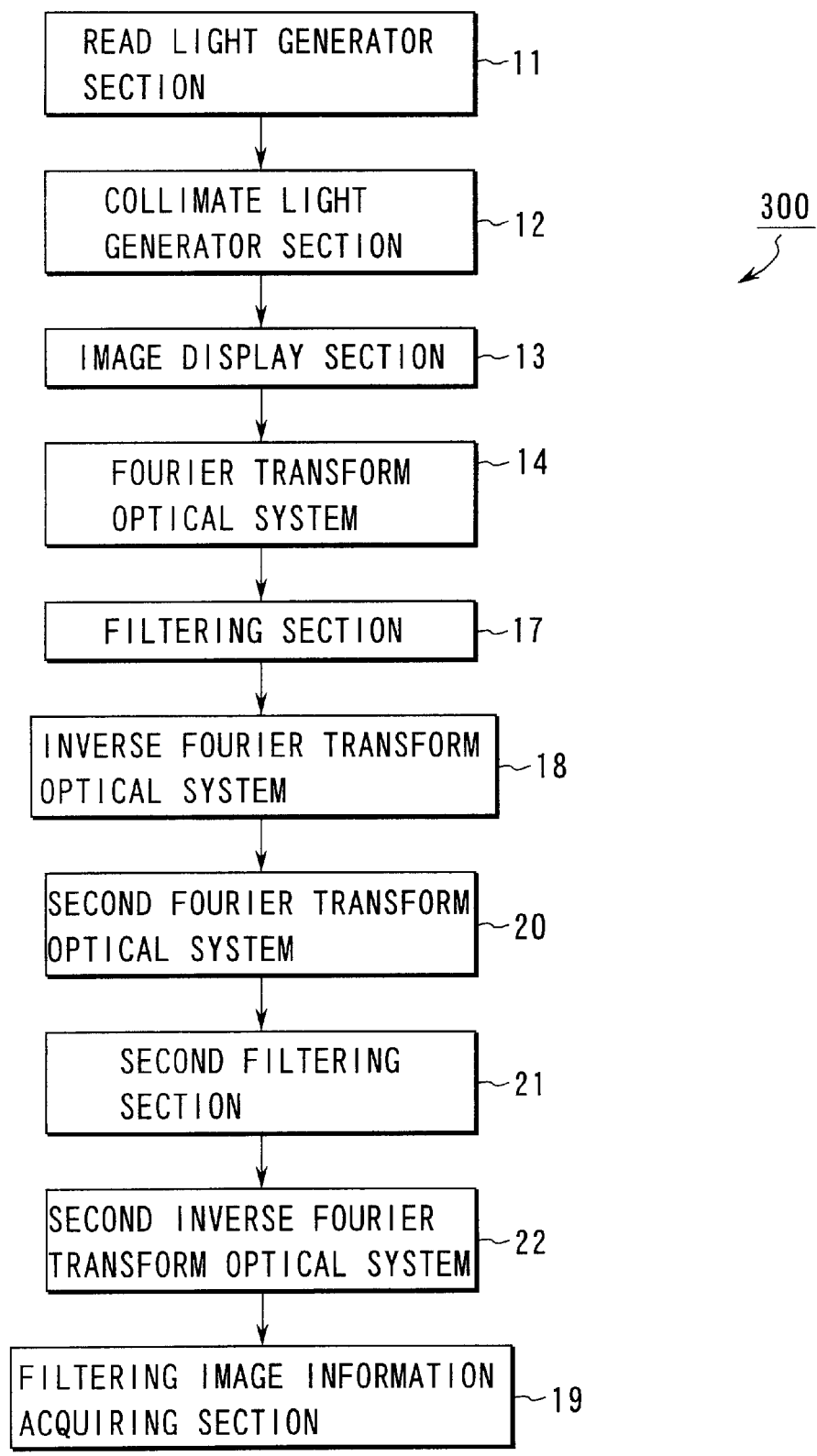
FIG. 7 schematically shows the configuration of an optical information processing apparatus 300 according to a third mode of the present invention.

FIG. 7 schematically shows the configuration of an optical information processing apparatus 300 according to a third mode of the present invention.

As shown in FIG. 7, the optical information processing apparatus 300 according to the third mode of the invention is such that the image dividing section 15 and Fourier transform information acquiring section 16 are eliminated from the optical information processing apparatus 200 (FIG. 4) according to the second mode of the invention.
(Effect)

The optical information processing apparatus 300 of the third mode is obtained by eliminating the image dividing section 15 and Fourier transform information acquiring section 16 from the configuration of the optical information processing apparatus 200 of the second mode. Eliminating the sections for acquiring the Fourier transform information makes the configuration simpler and enables the pursuit of only filtering flexibility.

Embodiment

Figure 8:
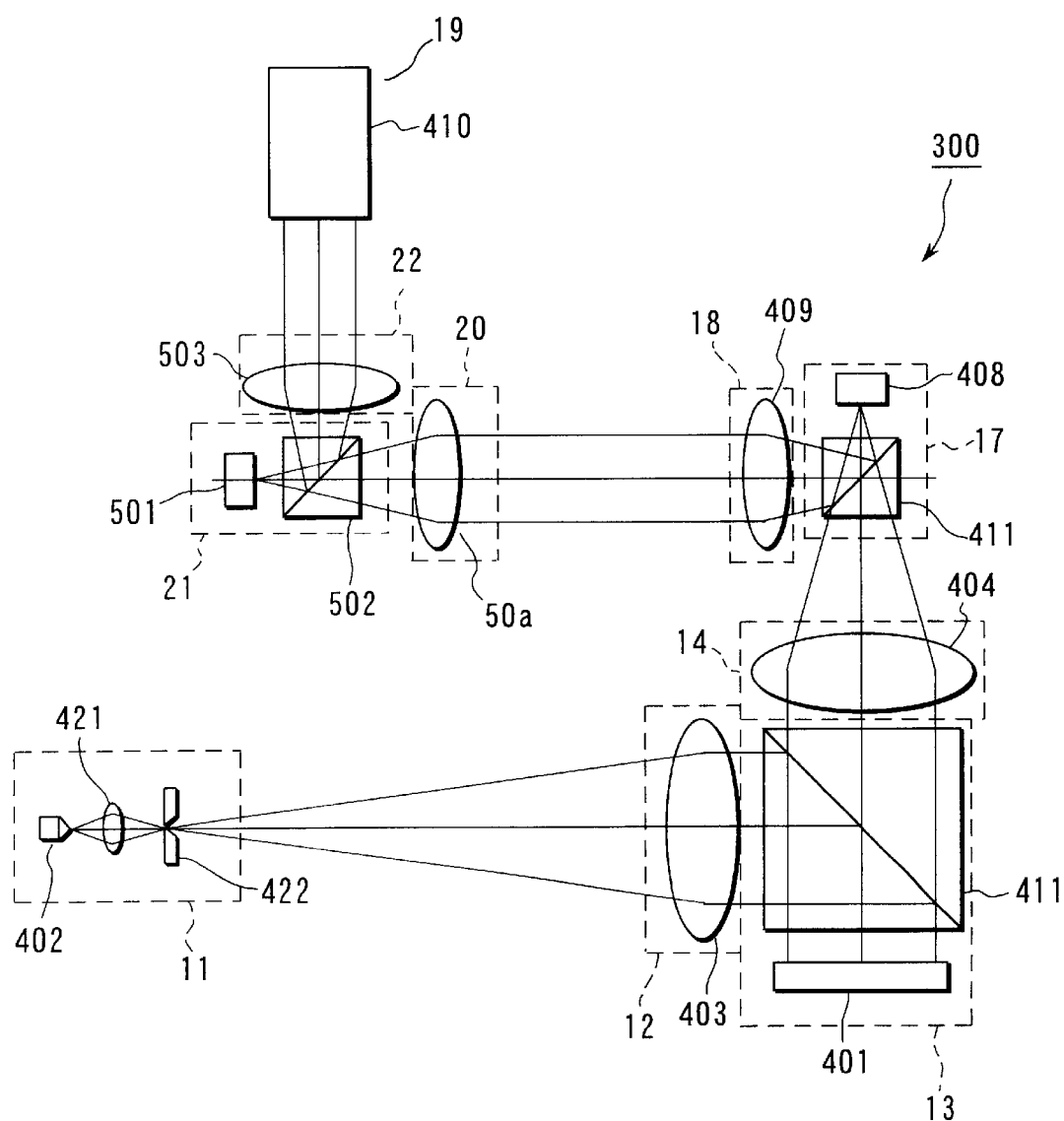
FIG. 8 shows the configuration of an embodiment of the optical information processing apparatus 300 according to the third mode of the present invention.

FIG. 8 shows the configuration of an embodiment of the optical information processing apparatus 300 according to the third mode of the present invention.

As shown in FIG. 8, in the embodiment of the optical information processing apparatus 300 according to the third mode of the invention, the light generated by the read light generator section 11 is converted by the collimate light generator section 12 into collimate light.

On the basis of the collimate light, the image information previously displayed on the image display section 13 is read from the image display section 13.

The Fourier transform optical system 14 subjects the read image information to Fourier transform. Then, the Fourier transform image is formed on the spatial optical modulator of the filtering section 17.

The spatial optical modulator of the filtering section 17 subjects the Fourier transform image to intensity (or phase) filtering.

The filtered image information is further subjected to inverse Fourier transform at the inverse Fourier transform optical system 18.

The filtering image information subjected to the inverse Fourier transform is further subjected to Fourier transform at the second Fourier transform optical system 20.

The light subjected to Fourier transform forms a Fourier transform image on the reflection-type spatial optical modulator (SLM) 501 acting as the second filtering section 21. The SLM effects phase filtering.

The light filtered is subjected to inverse Fourier transform at the second inverse Fourier transform optical system 22. The filtering image information acquiring section 19 obtains the image information filtered by the filtering section 17 and second filtering section 21.

In the embodiment of the optical information processing apparatus 300 according to the third mode of the present invention, the read light generator section 11 is composed of a laser diode (LD) 402, a condenser lens 421, and a pinhole 422.

The collimate light generator section 12 is composed of a collimate lens 403.

The image display section 13 is composed of a reflection-type spatial optical modulator (SLM) 401 and a polarized beam splitter 411.

The Fourier transform optical system 14 is composed of a Fourier transform lens 404.

The filtering section 17 is composed of a reflection-type spatial optical modulator (SLM) 408 and a polarized beam splitter 411.

The inverse Fourier transform optical system 18 is composed of an inverse Fourier transform lens 409.

The second Fourier transform optical system 20 is composed of a second Fourier transform lens 50a.

The second filtering section 21 is composed of a second reflection-type spatial optical modulator (SLM) 501 and a polarized beam splitter 502.

The second inverse Fourier transform optical system 22 is composed of a second inverse Fourier transform lens 503.

The filtering image acquiring section 19 is composed of a CCD camera 410.

Fourth Mode (Configuration)

Figure 9:
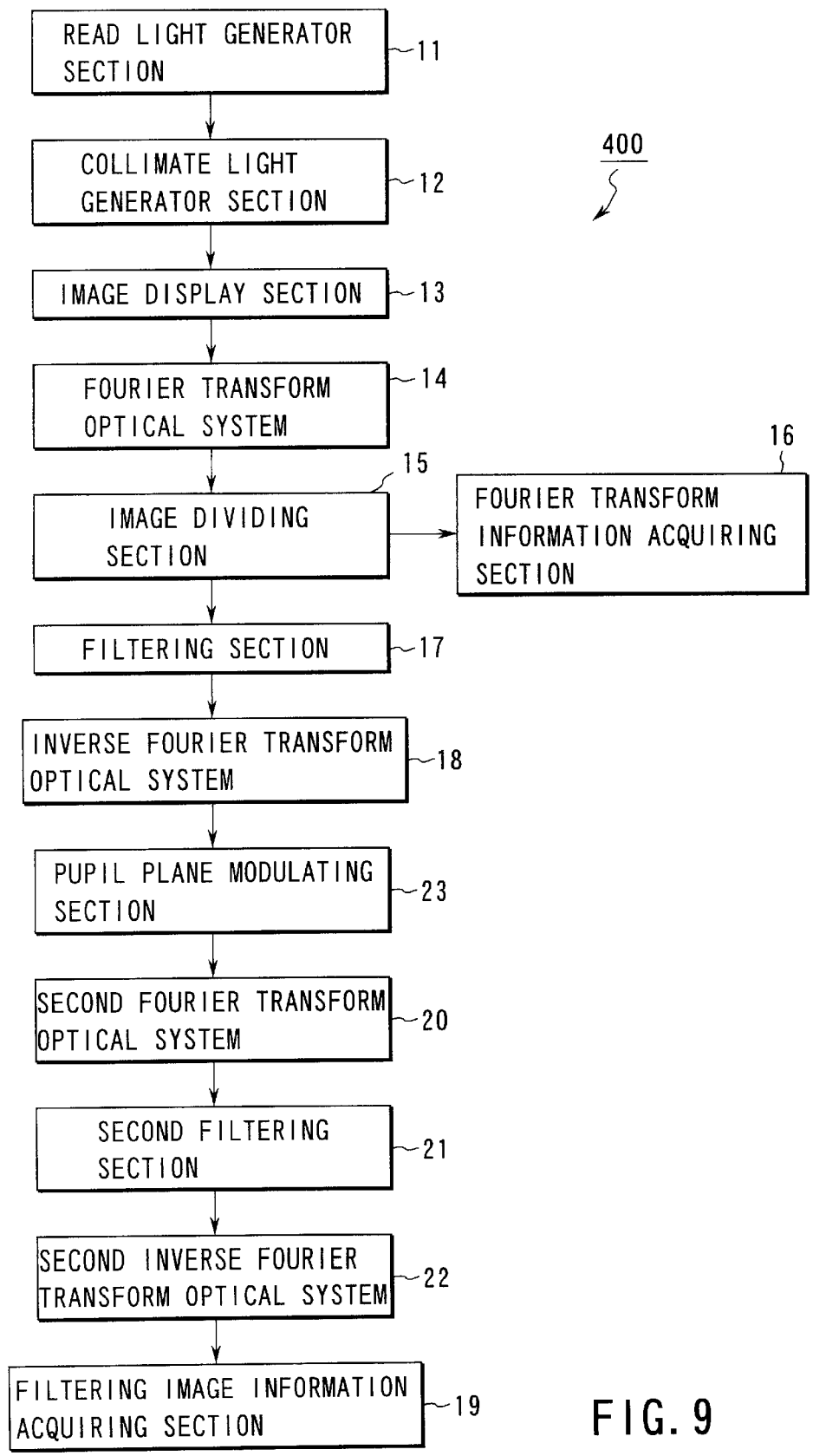
FIG. 9 schematically shows the configuration of an optical information processing apparatus 400 according to a fourth mode of the present invention.

FIG. 9 schematically shows the configuration of an optical information processing apparatus 400 according to a fourth mode of the present invention.

As shown in FIG. 9, the optical information processing apparatus 400 according to the fourth mode of the invention is such that, between the inverse Fourier transform optical system 18 and second Fourier transform optical system 20, a pupil modulator section 23 for filtering phase or amplitude information (either or both) is provided in the vicinity of a plane to which the back focal-point position of the inverse Fourier transform optical system 18 and the front focal-point position of the second Fourier transform optical system 20 belong in the optical information processing apparatus 200 according to the second mode of the invention.
(Effect)

The optical information processing apparatus 400 of the fourth mode is characterized by providing a pupil modulator section 23 for filtering phase or amplitude information (either or both) in the vicinity of a plane to which the back focal-point position of the inverse Fourier transform optical system 18 and the front focal-point position of the second Fourier transform optical system 20 belong, between the inverse Fourier transform optical system 18 and second Fourier transform optical system 20 in the optical information processing apparatus 200 of the second mode. With this configuration, the pupil modulator section 23 is capable of filtering on a (real) surface conjugate with the input image, not the Fourier surface.

This enables use of a filter requiring operations on a surface other than the Fourier surface, such as a Wingner distribution function (WDF) filter.

When an amplitude-modulation SLM is used as the pupil modulator section 23 to display an aperture, this provides a segmentation function of transferring information only about the necessary region of the image to be processed.

First Embodiment

Figure 10:
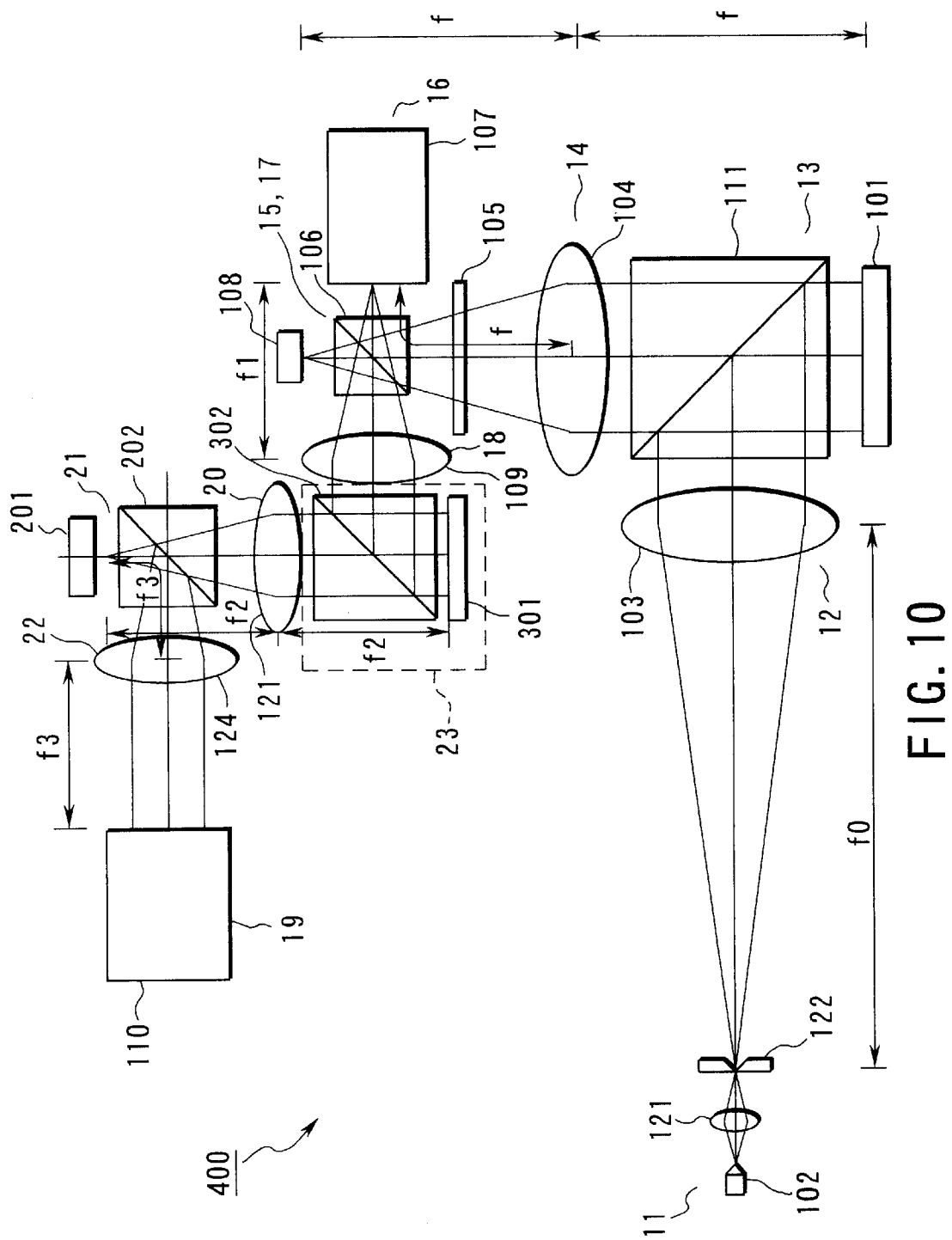
FIG. 10 shows the configuration of a first embodiment of the optical information processing apparatus 400 according to the fourth mode of the present invention.

FIG. 10 shows the configuration of a first embodiment of the optical information processing apparatus 400 according to the fourth mode of the present invention.

As shown in FIG. 10, the first embodiment of the optical information processing apparatus 400 according to the fourth mode of the invention is such that, in the first embodiment (FIG. 5) of the optical information processing apparatus 200 according to the second mode of the invention, the pupil modulator section 23 is inserted between the inverse Fourier transform optical system 18 and second Fourier transform optical system 20 to select the light going to the second filtering section 21. In this way, a region to be filtered is selected.

In the first embodiment of the optical information processing apparatus 400 according to the fourth mode of the invention, the read light generator section 11 is composed of a laser diode (LD) 102, a condenser lens 121, and a pinhole 122.

The collimate light generator section 12 is composed of a collimate lens 103.

The image display section 13 is composed of a reflection-type spatial optical modulator (SLM) 101 and a polarized beam splitter 111.

The Fourier transform optical system 14 is composed of a Fourier transform lens 104.

The image dividing section 15 is composed of a λ/4 plate 105 and a polarized beam splitter 106.

The Fourier transform information acquiring section 16 is composed of a CCD camera 107.

The filtering section 17 is composed of a reflection-type spatial optical modulator (SLM) 108 and a polarized beam splitter 106.

The inverse Fourier transform optical system 18 is composed of an inverse Fourier transform lens 109.

The second Fourier transform optical system 20 is composed of a second Fourier transform lens 121.

The second filtering section 21 is composed of a second reflection-type spatial optical modulator (SLM) 201 and a polarized beam splitter 202.

The second inverse Fourier transform optical system 22 is composed of a second inverse Fourier transform lens 124.

The filtering image acquiring section 19 is composed of a CCD camera 110.

The pupil modulator section 23 is a reflection-type spatial optical modulator (SLM) 301 and a polarized beam splitter 302.

In the system arrangement, the distance between the reflection-type spatial optical modulator (SLM) 101 and Fourier transform lens 104, the distance between the Fourier transform lens 104 and CCD camera 107, and the distance between the Fourier transform lens 104 and reflection-type spatial optical modulator (SLM) 108 are each set to the focal length f of the Fourier transform lens 104.

The distance between the reflection-type spatial optical modulator (SLM) 108 and inverse Fourier transform lens 109 and the distance between the inverse Fourier transform lens 109 and reflection-type spatial optical modulator (SLM) 301 are each set to the focal length f1 of the inverse Fourier transform lens 109.

The distance between the reflection-type spatial optical modulator (SLM) 301 and second Fourier transform lens 121 and the distance between the second Fourier transform lens 121 and reflection-type spatial optical modulator (SLM) 201 are each set to the focal length f2 of the second Fourier transform lens 121.

The distance between the reflection-type spatial optical modulator (SLM) 201 and inverse Fourier transform lens 124 and the distance between the inverse Fourier transform lens 124 and CCD camera 110 are each set to the focal length f3 of the inverse Fourier transform lens 124.

The distance between the pinhole 122 and collimate lens 103 is set to the focal length f0 of the collimate lens 103.

CONCRETE EXAMPLE 7

Wigner Distribution Function <WDF> Filter

In concrete example 7, let an image to be processed be f(x, y).

When f(x+xo/2, y+yo/2) is displayed on the SLM 101 of the image display section 13, f(x−xo/2, y−yo/2) is displayed on the SLM 301 of the pupil modulator section 23, the transfer function H(x, y, u, v) of the optical system is displayed on the SLM 201 of the second filtering section 21, the result of applying the WDF filter corresponding to the amount of shift (x0, y0) to the image f(x, y) to be processed is picked up by the CCD 110 of the filtering image information acquiring section 19.

CONCRETE EXAMPLE 8

Segmentation Filter

In concrete example 8, a computer 701 (see FIG. 17) explained later takes in the correlation image obtained by an optical information processing apparatus of the present invention as described above (for example, concrete example 6), binarizes the image using a specific threshold value, and senses the peak corresponding to a reference image.

Then, an aperture of a specific size is displayed on the SLM 301 of the pupil modulator section 23 sequentially in such a manner that only the part of the input image corresponding to the position of the peak is segmented.

Thereafter, processing at the second filtering section 21 enables only the segmented part to be recognized.

Second Embodiment

Figure 11:
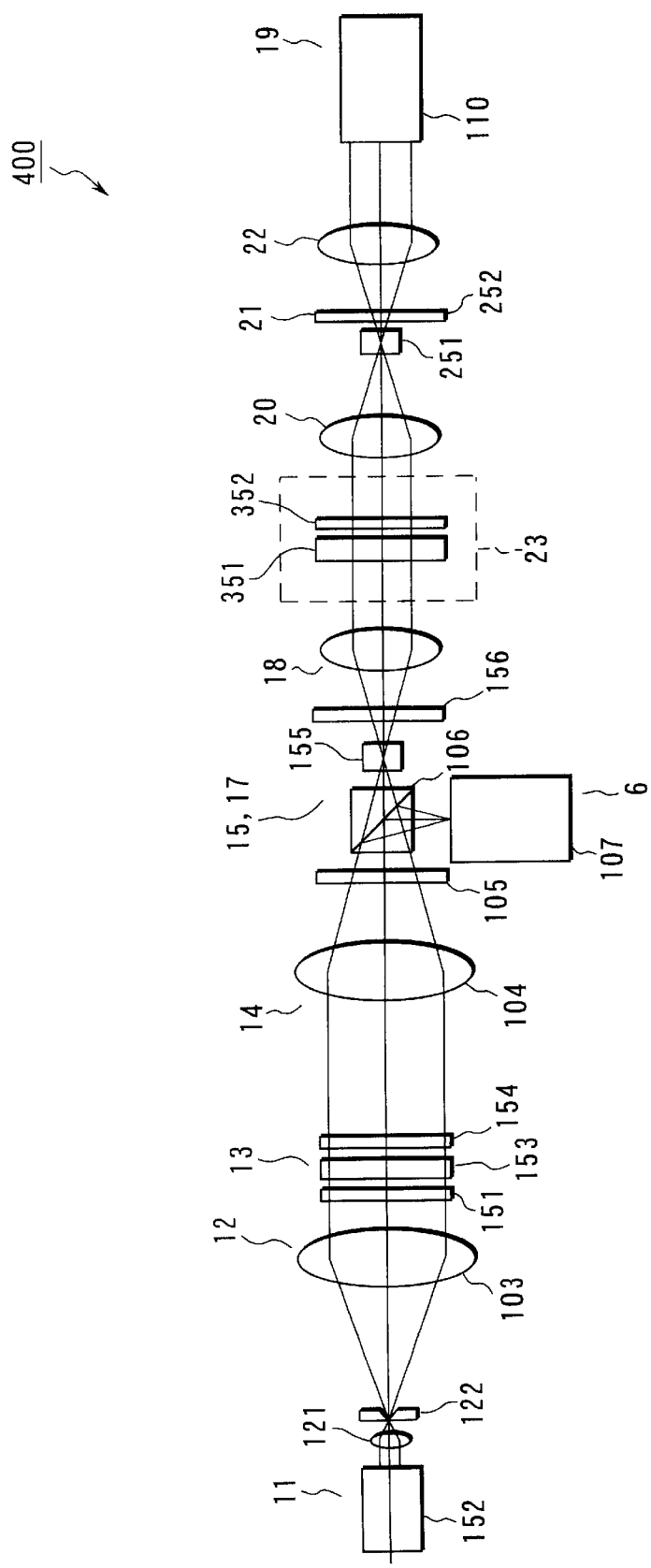
FIG. 11 shows the configuration of a second embodiment of the optical information processing apparatus 400 according to the fourth mode of the present invention.

FIG. 11 shows the configuration of a second embodiment of the optical information processing apparatus 400 according to the fourth mode of the present invention.

As shown in FIG. 11, the second embodiment of the optical information processing apparatus 400 according to the fourth mode of the invention differs from the first embodiment (FIG. 10) of the optical information processing apparatus 400 according to the fourth mode in that the reflection-type spatial optical modulators (SLMs) used in the image display section 13, filtering section 17, and second filtering section 21 in the first embodiment are replaced with transmission-type ones and that the laser diode (LD) 102 in the read light generator section 11 is replaced with an He—Ne laser 152.

Accordingly, the second embodiment further differs from the first embodiment in the following points.

In the second embodiment, the read light generator section 11 is composed of the He-Na laser 152, a condenser lens 121, and a pinhole 122.

Furthermore, the image display section 13 is composed of a transmission-type spatial optical modulator (SLM) 153, a polarizer 151, and an analyzer 154.

The filtering section 17 is composed of a polarized beam splitter 106, a transmission-type spatial optical modulator (SLM) 155, and an analyzer 156.

The second filtering section 21 is composed of a transmission-type spatial optical modulator (SLM) 251 and an analyzer 252.

The above-described concrete examples 7 and 8 are also applicable to the second embodiment.

Fifth Mode (Configuration)

Figure 12:
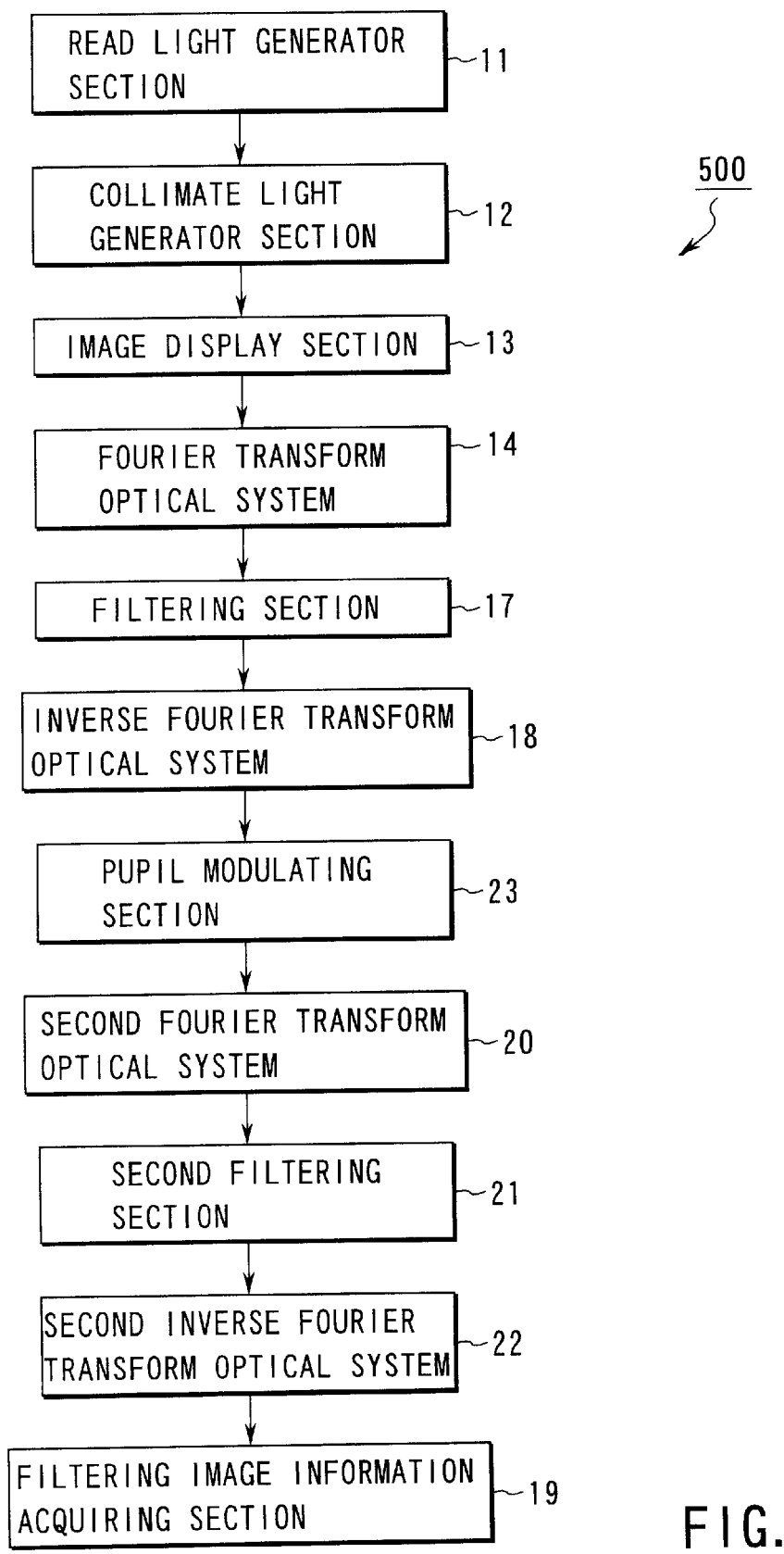
FIG. 12 schematically shows the configuration of an optical information processing apparatus 500 according to a fifth mode of the present invention.

FIG. 12 schematically shows the configuration of an optical information processing apparatus 500 according to a fifth mode of the present invention.

As shown in FIG. 12, the optical information processing apparatus 500 according to the fifth mode of the invention is such that the image dividing section 15 and Fourier transform information acquiring section 16 are eliminated from the optical information processing apparatus 400 (FIG. 9) according to the fourth mode of the invention.
(Effect)

The optical information processing apparatus 500 of the fifth mode is obtained by eliminating the image dividing section 15 and Fourier transform information acquiring section 16 from the configuration of the optical information processing apparatus 400 of the fourth mode. Eliminating the sections for acquiring the Fourier transform information makes the configuration simpler and enables the pursuit of only filtering flexibility.

Embodiment

Figure 13:
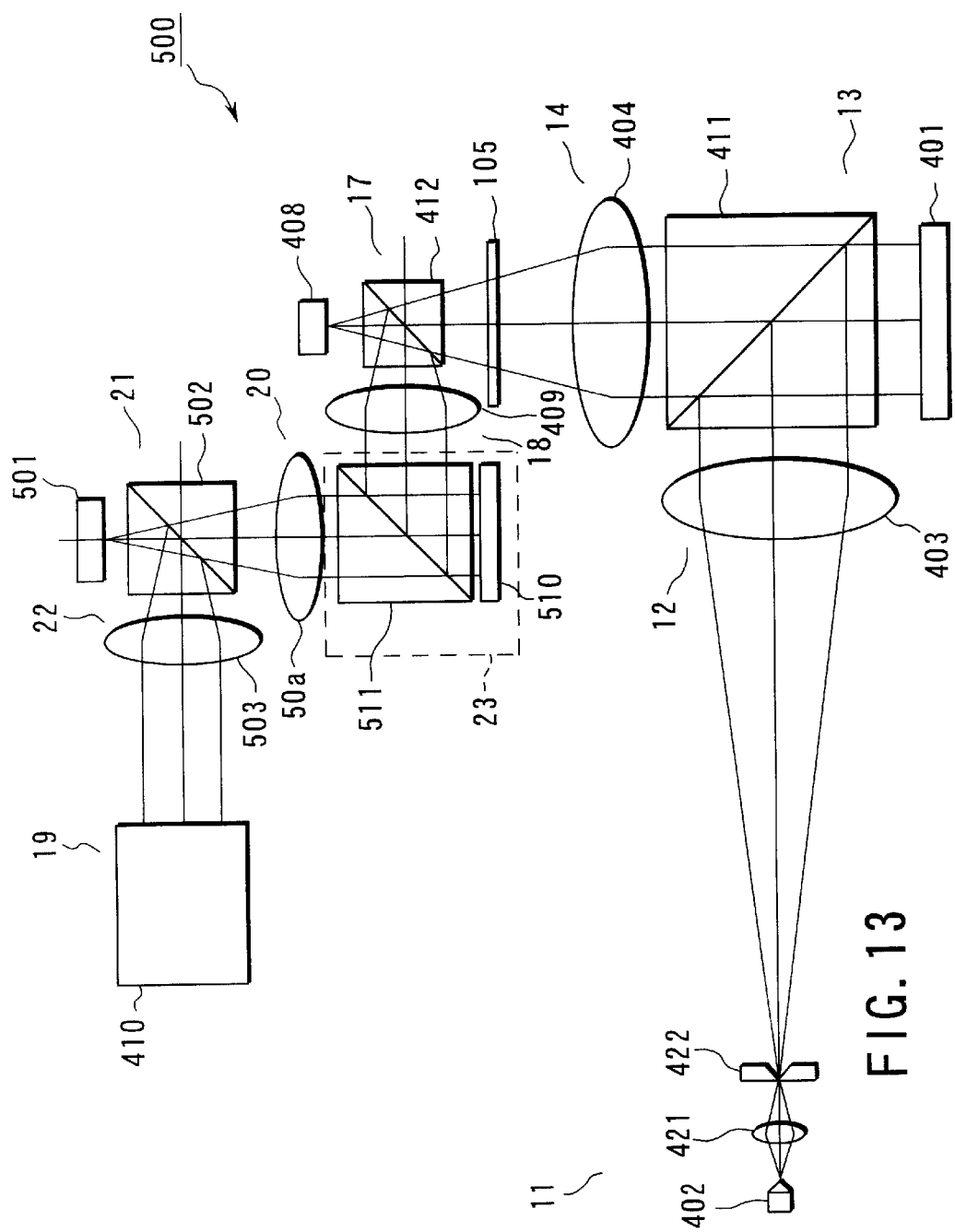
FIG. 13 shows the configuration of an embodiment of the optical information processing apparatus 500 according to the fifth mode of the present invention.

FIG. 13 shows the configuration of an embodiment of the optical information processing apparatus 500 according to the fifth mode of the present invention.

As shown in FIG. 13, the optical information processing apparatus 500 according to the fifth mode of the invention is such that a pupil modulator section 23 is inserted between the inverse Fourier transform optical system 18 and second Fourier transform optical system 20 in the first embodiment (FIG. 8) of the optical information processing apparatus 300 according to the third mode of the invention. With this configuration, the light going to the second filtering section 21 is selected, thereby selecting a region to be filtered.

As shown in FIG. 13, the embodiment of the optical information processing apparatus 500 according to the fifth mode of the invention, the light generated by the read light generator section 11 is converted by the collimate light generator section 12 into collimate light.

On the basis of the collimate light, the image information previously displayed on the image display section 13 is read from the image display section 13.

The Fourier transform optical system 14 obtains the Fourier transform of the read image information to Fourier transform and forms the Fourier transform image on the spatial optical modulator of the filtering section 17.

The spatial optical modulator of the filtering section 17 subjects the Fourier transform image to intensity (or phase) filtering.

The filtered image information is further subjected to inverse Fourier transform at the inverse Fourier transform optical system 18.

The filtering image information subjected to the inverse Fourier transform is inputted to the pupil modulator section 23.

From the image information inputted to the pupil modulator section 23, the spatial optical modulator of the pupil modulator section 23 selects a region to be filtered.

Only the image information in the selected region is inputted to the second Fourier transform optical system 20.

The inputted image information in the selected region is subjected to Fourier transform at the second Fourier transform optical system 20.

The light subjected to Fourier transform forms a Fourier transform image on the reflection-type spatial optical modulator (SLM) 501 acting as the second filtering section 21. The SLM effects phase filtering.

The light filtered is subjected to inverse Fourier transform at the second inverse Fourier transform optical system 22. The filtering image information acquiring section 19 obtains the image information filtered by the filtering section 17 and second filtering section 21.

In the optical information processing apparatus 500 according to the fifth mode of the present invention, the read light generator section 11 is composed of a laser diode (LD) 402, a condenser lens 421, and a pinhole 422.

The collimate light generator section 12 is composed of a collimate lens 403.

The image display section 13 is composed of a reflection-type spatial optical modulator (SLM) 401 and a polarized beam splitter 411.

The Fourier transform optical system 14 is composed of a Fourier transform lens 404.

The filtering section 17 is composed of a reflection-type spatial optical modulator (SLM) 408 and a polarized beam splitter 412.

The inverse Fourier transform optical system 18 is composed of an inverse Fourier transform lens 409.

The second Fourier transform optical system 20 is composed of a second Fourier transform lens 50a.

The second filtering section 21 is composed of a second reflection-type spatial optical modulator (SLM) 501 and a polarized beam splitter 502.

The second inverse Fourier transform optical system 22 is composed of a second inverse Fourier transform lens 503.

The filtering image acquiring section 19 is composed of a CCD camera 410.

The pupil modulator section 23 is composed of a reflection-type spatial optical modulator (SLM) 510 and a polarized beam splitter 511.

Sixth Mode

Figure 14:
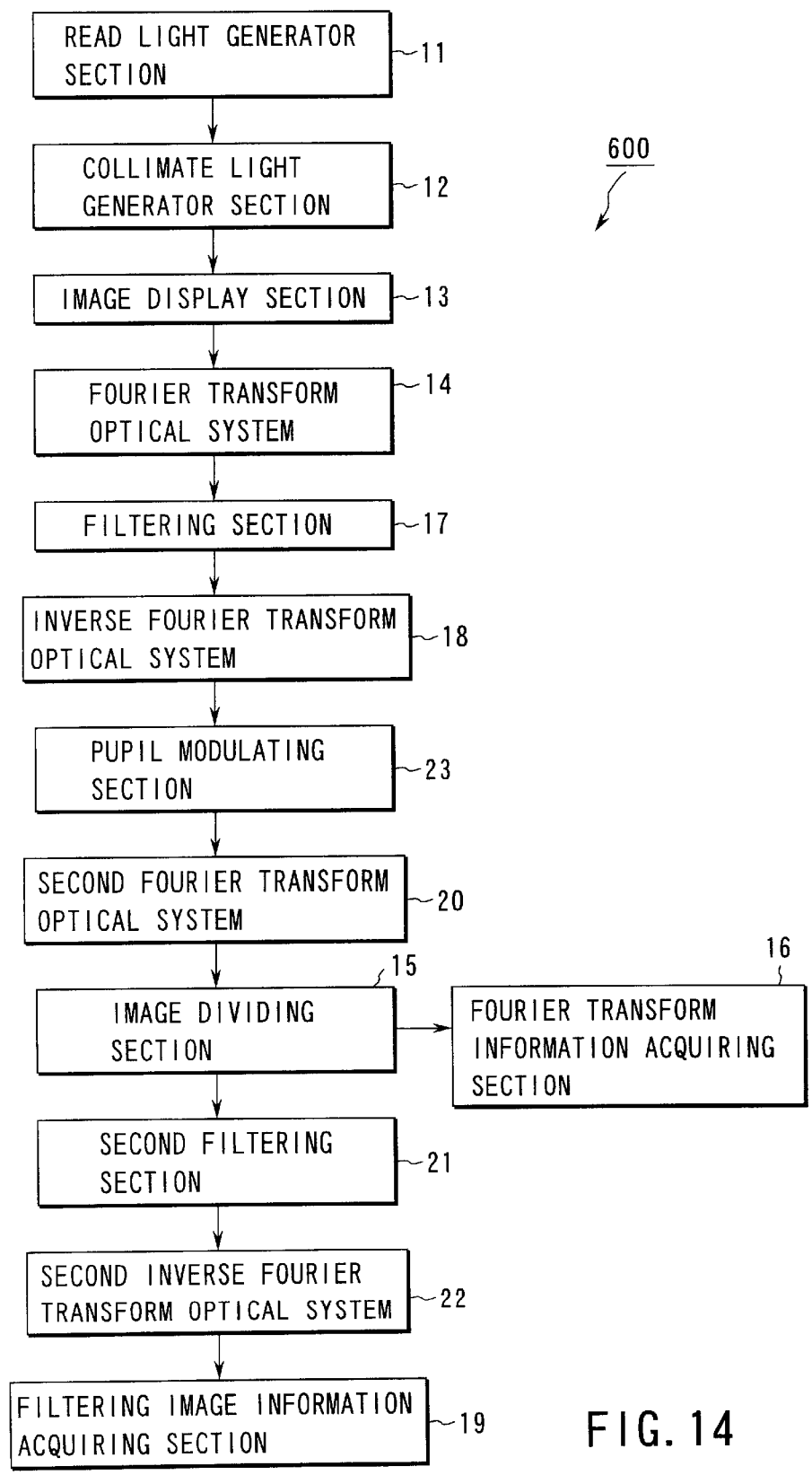
FIG. 14 schematically shows the configuration of an optical information processing apparatus 300 according to a sixth mode of the present invention.

FIG. 14 schematically shows the configuration of an optical information processing apparatus 600 according to a sixth mode of the present invention.

As shown in FIG. 14, the optical information processing apparatus 600 according to the sixth mode of the invention is such that an image dividing section 15 and a Fourier transform information acquiring section 16 are inserted between the second Fourier transform optical system 20 and second filtering section 21 in the optical information processing apparatus 500 (FIG. 12) according to the fifth mode of the invention.
(Effect)

The optical information processing apparatus 600 according to the sixth mode of the invention is obtained by adding the image dividing section 15 and Fourier transform information acquiring section 16 to the configuration of the optical information processing apparatus 500 according to the fifth mode in such a manner that they are placed in the conjugate positions with the image dividing section 15 and Fourier transform information acquiring section in the optical information processing apparatus 400 of the fourth mode. Furthermore, the optical information processing apparatus 600 is designed to obtain on a Fourier surface the result of filtering done by the pupil modulator section 23 placed on the conjugate (real) surface with the input image.

The optical information processing apparatus 600 enables an input image transform (e.g., FM transform or Geometrical moment transform) filter to act on the conjugate surface with the input image and can obtain the result on a Fourier surface.

Embodiment

Figure 15:
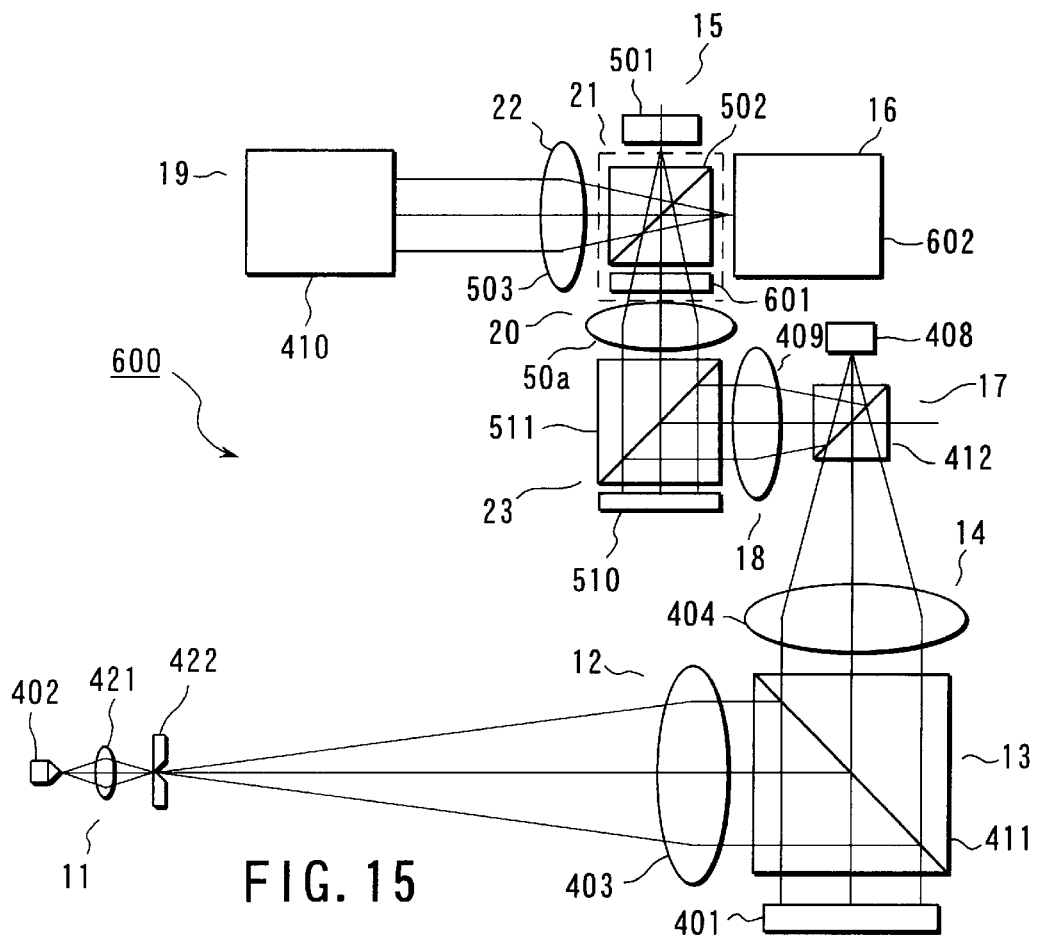
FIG. 15 shows the configuration of an embodiment of the optical information processing apparatus 300 according to the sixth mode of the present invention.

FIG. 15 shows the configuration of an embodiment of the optical information processing apparatus 600 according to the sixth mode of the present invention.

As shown in FIG. 15, the optical information processing apparatus 600 according to the sixth mode of the invention is such that an image dividing section 15 and a Fourier transform information acquiring section 16 are inserted between the second Fourier transform optical system 20 and second filtering section 21 in the embodiment (FIG. 13) of the optical information processing apparatus 500 according to the fifth mode of the invention. With this configuration, one part of the light divided is supplied to the Fourier transform information acquiring section 16, which obtains Fourier transform information.

In the optical information processing apparatus 600 according to the sixth mode of the present invention, the read light generator section 11 is composed of a laser diode (LD) 402, a condenser lens 421, and a pinhole 422.

The collimate light generator section 12 is composed of a collimate lens 403.

The image display section 13 is composed of a reflection-type spatial optical modulator (SLM) 401 and a polarized beam splitter 411.

The Fourier transform optical system 14 is composed of a Fourier transform lens 404.

The filtering section 17 is composed of a reflection-type spatial optical modulator (SLM) 408 and a polarized beam splitter 412.

The inverse Fourier transform optical system 18 is composed of an inverse Fourier transform lens 409.

The second Fourier transform optical system 20 is composed of a second Fourier transform lens 50a.

The second filtering section 21 is composed of a second reflection-type spatial optical modulator (SLM) 501 and a polarized beam splitter 502.

The second inverse Fourier transform optical system 22 is composed of a second inverse Fourier transform lens 503.

The filtering image acquiring section 19 is composed of a CCD camera 410.

The pupil modulator section 23 is composed of a reflection-type spatial optical modulator (SLM) 510 and a polarized beam splitter 511.

The image dividing section 15 is composed of a λ/4 plate 601 and a polarized beam splitter 502.

The Fourier transform information acquiring section 16 is composed of a CCD camera 602.

CONCRETE EXAMPLE 9

Fourier Mellin Transform

In concrete example 9, on the SLM 510 of the pupil modulator section 23, the phase given by the following expression is displayed:

$$2\pi/\lambda f_L [x \ln(x^2+y^2)^{1/2} - y \tan^{-1}(y/x) - x]$$

Then, when an image is inputted to the SLM 401 of the image display section 13, its transform image appears on the CCD 602 of the Fourier transform information acquiring section 16.

In this case, CGH represented in intensity, not in phase, may be used.

Modification 1

Figure 16:
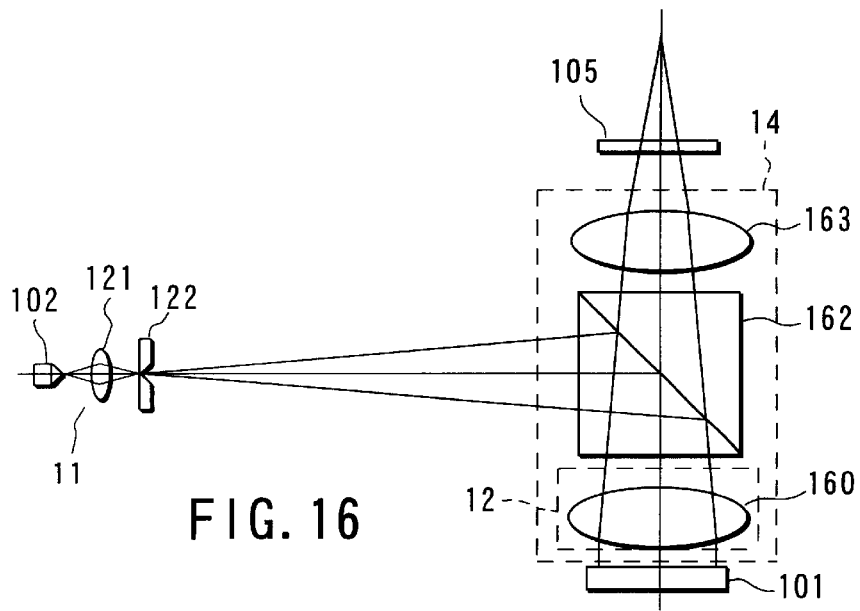
FIG. 16 shows the configuration of the important part in a first modification of the optical information processing apparatus according to one of the first to sixth modes of the present invention.

FIG. 16 shows the configuration of the important part in a first modification of the optical information processing apparatus according to any one of the first to sixth modes of the present invention.

As shown in FIG. 16, the important part of modification 1 is so constructed that the Fourier transform optical system 14 includes not only the Fourier transform lens 163 but also the collimate lens 160 of the collimate light generator section 12 and the polarized beam splitter 162 of the image display section 13 in each of the embodiments of the optical information processing apparatuses 100, 200, 300, 400, 500, and 600 according to the first to sixth modes of the present invention.

The configuration of modification 1 produces a similar effect to that of each of the embodiments described above, while making the entire configuration more compact.

Modification 2

Figure 17:
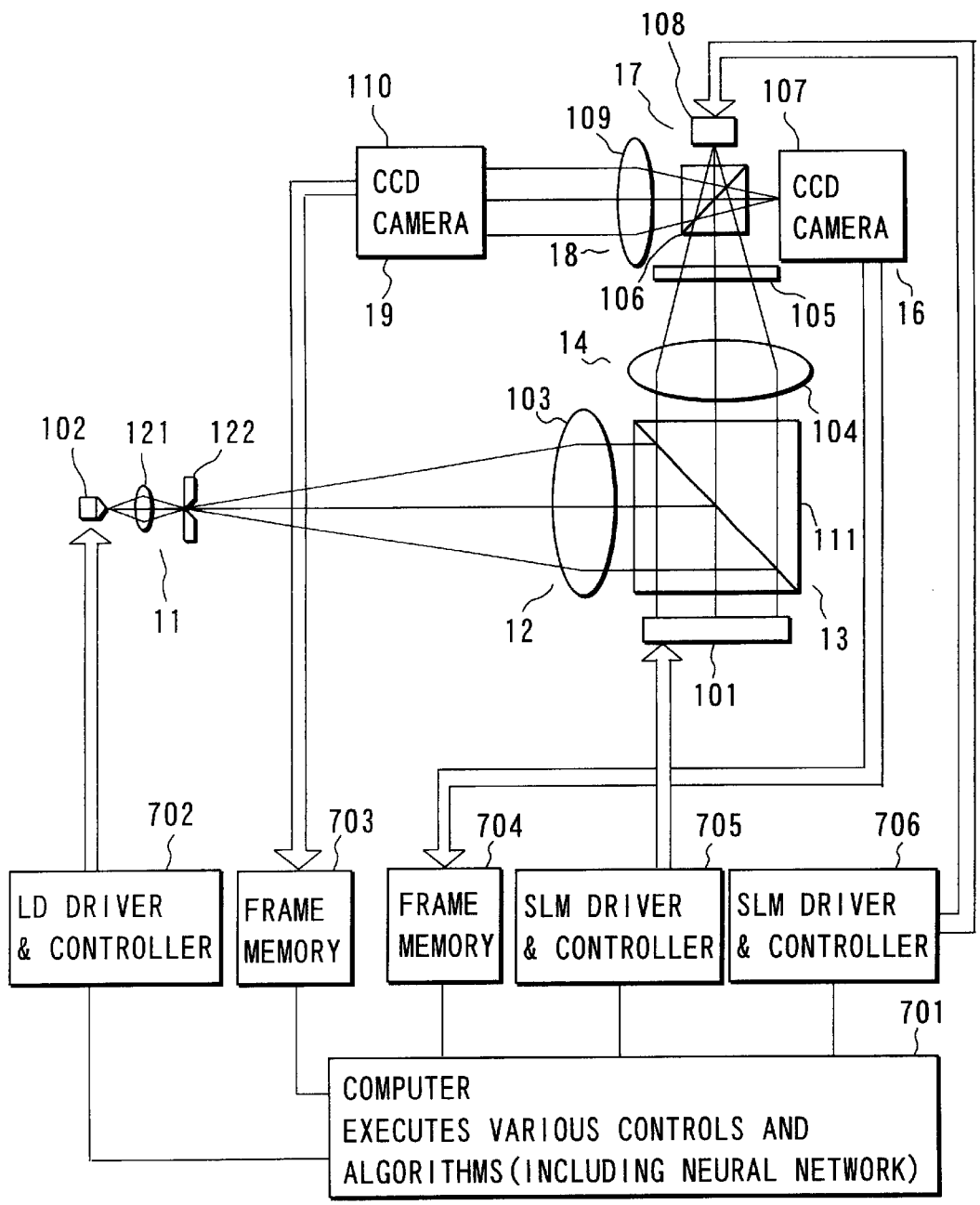
FIG. 17 shows the configuration of the important part in a second modification of the optical information processing apparatus according to one of the first to sixth modes of the present invention.

FIG. 17 shows the configuration of the important part in a second modification of the optical information processing apparatus according to any one of the first to sixth modes of the present invention.

As shown in FIG. 17, the configuration of the important part of modification 2 is such that a control system for controlling each section is added in each of the embodiments of the optical information processing apparatuses 100, 200, 300, 400, 500, and 600 according to the first to sixth modes of the present invention, as explained in the first embodiment of the optical information processing apparatus according to the first mode of the invention.

Specifically, the control system comprises an LD driver controller 702 for driving a laser diode 102 (LD) 102 in the read light generator section 11, a frame memory 703 for temporarily storing the filtering image data from the CCD camera 110 of the filtering image acquiring section 19, a frame memory 704 for temporarily storing the Fourier transform information from the CCD camera 107 of the Fourier transform information acquiring section 16, an SLM driver controller 705 of driving the reflection-type spatial optical modulator (SLM) 101 of the image display section 13, an SLM driver controller 706 for driving the reflection-type spatial optical modulator (SLM) 108 of the filtering section 17, and a computer 701 for controlling the entire control system.

The computer 701 not only performs various types of control on the LD driver controller 702 and SLM driver controllers 705, 707 but also executes algorithms including a neural network.

Although the computer 701 performing various types of control and effecting post-processing has not been explained in detail here, packaging various standard filter processes in the form of subroutines or various operations using GUI makes it easier to use the apparatus. In addition, use of a filter optimizing function makes it much easier to use the apparatus. As for post-processing, use of various types of recognition routines or apparatuses, such as neural networks or statistical techniques, is very effective in practical use.

In each of the above-described concrete examples, the amplitude-modulation SLMs have been replaced with the phase-modulation SLMs in various ways. The manufacture of SLMs following the same specifications provides SLMs in unit form, enabling easy installation and removal of SLMs, which is no obstacle to the easy-to-use feature.

In the above-described modes of the present invention, the most versatile one is the sixth mode.

Specifically, the most versatile optical information processing apparatus is of the following type where an amplitude-modulation SLM and a phase-modulation SLM are used as the filtering sections 17, 21, respectively, and an amplitude-modulation SLM is used as the pupil modulator section 23 on the real surface.

The application of the versatile optical information processing apparatuses of the present invention is not limited to the concrete examples described above.

The filtering section in the present invention is capable of executing many types of filtering proposed until now, including CHE, MVSDF, MASE, Geometrical Moment, and Hough transform filters, image improving or contrast improving filters, image recovering filters, and display and wave front creating CGH or holograms.

Therefore, the filtering section can be applied to almost all the filters which are expressed in phase or amplitude information (either or both), placed on a Fourier surface or the input surface (or its equivalent real surface), and produce the output on the Fourier surface or real surface.

The optical information processing apparatuses of the present invention are capable of executing another process a conventional equivalent, such as JTC, was unable to carry out.

In concrete example 4, the image f(x, y) to be processed and the reference image $f_r(x, y)$ are displayed a distance of 2d apart on the SLM 101 of the image display section 13 (f(x−d, y)+$f_r$(x+d, y)). The display mode when the CCD 107 of the Fourier transform information acquiring section obtains its transform image is a second display mode. The display mode when the Fourier transform image is displayed again on the SLM 101 of the image display section 13 and received by the CCD 107 is a third display mode.

In each of the above-described modes of the present invention, an optical information processing apparatus essentially comprises an image display section for displaying information on an object to be processed as image information, an image information read section for converting the light from a light source into collimate light, projecting it onto the image display section, and then reading image information, a Fourier transform optical system for obtaining the Fourier transform of the image information read by the image information read section, a filtering section for implementing the phase or amplitude information filtering of the image information subjected to Fourier transform at the Fourier transform optical system, an inverse Fourier transform optical system for obtaining the inverse Fourier transform of the image information filtered at the filtering section, and a filtering image information acquiring section for taking in the image information subjected to inverse Fourier transform at the inverse Fourier transform optical system.

Such an optical information processing apparatus of the present invention is characterized by modularizing the filtering sections into units according to several types of method and being capable of changing the filtering method freely by replacing the unit module.

As in manufacturing SLMs following the same specifications, modularizing the filtering sections enables easy installation and removal of units of the filtering section, which is no obstacle to the easy-to-use feature.

The optical information processing apparatus essentially comprising the above-described component parts is characterized by dividing the image information subjected to Fourier transform at the Fourier transform optical system and making the processing of one piece of the image information divided different from the processing of the other piece of the image information divided.

Furthermore, the optical information processing apparatus essentially comprising the above-described component parts is characterized by being designed to enable the addition of one or more combinations of the Fourier transform optical system, filtering section, and inverse Fourier transform optical system.

As in manufacturing SLMs following the same specifications, modularizing these modifications of the embodiments enables easy installation and removal of their unit modules, which is no obstacle to the easy-to-use feature.

With the present invention in the first to sixth modes, it is possible to provide a compact, general-purpose optical information processing apparatus capable of various types of filtering and image processing.

Seventh to Ninth Modes

Before explanation of a seventh mode to a ninth mode of the present invention, the fundamental principle of the present invention in the seventh to ninth modes will be explained by reference to FIG. 18.

Figure 18:
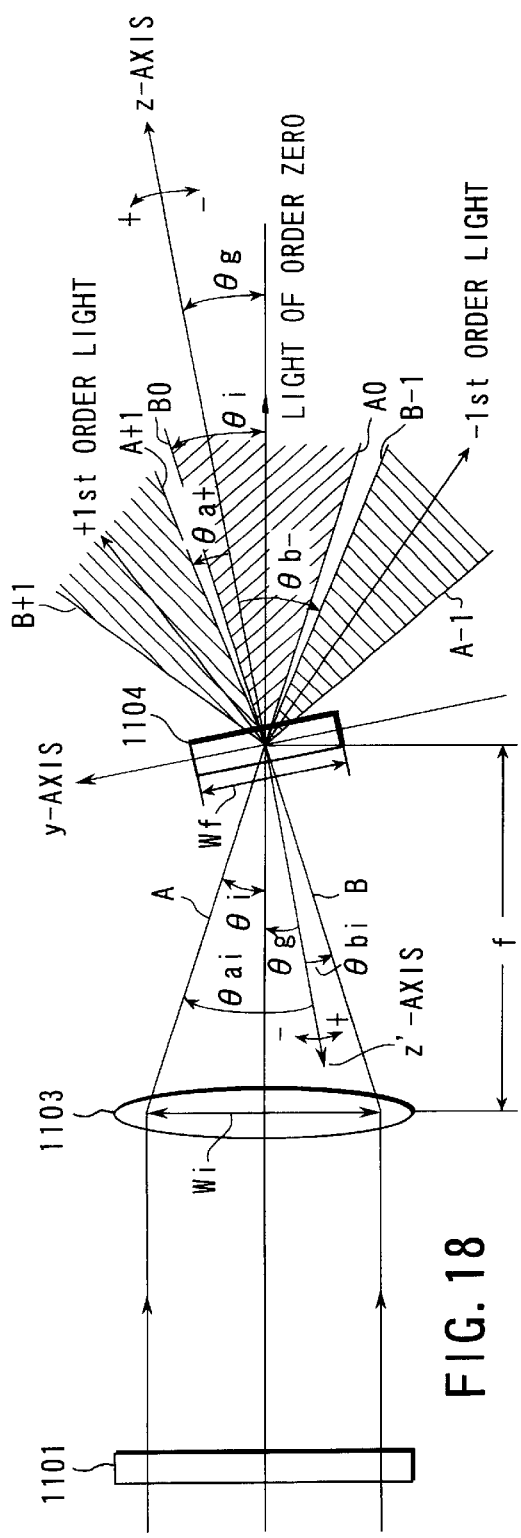
FIG. 18 is a diagram to help explain the fundamental principle of an optical image processing apparatus according to one of a seventh to a ninth mode of the present invention.

FIG. 18 is a sectional view of the optical system of an optical image processing apparatus of the present invention in the seventh to ninth mode taken along the optical axis.

In the optical system, it is assumed that the size of an image displayed on an image display section 1101 is $W_i$, the focal length of a Fourier transform optical system 1103 is f, and the incident angle of the light coming from the Fourier transform optical system 1103 into a filtering section 1104 is $\theta_g$.

The Fourier transform optical system 1103 causes the light of each frequency component to enter the filtering section 1104 at a specific angle. The angle is determined by the size $W_i$ of the image displayed on the image display section 1101 and the focal length f of the Fourier transform optical system 1103.

To make explanation easier, FIG. 18 shows only the DC component which has no frequency component in the frequency components included in the image displayed on the image display section 1101.

In this case, the outermost rays of light A and light B in the DC component strike at an angle of $2\theta_i (\theta_i > 0)$.

Let the surface on which the image from the filtering section 1104 is displayed be an xy plane. Take the z-axis in the direction perpendicular to the xy plane and in the direction in which the filtering section 1104 emits light. Take the z'-axis in the direction in which light enters the filtering section 1104.

Thus, the plane of FIG. 18 shows a yz plane.

It is assumed that an angle formed counterclockwise from the z'-axis is positive (+) and that formed clockwise from the z'-axis is negative (−) on the incident light side and that an angle formed counterclockwise from the z-axis is positive (+) and that formed clockwise from the z-axis is negative (−) on the outgoing light side.

In this coordinate system, the angle $\theta_{ai}$ the ray of light A forms with the filtering section 1104 is expressed as follows:

$$\theta_{ai} = -\theta_i + \theta_g = -\arctan(W_i/2f) + \theta_g \quad (4)$$

On the other hand, the angle $\theta_{bi}$ the ray of light B forms with the filtering section 1104 is expressed as follows:

$$\theta_{bi} = \theta_i + \theta_g = \arctan(W_i/2f) + \theta_g \quad (5)$$

Then, the light entering the filtering section 1104 propagates, producing diffracted light because of the pixels constituting the filtering section 1104.

If the pixel-to-pixel spacing in the filtering section 1104 is p and the wavelength of the read light is λ, the ray of light $A_{+1}$, or the +first-order diffracted light (+first-order light)

with respect to the ray of light A, is diffracted at a diffraction angle of $\theta_{a+}$ with the z-axis in FIG. 18.

The diffraction angle $\theta_{a+}$ is given as follows:

$$\sin \theta_{a+} = \sin \theta_{ai} + \lambda/p \quad (6)$$

On the other hand, the diffraction angle $\theta_{b-}$ of the ray of light $B_{-1}$, or the $-$first-order diffracted light ($-$first-order light) with respect to the ray of light B is given as follows:

$$\sin \theta_{b-} = \sin \theta_{bi} - \lambda/p \quad (7)$$

The light required to be observed is rays of light of 0th order (light of 0th order) in the diffracted light.

Therefore, to obtain the properly filtered image, the diffracted light of 0th order should be prevented from overlapping with another n-th order diffracted light.

To do this, the absolute value of the diffraction angle $\theta_{a+}$ of the ray of light $A_{+1}$ and that of the diffraction angle $\theta_{b-}$ of the ray of light $B_{-1}$ have to be greater than the angles the rays of light $B_0$ and $A_0$ constituting the light of 0th order form with the z-axis.

Thus, taking plus and minus into account, the following expressions must be satisfied:

$$\theta_{a+} > \theta_i + \theta_g \quad (8)$$

$$\theta_{b-} < -\theta_i + \theta_g \quad (9)$$

Equation (4) to expression (9) give the following expression:

$$\sin \theta_i \times \cos \theta_g < \lambda/2p \quad (10)$$

Accordingly, this gives expression (1):

$$\arctan(W_i/2f) < \arcsin(\lambda/2p \cos \theta_g) \quad (1)$$

The explanation has been given concerning the yz plane. The same holds true for the zx plane.

Therefore, if equation (1) is satisfied in each of pixels of the filtering section are arranged, light of 0th order will not overlap with the ±first-order light.

The above explanation has been given on the assumption that the filtering section is of the transmission type. The same holds true if the filtering section is of the reflection type.

In this case, when the z-axis is replaced with the z'-axis and the reflection of the diffracted light is considered in place of the transmission of the diffracted light, similar reasoning holds true.

In the optical system of FIG. 18, to amplify the diffraction angle of the ±first-order diffracted light and that of a higher-order diffracted light, the filtering section 1104 may be further provided with a diffraction grating placed adjacent to the front surface or back surface of the pixel structure.

In this case, to obtain a good diffraction, it is desirable that the pitch p of the diffraction grating should satisfy equation (2):

$$n \times q = p \quad (2)$$

where n is a natural number,
and that the pitch of the diffraction grating should align with the pitch of the filtering section.

In this case, it is necessary to take into account the pitch q of the diffraction grating in place of the pixel-to-pixel spacing p.

Thus, the condition to be satisfied is expression (3) in place of expression (1):

$$\arctan(W_i/2f) > \arcsin(\lambda/2q \cos \theta_g) \quad (3)$$

With this configuration, if expression (3) is satisfied in each of the directions of the x-axis and y-axis in which the pixels of the filtering section are arranged, or in other words, in each of the directions of the x-axis and y-axis in which, for example, the periodic structure of the diffraction grating is arranged, light of 0th order will not overlap with the ±first-order light.

Namely, diffracted light of 0th order never overlaps with another n-th order diffracted light.

Seventh Mode

An optical image processing apparatus according to a seventh mode of the present invention based on the above-described principle will be explained by reference to FIG. 19.

Figure 19:
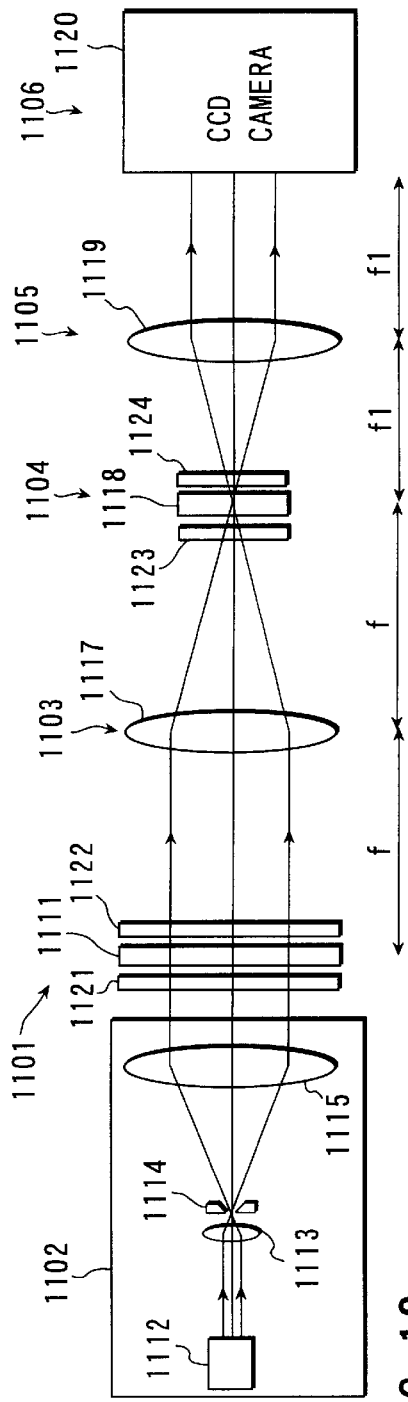
FIG. 19 shows the optical system of the optical information processing apparatus according to the seventh mode of the present invention.

As shown in FIG. 19, the optical image processing apparatus comprises an image display section 1101 for displaying an image to be processed, a read light generator section 1102 for generating read light to read the image, a Fourier transform optical system 1103 for obtaining the Fourier transform of the read image, a filtering section 1104 for filtering the image subjected to the Fourier transform, an inverse Fourier transform optical system 1105 for obtaining the inverse Fourier transform of the light filtered, and a filtering image acquiring section 1106 for acquiring the image subjected to the inverse Fourier transform.

The image display section 1101 is composed of an electrical address-type transmission liquid crystal 1111, a polarizer 1121 placed in front of the liquid crystal 1111, or on the read light generator section 1102 side, and an analyzer 1122 placed behind the liquid crystal 1111, or on the Fourier transform optical system 1103 side.

The read light generator section 1102 is composed of an He—Ne laser 1112 for emitting laser light, a condenser lens 1113 for gathering laser light, a pinhole 1114 placed in the focal plane of the condenser lens, and a collimate lens 1115 for collimating the laser light from the pinhole 1114.

The Fourier transform optical system 1103 is provided with a Fourier transform lens 1117 with a focal length of f.

The incident angle $\theta_g$ to the filtering section 1104 is set at 0 degree.

The filtering section 1104 is composed of an electrical address-type transmission liquid crystal 1118, a polarizer 1123 placed in front of the liquid crystal 1118, or on the Fourier transform optical system 1103 side, and an analyzer 1124 placed behind the liquid crystal 1118, or on the inverse Fourier transform optical system 1105 side.

The inverse Fourier transform optical system 1105 is provided with an inverse Fourier transform lens 1119 with a focal length of f1.

The filtering image acquiring section 1106 is provided with a CCD camera 1120.

The laser light emitted from the He-Ne laser 1112 is gathered by the condenser lens 1113. Then, the laser light passed through the pinhole 1114 is converted by the collimator lens 1115 into a bundle of parallel rays of light.

The bundle of parallel rays passes through the polarizer 1121, electrical-address-type transmission liquid crystal 1111, and analyzer 1122 in the image display section 1101, thereby reading the image displayed on the transmission liquid crystal 1111.

The light that has read the image is subjected to Fourier transform at the Fourier transform lens 1117 and passes through the polarizer 1123. Then, the Fourier transform image of the input image is formed on the display surface of the electrical-address-type transmission liquid crystal 1118 placed on the image plane behind the polarizer 1123.

The Fourier transform image formed on the display surface of the liquid crystal 1118 is superposed on the function displayed on the transmission-type liquid crystal 1118, thereby filtering the Fourier transform image.

The light filtered passes through the analyzer 1124, is subjected to inverse Fourier transform at the inverse Fourier transform lens 1119. Then, the filtered input image is picked up by the CCD camera 1120.

With the apparatus, the display size $W_i$ of the liquid crystal 1111, the wavelength $\lambda$ of the read light, the focal length f of the Fourier transform lens 1117, the minimum pixel-to-pixel spacing p of the liquid crystal 1118, the display size $W_f$ of the liquid crystal 1118, and the incident angle $\theta_g(=0)$ to the filtering section 1104 satisfy expression (1):

$$\arctan(W_i/2f) < \arcsin(\lambda/2p \cos \theta_g) \qquad (1)$$

Accordingly, the diffracted light of the order higher than the ±first order generated at the filtering section 1104 never overlaps with the diffracted light of 0th order.

As a result, the CCD camera 1120 can obtains the properly filtered image.

Modification

Figure 20:
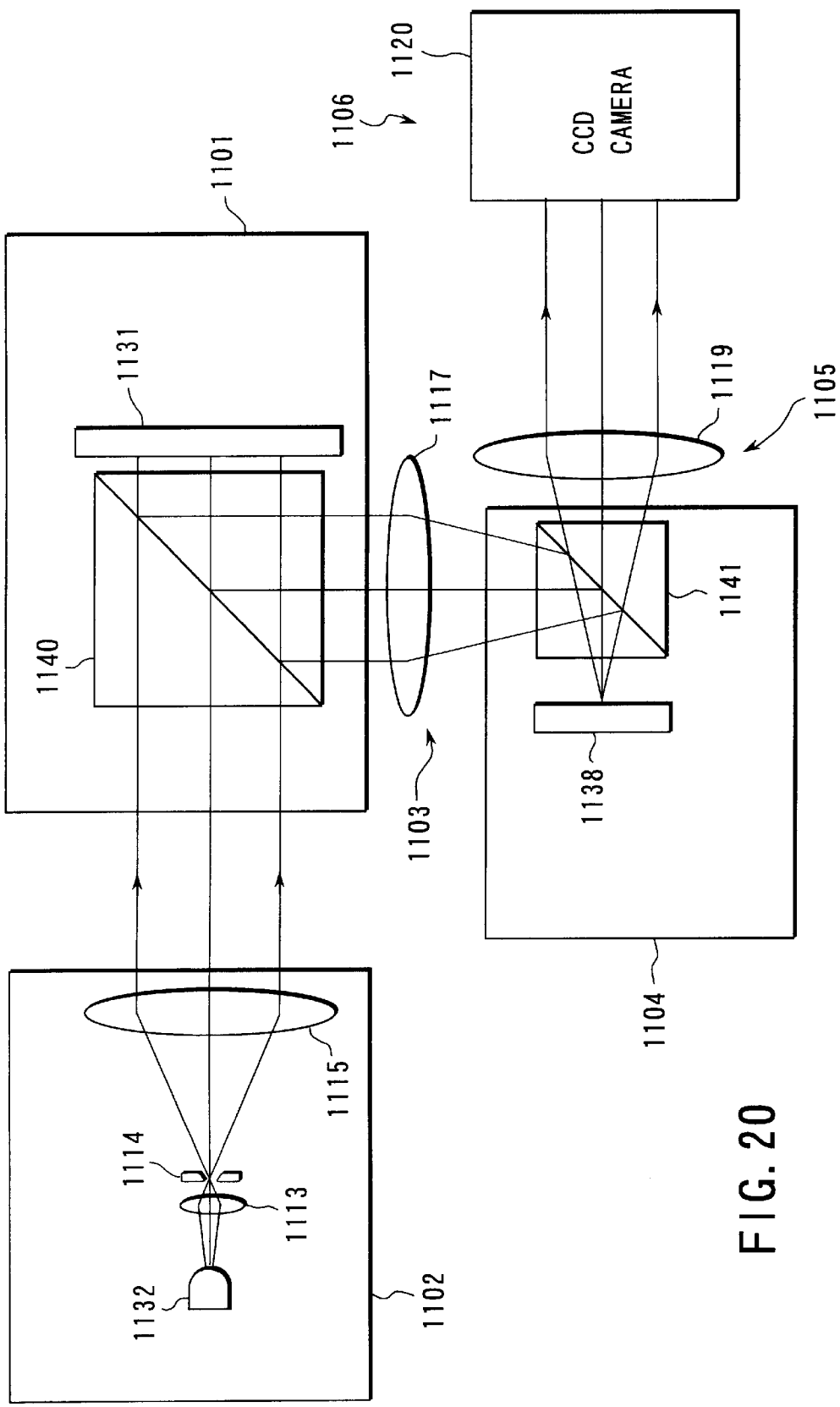
FIG. 20 shows the optical system of the optical image processing apparatus according to a modification of the seventh mode of the present invention.

A modification of the seventh mode of the present invention will be explained by reference to FIG. 20. The configuration of the modification differs from that of the seventh mode in the following points. The read light generator section 1102 includes a laser diode (LD) 1132 as a light source in place of the He—Ne laser.

The image display section 1101 includes a polarized beam splitter 1140 and an electrical-address-type reflection liquid crystal 1131.

The filtering section 1104 includes a polarized beam splitter 1141 and an electrical-address-type reflection liquid crystal 1138, with the incident angle to the liquid crystal 1138 being set at zero degree.

The remaining configuration is the same as that of the seventh mode of the present invention.

In the read light generator section 1102, the light of light emitted from the LD 1132 is gathered by the condenser lens 1113. Then, the light passed through the pinhole 1114 is converted by the collimate lens 1115 into a bundle of parallel rays of light.

The bundle of parallel rays generated at the read light generator section 1102 passes through the polarized beam splitter 1140 and is reflected by the electrical-address-type reflection liquid crystal 1131, thereby reading the image displayed on the liquid crystal 1131.

The light that has read the image is reflected by the polarized beam splitter 1140 and converted by the Fourier transform lens 1117 into a convergent light.

The convergent light is reflected by the polarized beam splitter 1141 and forms its Fourier transform image on the electrical-address-type reflection liquid crystal 1138 placed on the back focal plane of the Fourier transform lens 1117.

The liquid crystal 1138 displays a filtering function. The formed Fourier transform image is superposed on the filtering function, thereby filtering the image.

The filtered light reflected by the liquid crystal 1138 passes through the polarized beam splitter 1141 and is subjected to inverse Fourier transform at the inverse Fourier transform lens 1119. As a result, the filtered image is picked up by the CCD camera 1120.

With the apparatus, the display size $W_i$ of the liquid crystal 1131, the wavelength $\lambda$ of the read light, the focal length f of the Fourier transform lens 1117, the minimum pixel-to-pixel spacing p of the liquid crystal 1138, the display size $W_f$ of the liquid crystal 1138, and the incident angle $\theta_g(=0)$ to the filtering section 1104 satisfy expression (1):

$$\arctan(W_i/2f) < \arcsin(\lambda/2p \cos \theta_g) \qquad (1)$$

Accordingly, the diffracted light of the order higher than the ±first order generated at the filtering section 1104 never overlaps with the diffracted light of 0th order. As a result, the CCD camera 1120 can obtain the properly filtered image.

In the modification, because the image display section 1101 uses the reflection-type liquid crystal 1131, the filtering section 1104 uses the reflection-type liquid crystal 1138, and the optical axis is bent, the overall length of the apparatus is made shorter.

CONCRETE EXAMPLE 1

Under conditions where the input image displayed on the image display section 1101 uses 710×710 pixels of a 1024× 768 pixel XGA, its size $W_i$ is 20 mm, the size $W_f$ of the liquid crystal of the filtering section 1104 is 10 mm, its pixel-to-pixel spacing p is 20 μm, and the wavelength $\lambda$ used is 633 nm, since $\theta_g=0$, the condition the focal length f of the Fourier transform optical system has to satisfy is f>632 from expression (1).

Thus, for example, a lens with a focal length of f=650 mm should be used in the Fourier transform optical system.

Use of such a lens achieves an optical system which prevents the diffracted light of order zero from overlapping with another n-th order diffracted light, even if the input image displayed on the image display section 1101 is large.

CONCRETE EXAMPLE 2

Under conditions where the image display section 1101 has a 1024×768 pixel of the XGA and displays an image to be processed on 768×768 pixels, the size $W_i$ of the input image is 15 mm, the size $W_f$ of the liquid crystal of the filtering section 1104 is 10 mm, its pixel-to-pixel spacing p is 10 μm, and the wavelength $\lambda$ used is 690 nm, since $\theta_g=0$, the condition the focal length f of the Fourier transform optical system has to satisfy is f>218 from expression (1).

Thus, for example, a lens with a focal length of f=220 mm should be used in the Fourier transform optical system.

In concrete example 2, use of a liquid crystal with a small pixel-to-pixel spacing shortens the allowed value of the focal length f of the Fourier transform optical system remarkably.

This achieves a compact optical system which prevents the diffracted light of order zero from overlapping with another n-th order diffracted light.

Eighth Mode

An optical image processing apparatus according to an eighth mode of the present invention will be explained by reference to FIG. 21.

Figure 21:
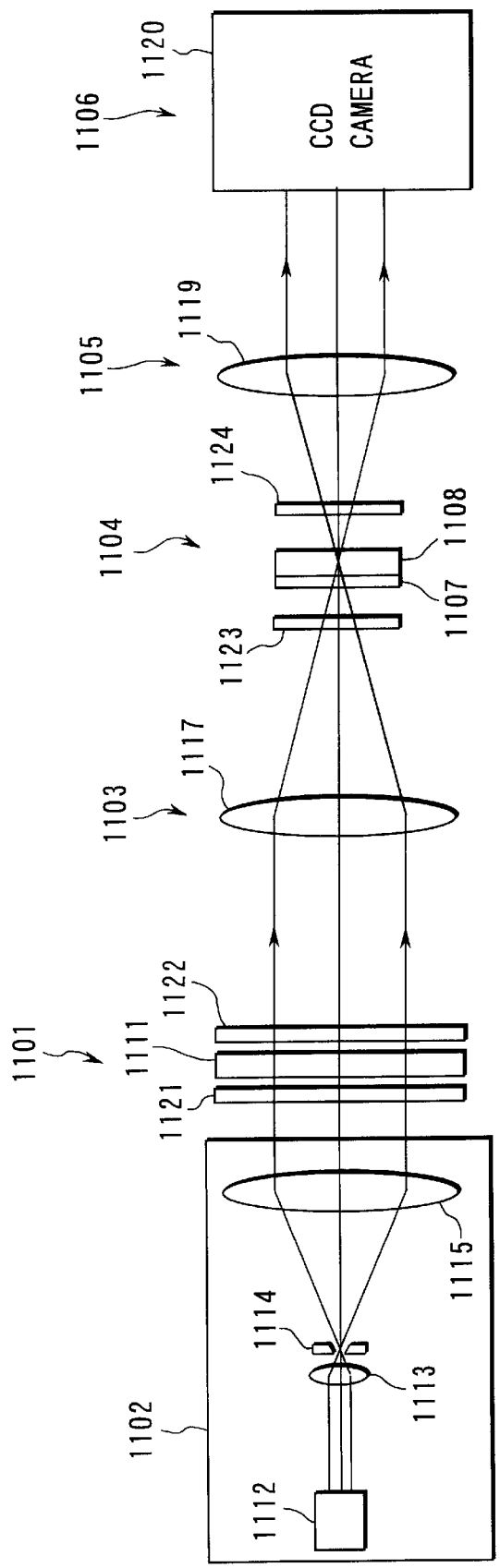
FIG. 21 shows the optical system of the optical image processing apparatus according to the eighth mode of the present invention.

As seen from FIG. 21, the optical image processing apparatus according to the eighth mode of the invention is the same as that of the seventh mode (FIG. 19) expect that the filtering section 1104 further includes a diffraction grating 1107 placed in front of the liquid crystal 1118. The diffraction grating 1107 has, for example, the same pitch q in each of the lateral and longitudinal directions. The pitch q satisfies equation (2) with respect to the pixel-to-pixel spacing p of the liquid crystal 1118:

$$n \times q = p \qquad (2)$$

Figure 22:
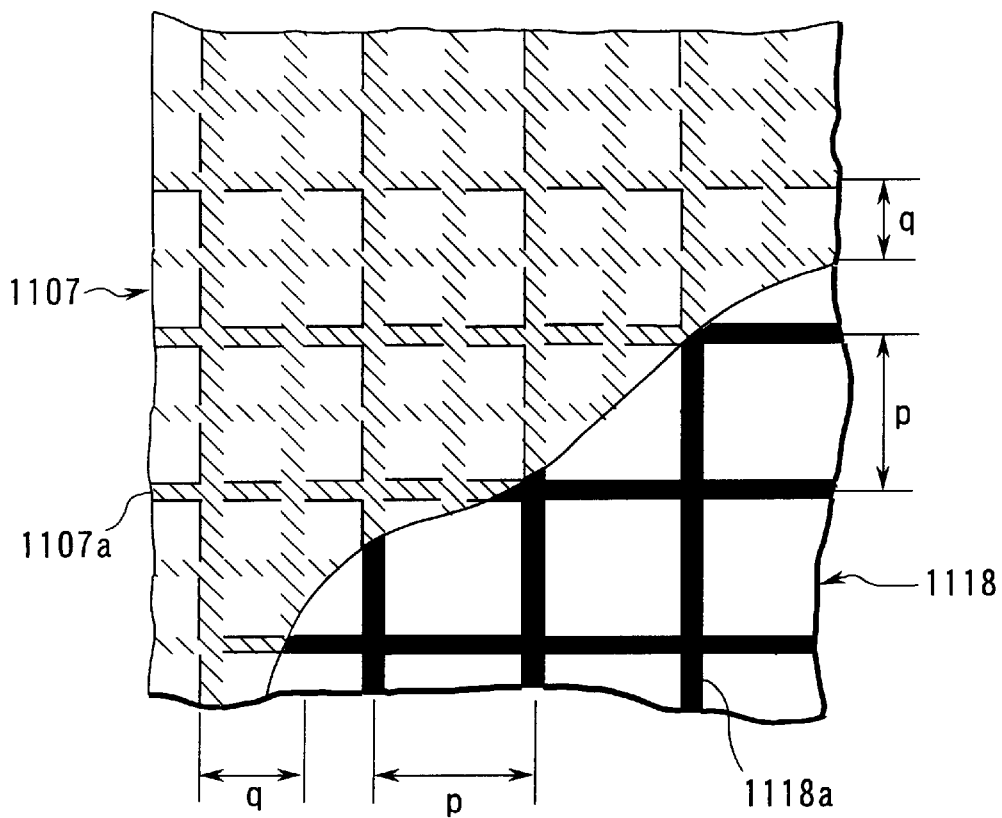
FIG. 22 shows the positional relationship between the liquid crystal and the diffraction grating in the optical image processing apparatus according to the eighth mode of the present invention.

For example, as shown in FIG. 22, the diffraction grating 1107 has a pitch of p equal to half the pixel-to-pixel spacing of the liquid crystal 1118.

The pitch q of the diffraction grating 1107 is determined by, for example, the spacing between its grooves 1107a. The pixel-to-pixel spacing p of the liquid crystal 1118 is determined by, for example, the spacing between the wires 1118 connected to the pixels.

The diffraction grating 1107 aligns with the pixels of the liquid crystal 1118 of the filtering section 1104.

This means that the diffraction grading 1107 is placed with respect to the liquid crystal 1118 in such a manner that the wires 1118a connected to the liquid crystal 1118 are superposed on the grooves 1107a of the diffraction grating 1107 in FIG. 22.

In FIG. 21, the read light, the bundle of parallel rays generated at the read light generator section 1102, reads the image displayed on the electrical-address-type transmission liquid crystal 1111 of the image display section 1101. The Fourier transform lens 1117 obtains the Fourier transform of the read image. The transformed image is then caused to enter the filtering section 1104.

The light that has entered the filtering section 1104 passes through the polarizer 1123 and enters the diffraction grating 1107.

The incident light is diffracted by the diffraction grating 1107 with a pitch of p and then is filtered by the liquid crystal 1118 acting as the filtering section.

As shown in FIG. 22, because the diffraction grading 1107 is placed with respect to the liquid crystal 1118 in such a manner that the wires 1118a connected to the pixels are superposed on the grooves 1107a of the diffraction grating 1107, the diffracted light propagates in the direction of diffraction caused by the pitch q of the diffraction grating 1107.

As in the seventh mode, the light of 0th order passes through the inverse Fourier transform lens 1119. Then, the filtered image is picked up by the CCD camera 1120 acting as the filtering image acquiring section 1106.

In the apparatus, the size $W_i$ of the liquid crystal 1111, the wavelength λ of the read light, the focal length f of the Fourier transform lens 1117, the pitch q of the diffraction grating 1107, the display size $W_f$ of the liquid crystal 1118, and the incident angle $\theta_g(=0)$ with the filtering section 1104 satisfy expression (3):

$$\arctan(W_i/2f) > \arcsin(\lambda/2q \cos \theta_g) \qquad (3)$$

Accordingly, the diffracted light of the order higher than the ±first order generated at the filtering section 1104 never overlaps with the diffracted light of 0th order.

As a result, the CCD camera 1120 can obtain the properly filtered image.

CONCRETE EXAMPLE 3

Under conditions where the size $W_i$ of the input image displayed on the liquid crystal 1111 acting as the image display section 1101 is 20 mm, the size $W_f$ of the liquid crystal 118 acting as the filtering section 1104 is 5 mm, its pixel-to-pixel spacing p is 5 μm, the pitch q of the diffraction grating 1120 is 1 μm, and the wavelength λ used is 633 nm, the condition the focal length f of the Fourier transform optical system has to satisfy is f>30 mm from expression (3).

On the other hand, since the pixel-to-pixel spacing p of the liquid crystal 1111 on which the input image is displayed is 15 μm, performing Fourier transform widens the spatial frequency components to a region of f×λ/p. To cope with the entire area of the liquid crystal 1118 acting as the filtering section, the equation $f=(W_f/2) \times p/\lambda = 59.24$ mm has to be satisfied.

Thus, for example, a lens with a focal length of f=60 mm should be used in the Fourier transform optical system.

Use of such a diffraction grating achieves a more compact optical system than that of concrete example 1, which prevents the diffracted light of 0th order from overlapping with another n-th order diffracted light, regardless of the pixel-to-pixel spacing of the liquid crystal 1118 of the filtering section.

Ninth Mode

An optical image processing apparatus according to a ninth mode of the present invention will be explained by reference to FIG. 23.

Figure 23:
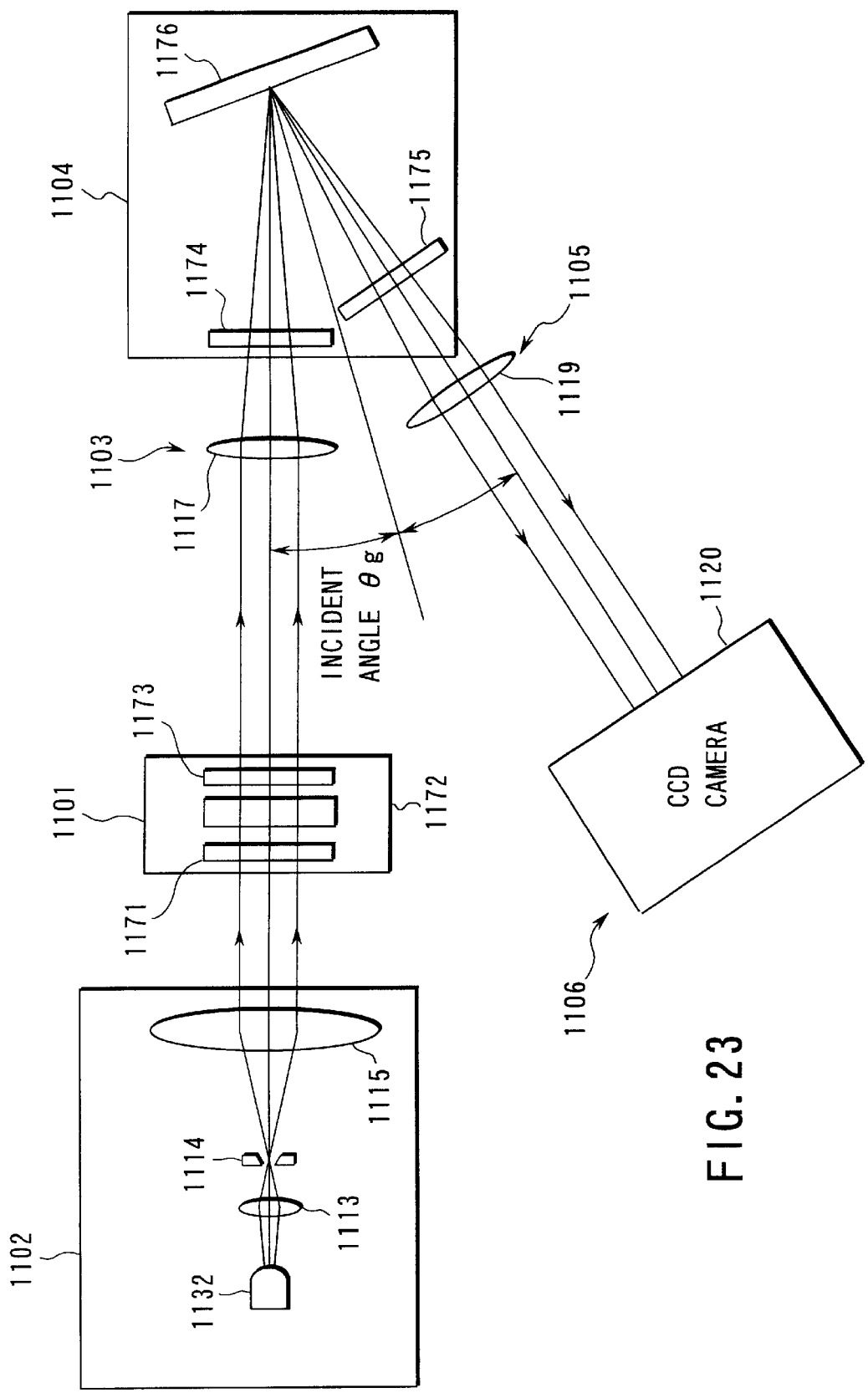
FIG. 23 shows the optical system of the optical image processing apparatus according to the ninth mode of the present invention.
Figure 24:
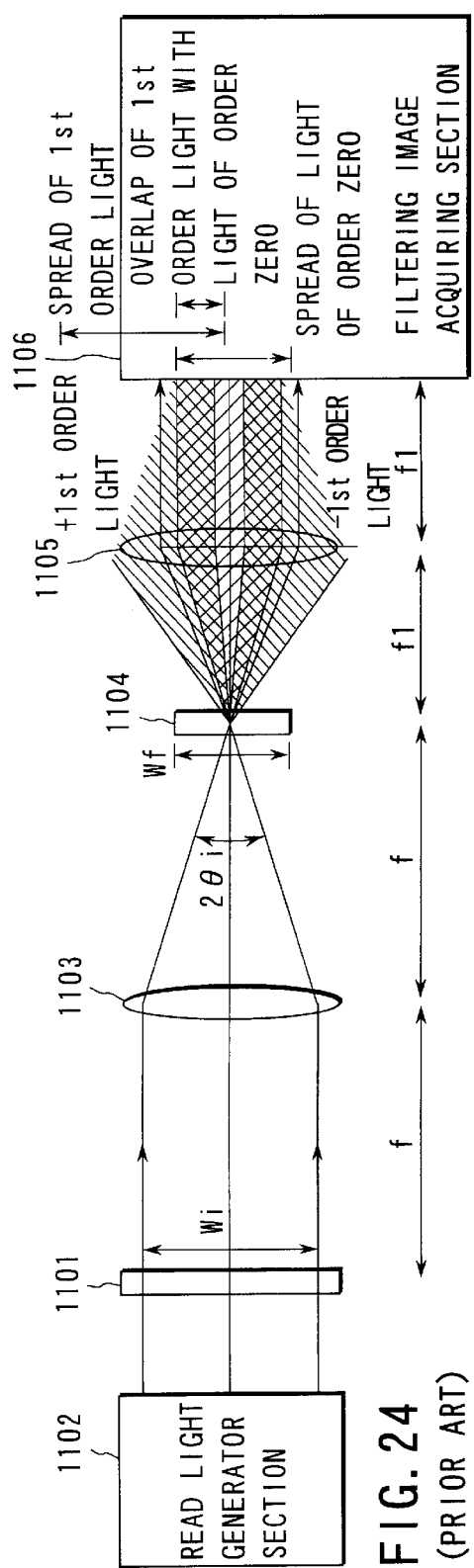
FIG. 24 schematically shows the optical system of a conventional optical image processing apparatus.

As shown in FIG. 23, the image display section 1101 is composed of an electrical-address-type transmission liquid crystal 1171 and a polarizer 1171 and an analyzer 1173 placed in front of and behind the liquid crystal 1172, respectively.

The read light generator section 1102 is composed of a laser diode (LD) 1132, a condenser lens 1113 for gathering laser light, a pinhole 1114 provided at the focal plane of the lens 1113, and a collimate lens 1115 for collimating the laser light from the pinhole 1114.

The filtering section 1104 is composed of an electrical-address-type reflection liquid crystal 1176, a polarizer 1174 placed in front of the liquid crystal 1176, and an analyzer 1175.

The Fourier transform optical system 1103 is composed of a Fourier transform lens 1117 with a focal length of f.

The inverse Fourier transform optical system 1105 is composed of an inverse Fourier transform lens 1119 with a focal length of f1.

The filtering image acquiring section 1106 is composed of a CCD camera 1120.

In the optical system, the incident angle $\theta_g$ to the filtering section 1104, more specifically, the incident angle $\theta_g$ to the liquid crystal 1176 of the filtering section 1104, is set to a value other than zero degree.

The laser light emitted by the LD 1132 is gathered by the condenser lens 1113. The light passed through the pinhole 1114 provided in the focal plane of the lens 1113 is converted by the collimate lens 1115 into a bundle of parallel rays.

The bundle of parallel rays reads the image displayed on the image display section 1101.

The light that has read the image is subjected to Fourier transform at the Fourier transform lens 1117 and then is caused to enter the filtering section 1104.

The light going into the filtering section 1104 passes through the polarizer 1174 and strikes at an incident angle of $\theta_g$ the electrical-address-type reflection liquid crystal 1176 placed in the image plane behind the polarizer 1174, thereby forming the Fourier transform image of the input image on the surface of the liquid crystal 1176.

The Fourier transform image formed on the display surface of the liquid crystal 1176 is superposed on the function displayed on the liquid crystal 1176, thereby filtering the Fourier transform image.

The filtered light is reflected at a reflection angle of $\theta_g$, passes through the analyzer 1175, and is subjected to inverse Fourier transform at the inverse Fourier transform lens 1119 acting as the inverse Fourier transform optical system 1105. The result is picked up by the CCD camera 1120 acting as the filtering image acquiring section 1106.

In the apparatus, the display size $W_i$ of the liquid crystal 1172, the wavelength $\lambda$ of the read light, the focal length f of the Fourier transform lens 1117, the minimum pixel-to-pixel spacing p of the liquid crystal 1176, the display size $W_f$ of the liquid crystal 1176, and the incident angle $\theta_g$ to the liquid crystal 1176 satisfy expression (1):

$$\arctan(W_i/2f) < \arcsin(\lambda/2p \cos \theta_g) \quad (1)$$

Thus, the diffracted light of the order higher than the ± first order generated at the filtering section 1104 never overlaps with the diffracted light of 0th order.

As a result, the CCD camera 1120 can obtain the properly filtered image.

With the apparatus, because the filtering section 1104 uses the reflection-type liquid crystal 1176 and the optical axis is bent, the overall length of the apparatus is made shorter.

CONCRETE EXAMPLE 4

Under conditions where the size $W_i$ of the input image displayed on the electrical-address-type transmission liquid crystal 1172 acting as the image display section 1101 is 10 mm, the size $W_f$ of the electrical-address-type transmission liquid crystal 1176 acting as the filtering section 1104 is 5 mm, its pixel-to-pixel spacing p is 15 $\mu$m, and the wavelength $\lambda$ used is 690 nm, and the incident angel $\theta_g$ is −30 degrees, the condition the focal length f of the Fourier transform optical system has to satisfy is f≧189 mm from expression (1).

Thus, for example, a lens with a focal length of f=190 mm should be used in the Fourier transform optical system.

As a result, it is possible to achieve an optical system which prevents the diffracted light of 0th order from overlapping with another n-th order diffracted light, even when the input image displayed on the image display section 1101 is large and the light that read the input image is caused to enter the filtering section diagonally.

Although the seventh to ninth modes have been explained concretely by reference to the figures, the present invention is not restricted to these modes and may be practiced or embodied in still other ways without departing from the spirit or essential character thereof.

For example, while in the above modes, liquid crystal has been used for the image display section and filtering section, spatial optical modulators with another pixel structure may be used instead.

The optical systems may be arranged in a cascade manner and more than one filtering may be used as the first to sixth modes above described. This arrangement enables not only a single filtering process but also more complex filtering processes.

Furthermore, the optical systems may be arranged in parallel. This arrangement enables filtering processes to be executed simultaneously.

With the invention in the seventh to ninth modes, it is possible to provide an optical image processing apparatus capable of obtaining the properly filtered image, while coping with both of the trend to make the input image larger and the trend to make the apparatus more compact, to overcome disadvantages in the prior art.

Tenth Mode

Next, referring to the accompanying drawings, a tenth mode of the present invention will be explained.

In the image processing apparatus according to the tenth mode of the present invention, a case where a nonlinear filter is used as a contrast ratio correcting section will be explained by reference to FIG. 28.

Figure 25:
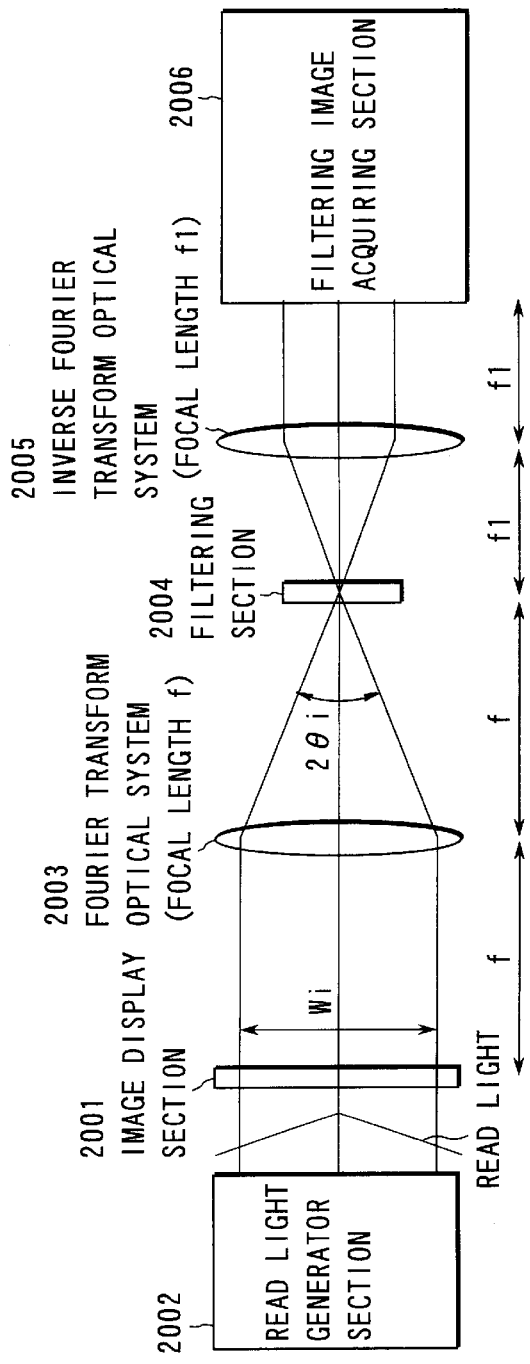
FIG. 25 schematically shows a conventional optical information processing apparatus of FIG. 37 to help explain the problem an optical image processing apparatus according to any of a tenth to a twelfth mode of the present invention tries to solve.

The basic configuration of the image processing apparatus according to the tenth mode of the invention is such that a contrast ratio correcting section 2007 including a nonlinear filter 2100 is placed in the vicinity of (or in FIG. 28, in front of) the filtering section 2004 or in a position conjugate with the Fourier transform surface, in addition to the conventional optical systems in FIG. 25.

The nearly parallel collimate light generated by the read light generator section 2002 reads the image displayed on the image display section 2001. Then, the Fourier transform optical system 2003 forms its Fourier transform image on the filter surface of the filtering section placed in the focal plane behind the optical system 2003.

The contrast ratio correcting section 2007 uses a combination of the nonlinear filter 2100 and a control light source 2101.

The transmittance of the nonlinear filter 2100 used is characterized in that the transmittance decreases as the amount of light entering the filter increases as shown in FIG. 27A.

Therefore, the amount of light in the region of almost no spatial frequency component in the Fourier transform image is set so as to be about I1 in FIG. 27A. With this setting, all the amount of light in the region of almost no spatial frequency component passes through without being cut off and reaches the filtering section 2004.

In this case, however, turning on the control light source 2101 and raising the amount of light to I2 enables the nonlinear filter 2100 to cut off the region of almost no spatial frequency component. This corrects the insufficient contrast ratio at the filtering section 2004.

The light whose contrast ratio has been corrected enters the filtering section 2004, which effects more accurate filtering.

The filtered light enters the inverse Fourier transform optical system 2005, which performs inverse Fourier transform and forms an inverse Fourier transform image. The result is picked up by the filtering image acquiring section 2006.

(Effect)

With the above configuration, even if the light in the region of almost no spatial frequency component were not cut off sufficiently because of the insufficient contrast of the filtering section, use of the additional section for cutting the components would be able to make the result of filtering approach the ideal more, enabling high-accuracy filtering.

Specifically, the contrast ratio correcting section is composed of a filter whose transmittance makes a nonlinear change with the amount of incident light.

First Embodiment

A first embodiment of the tenth mode of the present invention will be explained by reference to FIG. 29.

Figure 29:
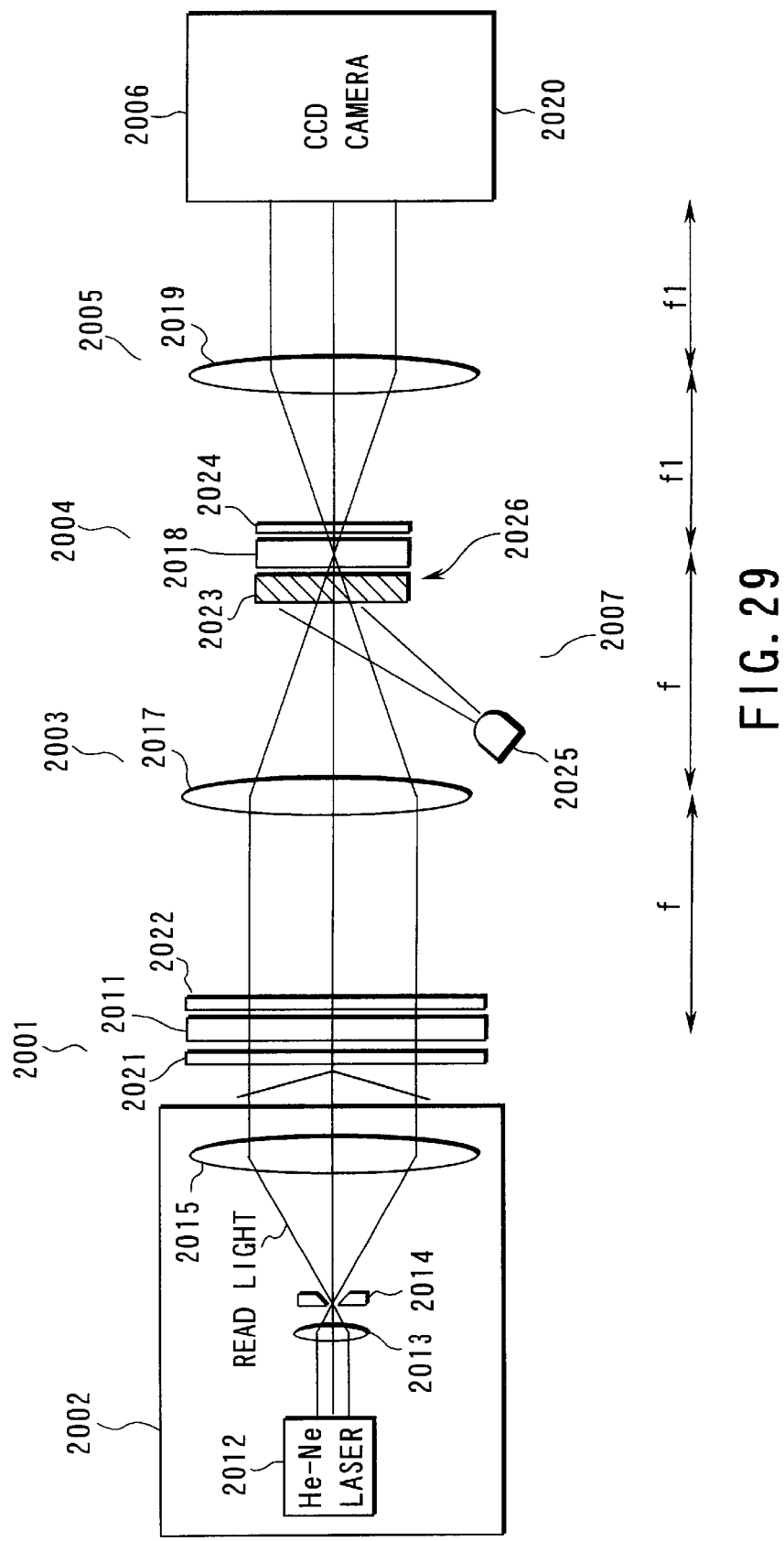
FIG. 29 shows the configuration of a first embodiment of the optical image processing apparatus according to the tenth mode of the present invention.

In FIG. 29, the image display section 2001 is composed of an electrical-address-type transmission liquid crystal 2011, a polarizer 2021, and an analyzer 2022. The read light generator section 2002 is composed of an He—Ne laser 2012, a condenser lens 2013, a pinhole 2014, and a collimate lens 2015. The Fourier transform optical system 2003 is composed of a Fourier transform lens 2017 with a focal length of f. The filtering section 2004 is composed of an electrical-address-type transmission liquid crystal 2018, a polarizer 2023, and an analyzer 2024. The inverse Fourier transform optical system is composed of an inverse Fourier transform lens 2019 with a focal length of f1. The filtering image acquiring section 2006 is composed of a CCD camera 2020.

The contrast ratio correcting section 2007 is composed of a silver oxide filter 2026 and a laser diode (LD) 2025 acting as the control light source 2101. The filter 2026 acts as the nonlinear filter 2100 whose transmittance varies with the amount of incident light.

The laser emitted from the He—Ne laser 2012 is gathered by the condenser lens 2013, passes through the pinhole 2014, and is converted by the collimate lens 2015 into collimate light.

The collimate light passes through the polarizer 2021, electrical-address-type transmission liquid crystal 2011, and analyzer 2022 in the image display section 2001, thereby reading the image displayed on the transmission liquid crystal 2011.

The light that has read the image enters the Fourier transform optical system 2003 and is subjected to Fourier transform at the Fourier transform lens 2017 with a focal length of f. Then, the transformed light enters the silver oxide filter 2026 acting as the contrast ratio correcting section 2007 placed near the focal plane behind the lens 2017.

Since the silver oxide filter 2026 presents a nonlinear characteristic to the incident light as shown in FIG. 27A, the incident light is adjusted to be at about I1 shown in FIG. 27A. When rays of light in the region of almost no spatial frequency component are required to be cut off, or when high-pass filtering is needed to be done, the LD 2025 is turned on and the amount of light in the region of almost no spatial frequency component is set at I2.

Conversely, to cut off high spatial frequency components as in low-pass filtering, the LD 2025 is kept off and is controlled so as to permit all the light to pass through, thereby correcting the contrast ratio.

The light modulated this way passes through the polarizer 2023 and forms the Fourier transform image of the input image on the surface of the electrical-address-type transmission liquid crystal 2018 placed behind the polarizer 2023.

The Fourier transform image formed on the display surface of the transmission-type liquid crystal 2018 is superposed on the function displayed on the liquid crystal 2018, thereby filtering the image. The filtered image passes through the analyzer 2024. The result is inputted to the inverse Fourier transform optical system 2005.

The light inputted to the inverse Fourier transform optical system 2005 is subjected to inverse Fourier transform at the inverse Fourier transform lens 2019. Then, the result of filtering the input image is picked up by the CCD camera 2020 acting as the filtering image acquiring section 2006.

Use of the contrast ratio correcting section 2007 on top of the filtering section 2004 enables various types of high-accuracy filtering to be effected with a simple configuration.

Second Embodiment

Figure 30:
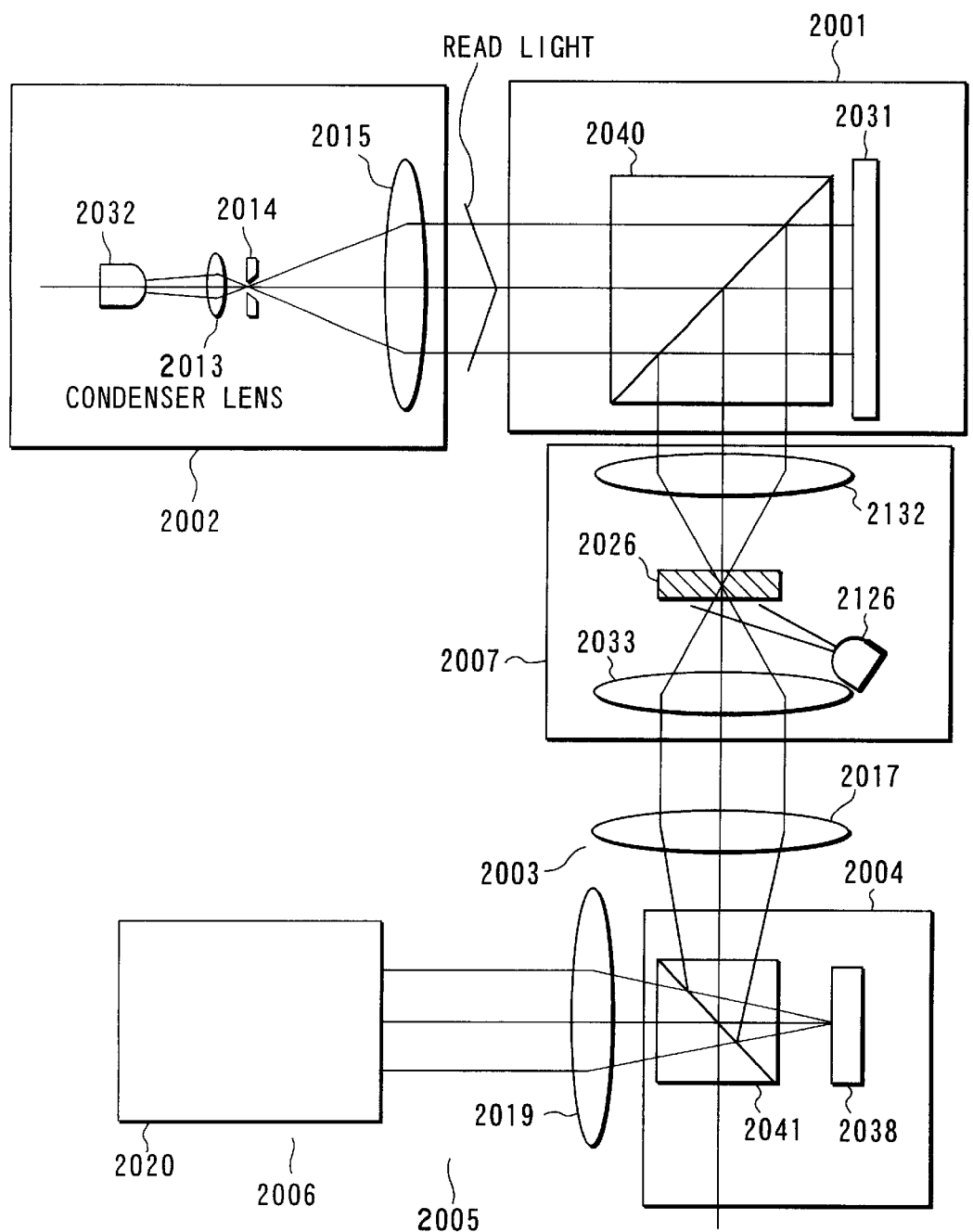
FIG. 30 shows the configuration of a second embodiment of the optical image processing apparatus according to the tenth mode of the present invention.

A second embodiment of the tenth mode of the present invention will be explained by reference to FIG. 30.

By comparison with the first embodiment, in the second embodiment, the He—Ne laser of the read light generator section 2002 is composed of a laser diode (LD) 2032, the image display section 2001 is composed of a polarized beam splitter 2040 and an electrical-address-type reflection liquid crystal 2031, the filtering section 2004 is composed of a polarized beam splitter 2041 and an electrical-address-type reflection liquid crystal 2038, and the contrast ratio correcting section 2007 is composed of a Fourier transform lens 2132, a silver oxide filter 2026, an inverse Fourier transform lens 2033, and a light-emitting diode (LED) 2126.

In the read light generator section 2002, the light emitted from the LD 2032 is gathered by the condenser lens 2013, passes through the pinhole 2014, and is converted by the collimate lens 2015 into collimate light.

The collimate light generated at the read light generator section 2002 passes through the polarized beam splitter 2040, enters the electrical-address-type reflection liquid 2031, and reads the image displayed on the reflection-type liquid crystal 2031.

The light that has read the image is reflected by the polarized beam splitter 2040 and enters the contrast ratio correcting section 2007.

The light entering the contrast ratio correcting section 2007 goes into the Fourier transform lens 2132 and forms the Fourier transform image of the incident light on the silver oxide filter 2026 located in the focal plane behind the lens 2132.

Combining the silver oxide filter 2026 with the LED 2126 makes it possible to correct the insufficient contrast ratio of the single filtering section 2004.

The modulated light enters the inverse Fourier transform lens 2033, which performs inverse Fourier transform. Then, the transformed light enters the Fourier transform lens 2017 constituting the Fourier transform optical system.

The light entering the Fourier transform lens 2017 is reflected by the polarized beam splitter 2041 and forms a Fourier transform image again on the electrical-address-type reflection liquid crystal 2038 located in the focal plane behind the Fourier transform lens.

When filtering is done using a high-pass filter, the formed Fourier transform image is an image obtained by decreasing the amount of light in the light-cutoff area beforehand at the contrast ratio correcting section 2007.

The corrected image is superposed on the function displayed on the reflection-type liquid crystal 2038, thereby effecting more accurate filtering.

The filtered light is reflected by the liquid crystal 2038, passes through the polarized beam splitter 2041, and enters the inverse Fourier transform lens 2019.

The light entering the inverse Fourier transform lens 2019 is subjected to inverse Fourier transform. The result of filtering is picked up by the CCD camera 2020.

With the second embodiment, placing the contrast ratio correcting section 2007 in a position conjugate with the filtering section 2004 makes it possible to correct the contrast ratio more accurately without being affected by the optical system of the filtering section 2004, which enables various types of filtering.

While in the first and second embodiments, the silver oxide filter 2026 has been used as the nonlinear filter, another type of nonlinear filter with a similar characteristic may be used. Even in the case of materials with the opposite characteristic that allows more light to pass through as the luminous intensity is higher and reflect more as it is lower, such as materials of the antimony family or photochromic family, they may be used in a similar manner, provided that the optical system is modified suitably.

Eleventh Mode

Figure 31:
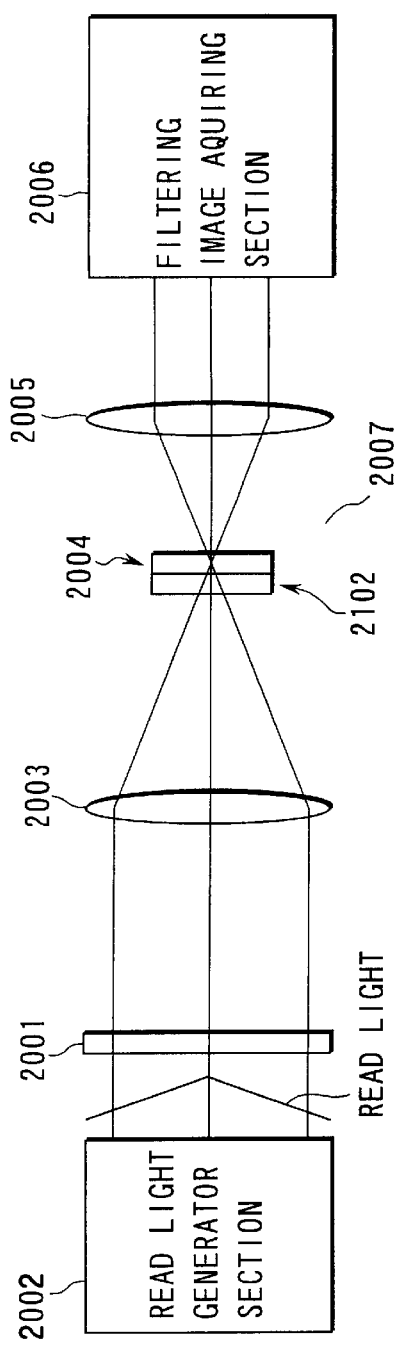
FIG. 31 shows the configuration when a spatial optical modulator is used as the contrast ratio correcting section in the optical image processing apparatus according to the eleventh mode of the present invention.

An image processing apparatus according to an eleventh mode of the present invention will be explained using a case where a spatial optical modulator 2102 is used for the filtering correcting section by reference to FIG. 31.

The basic configuration is such that the spatial optical modulator 2102 acting as the contrast ratio correcting section 2007 is placed near (in the figure, in front of) the filtering section 2004 or in a position conjugate with the Fourier transform surface.

The nearly parallel collimate light generated at the read light generator section 2002 reads the image displayed on the image display section 2001. In the Fourier transform optical system 2003, its Fourier transform image passes through the contrast ratio section 2007 and appears on the filter surface of the filtering section 2004 located in the focal plane behind the contrast ratio section 2007.

In the contrast ratio correcting section 2007, the spatial optical modulator 2102 cuts off the region the filtering section 2004 cannot cut off light sufficiently.

For example, to effect filtering as a high-pass filter that cuts off the region of almost no frequency, such a function as shown in FIG. 26E as allows the spatial optical modulator of the contrast ratio correcting section 2007 to filter the region of almost no spatial frequency component is displayed, thereby lowering the amount of light in that part beforehand, which provides such a high contrast ratio that the next filtering section 2004 can cope with it.

It is apparent that placing the spatial optical modulator 2102 behind the filtering section 2004 produces almost the same effect.

As described above, filtering is done by the spatial optical modulator 2102 in advance. The corrected light whose contrast ratio has been corrected is further filtered by the filtering section 2004. The filtered light enters the inverse Fourier transform optical system 2005.

The light subjected to the inverse Fourier transform forms the inverse Fourier transform image, or the result of filtering, in the focal plane behind. Then, the filtering image acquiring section 2006 obtains the resulting image.

(Effect)

With the above configuration, for example, a filter whose transmittance makes a nonlinear change with the amount of incident light as shown in FIG. 27A is caused to act on the vicinity of the Fourier transform surface as the contrast ratio correcting section.

Use of such a filter as the contrast ratio correcting section allows spatial frequency components with a small amount of light to pass through, which decreases the amount of light remarkably in the region where the amount of light insufficiently cut off is large.

Thus, such an optical information processing apparatus enables the result of filtering to approach the ideal substantially.

Specifically, the contrast ratio correcting section is composed of a spatial optical modulator.

First Embodiment

Figure 32:
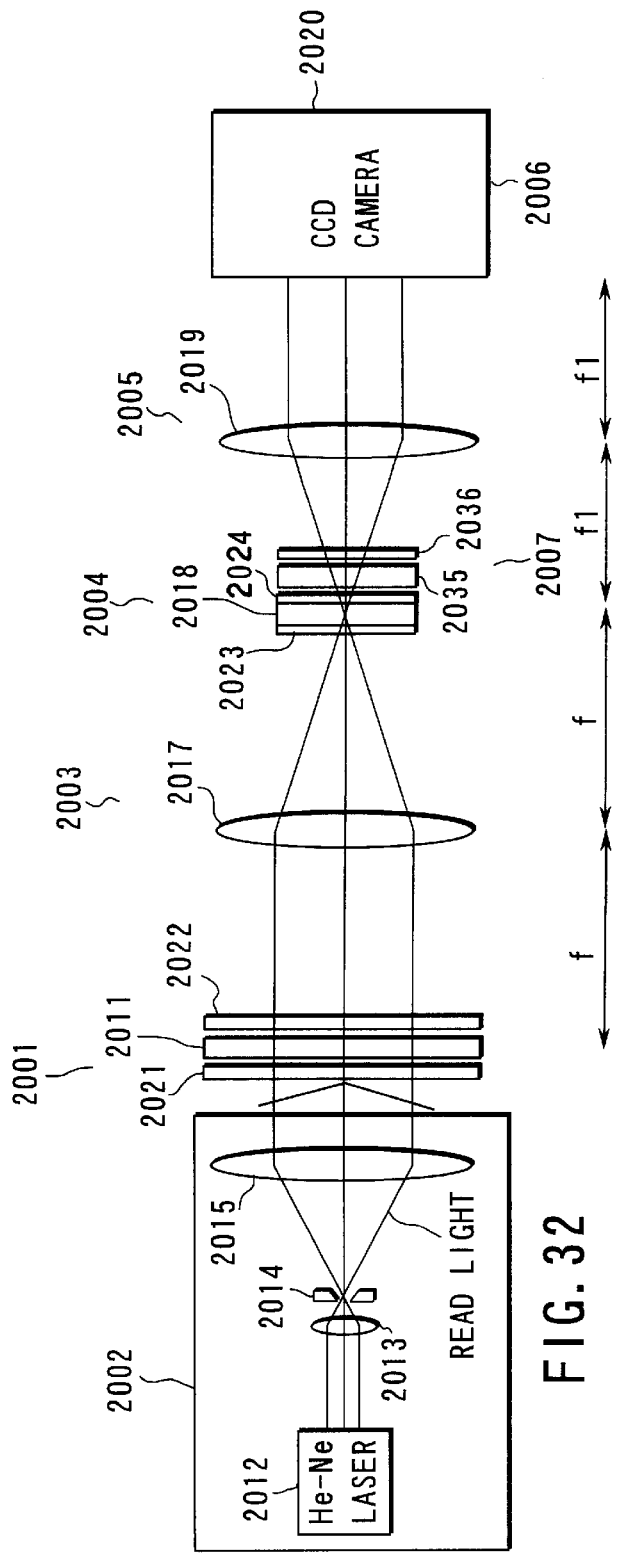
FIG. 32 shows the configuration of a first embodiment of the optical image processing apparatus according to the eleventh mode of the present invention.

A first embodiment of the eleventh mode of the present invention will be explained by reference to FIG. 32.

In the first embodiment, the image display section 2001 is composed of an electrical-address-type transmission liquid crystal 2011, a polarizer 2021, and an analyzer 2022. The read light generator section 2002 is composed of an He-Ne laser 2012, a condenser lens 2013, a pinhole 2014, and a collimate lens 2015. The Fourier transform optical system 2003 is composed of a Fourier transform lens 2017 with a focal length of f. The filtering section 2004 is composed of an electrical-address-type transmission liquid crystal 2018, a polarizer 2023, and an analyzer 2024. The inverse Fourier transform optical system is composed of an inverse Fourier transform lens 2019 with a focal length of f1. The filtering image acquiring section 2006 is composed of a CCD camera 2020.

The contrast ratio correcting section 2007 is composed of an electrical-address-type transmission liquid crystal 2034 and an analyzer 2036.

The laser emitted from the He—Ne laser 2012 is gathered by the condenser lens 2013, passes through the pinhole 2014, and is converted by the collimate lens 2015 into collimate light.

The collimate light passes through the polarizer 2021, electrical-address-type transmission liquid crystal 2011, and analyzer 2022 in the image display section 2001, thereby reading the image displayed on the transmission liquid crystal 2011.

The light that has read the image enters the Fourier transform optical system 2003 and is subjected to Fourier transform at the Fourier transform lens 2017 with a focal length of f. Then, the transformed light passes through the polarizer 2023 and forms the Fourier transform image of the input image on the display surface of the electrical-address-type transmission liquid crystal 2018.

The Fourier transform image formed on the display surface of the transmission-type liquid crystal 2018 is superposed on the function displayed on the liquid 2018, thereby filtering the image.

The image filtered by the liquid crystal 2018 passes through the analyzer 2024, enters the liquid crystal 2035 acting as the contrast ratio correcting section 2007, and passes through the analyzer 2036.

The liquid crystal 2018 of the filtering section 2006 filters the insufficiently filtered region again.

For example, when the region of almost no spatial frequency component is cut off as in high-pass filtering, the liquid crystal 2018 of the filtering section 2004 might not be able to cut off the region of almost no spatial frequency component because of the insufficient contrast ratio. In that case, the liquid crystal 2035 of the contrast ratio correcting section 2007 cuts off the region again, thereby effecting highly accurate filtering.

The light accurately filtered is inputted to the inverse Fourier transform optical system 2005.

The light inputted to the inverse Fourier transform optical system 2005 is subjected to inverse Fourier transform at the inverse Fourier transform lens 2019. Then, the result of filtering the input image is picked up by the CCD camera 2020 acting as the filtering image acquiring section 2006.

Use of the contrast ratio correcting section 2007 on top of the filtering section 2004 enables various types of high-accuracy filtering to be effected with a compact optical system.

Second Embodiment

Figure 33:
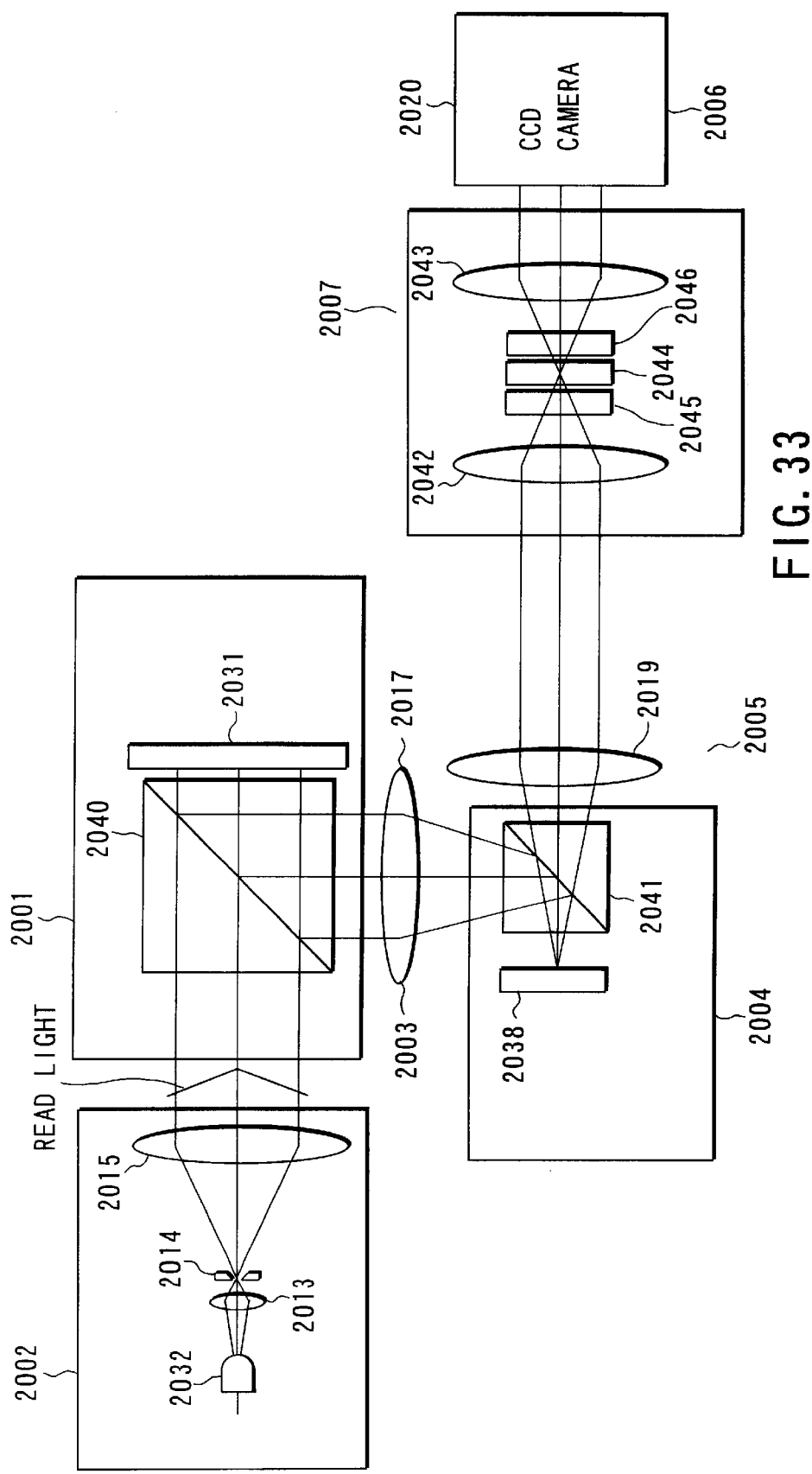
FIG. 33 shows the configuration of a second embodiment of the optical image processing apparatus according to the eleventh mode of the present invention.

A second embodiment of the eleventh mode of the present invention will be explained by reference to FIG. 33.

By comparison with the first embodiment of the eleventh mode, in the second embodiment, the He-Ne laser of the read light generator section 2002 is composed of a laser diode (LD) 2032, the image display section 2001 is composed of a polarized beam splitter 2040 and an electrical-address-type reflection liquid crystal 2031, the filtering section 2004 is composed of a polarized beam splitter 2041 and an electrical-address-type reflection liquid crystal 2038, and the contrast ratio correcting section 2007 is composed of a Fourier transform lens 2042, a polarizer 2045, an electrical-address-type transmission liquid crystal 2044, an analyzer 2046, and an inverse Fourier transform lens 2043, with the contrast ratio correcting section being apart from the filtering section.

In the read light generator section 2002, the light emitted from the LD 2032 is gathered by the condenser lens 2013, passes through the pinhole 2014, and enters the collimate lens 2015, which produces nearly parallel read light or collimate light.

The read light generated at the read light generator section 2002 passes through the polarized beam splitter 2040, enters the electrical-address-type reflection liquid crystal 2031, and reads the image displayed on the liquid crystal 2031.

The light that has read the image is reflected by the polarized beam splitter 2040 and enters the Fourier transform lens 2017 of the Fourier transform optical system 2003.

The light entering the Fourier transform lens 2017 is reflected by the polarized beam splitter 2041 and forms the Fourier transform image on the electrical-address-type reflection liquid crystal 2038 located in the back focal plane of the Fourier transform lens in such a manner that its image display surface aligns with the focal plane.

The Fourier transform image is superposed on the function displayed on the liquid crystal 2038, thereby filtering the image.

The filtered light is reflected by the liquid crystal 2038, passes through the polarized beam splitter 2041, and enters the inverse Fourier transform lens 2019.

The light entering the inverse Fourier transform lens 2019 is subjected to inverse Fourier transform and enters the contrast ratio correcting section 2007.

The light subjected to inverse Fourier transform is subjected to Fourier transform again at the Fourier transform lens 2042, passes through the polarizer 2045, and forms the Fourier transform image on the transmission-type liquid crystal 2044 located in the back focal plane of the Fourier transform lens 2042.

The formed Fourier transform image is the image filtered at the filtering section 2004. In filtering to cut off the region of almost no spatial frequency component, such as high-pass filtering, the reflection-type liquid crystal 2038 of the filtering section 2004 might not effect sufficient filtering.

Thus, the electrical-address-type transmission liquid crystal 2044 effects complementary filtering to cut off light sufficiently.

The complementarily filtered light passes through the inverse Fourier transform lens 2043. Then, the filtered image is picked up by the CCD camera 2020 acting as the filtering image acquiring section 2006 placed in such a manner that the image pickup surface aligns with the focal plane behind the lens 2035.

With the second embodiment, placing the contrast ratio correcting section 2007 in another position conjugate with the filtering section 2004 makes it possible to correct the contrast ratio more accurately without being affected by the optical system of the filtering section 2004, which enables various types of filtering.

Twelfth Mode

Figure 34:
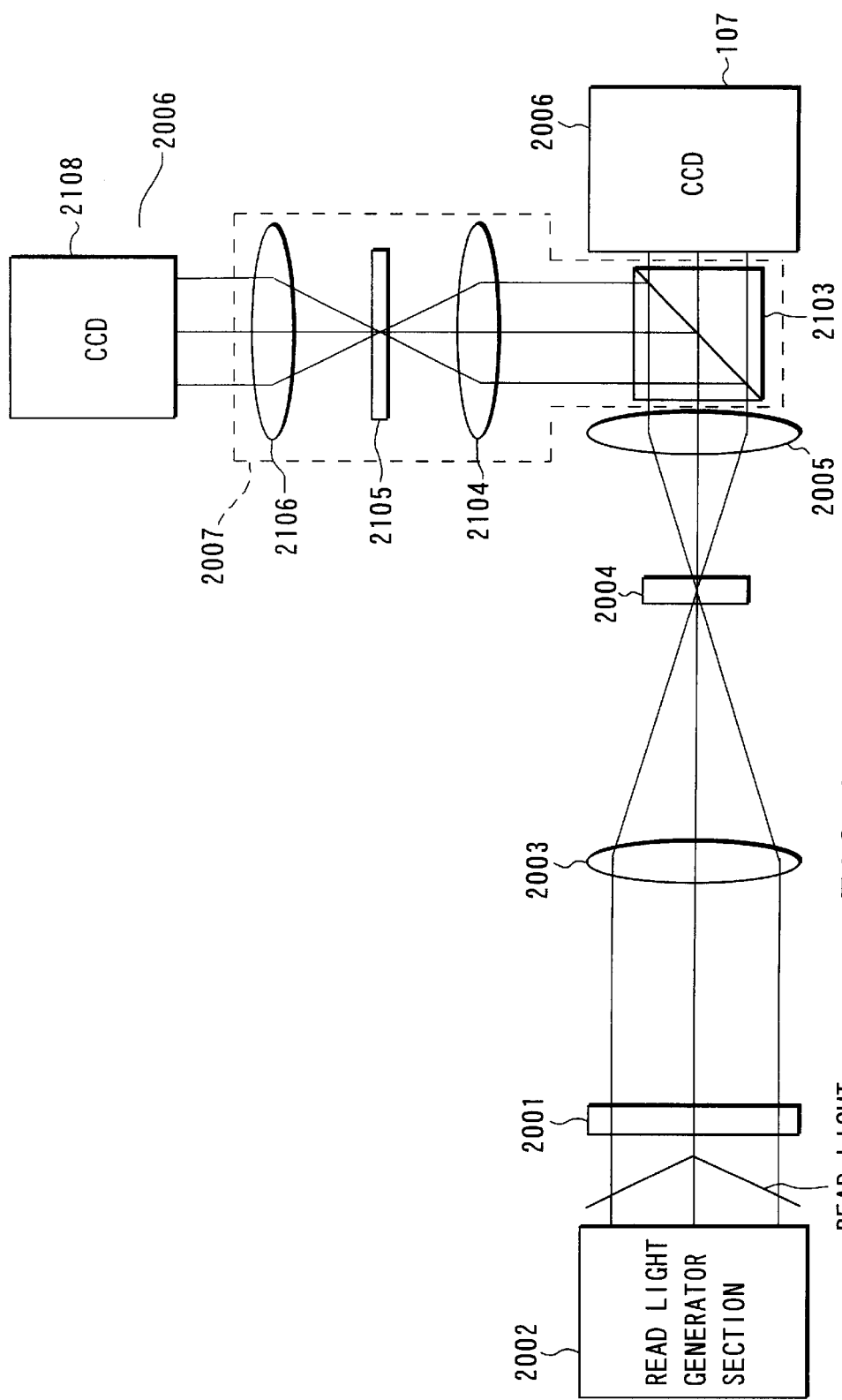
FIG. 34 shows the configuration when a fixed mask whose spatial frequency component is about zero is used as the contrast ratio correcting section in the optical image processing apparatus according to the twelfth mode of the present invention.

An image processing apparatus according to a twelfth mode of the present invention will be explained by reference to FIG. 34, using a case where a fixed mask for cutting off the region of almost no spatial frequency component is used as the contrast ratio correcting section.

The basic configuration of the twelfth mode differs from that of the conventional optical system in FIG. 25 in that another optical system is provided as the contrast ratio correcting section 2007 and the fixed mask is placed in a position conjugate with the Fourier transform surface.

The nearly parallel collimate light generated at the read light generator section 2002 reads the image displayed on the image display section 2001. The Fourier transform optical system 2003 forms its Fourier transform image on the filter surface of the filtering section 2004 located in the back focal plane of the optical system 2003.

Since the filtering section 2004 has the limited contrast ratio, it might not cut off light sufficiently, possibly permitting light to pass through as described above.

The light passed through the filtering section 2004 enters the inverse Fourier transform optical system 2005 and goes into the contrast ratio correcting section 2007.

Part of the light entering the contrast ratio correcting section 2007 passes through. Then, the result of filtering at the filtering section 2004 is picked up by the charge-coupled apparatus (CCD) camera 2107 located in such a manner that its image pickup surface aligns with the back focal plane of the inverse Fourier transform optical system 2005.

On the other hand, the light reflected by the beam splitter 2103 passes through the Fourier transform optical system 2104 and forms its Fourier transform image on the fixed mask 2105 located in the back focal plane of the optical system 2104.

The fixed mask 2105 is such a filter as cuts off the region of almost no spatial frequency component as shown in FIG. 26E.

Therefore, when the filtering section 2004 effects filtering to cut off the region of almost no spatial frequency, the fixed mask 2105 cuts off the light of spatial frequencies close to zero not cut off sufficiently by the filtering section 2004. The remaining light not cut off enters the inverse Fourier transform optical system 2106 and forms the image resulting from filtering in the focal plane of the optical system 2106.

The formed image is picked up by the CCD camera 2108.

Therefore, in the case of a high-pass filter for cutting off the region of almost no spatial frequency component, the result is picked up by the CCD camera 2108. On the other hand, in the case of a low-pass filter for permitting the region of almost no spatial frequency component to pass through, the result is picked up by the CCD camera 2107.

(Effect)

With the above configuration, filtering is done by adding another spatial optical modulator to the contrast ratio correcting section, enabling the amount of light to be decreased in two steps in the region where the amount of light is so large that a conventional filtering section cannot cut off light sufficiently, which enables almost ideal filtering.

First Embodiment

Figure 35:
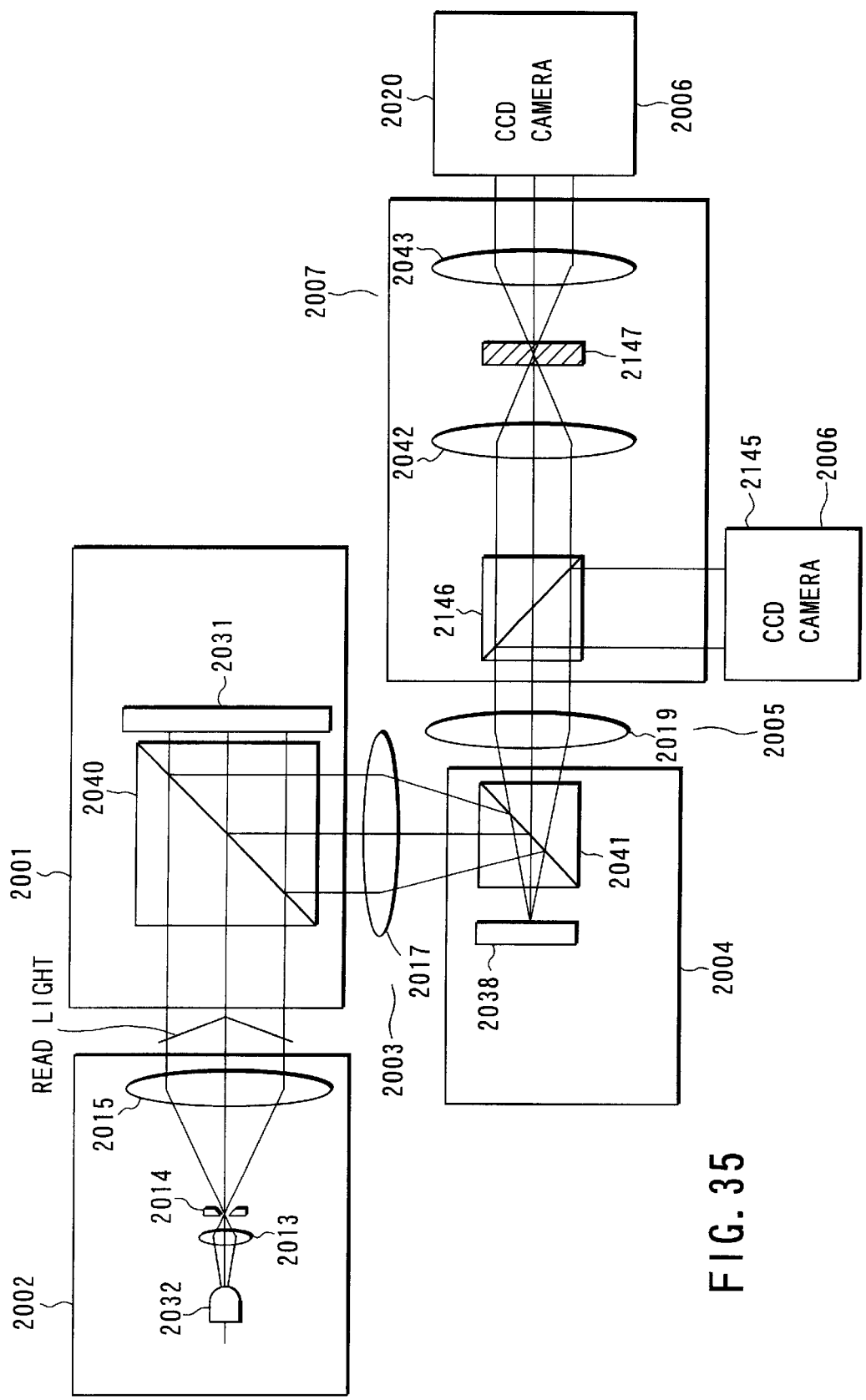
FIG. 35 shows the configuration of a first embodiment of the optical image processing apparatus according to the twelfth mode of the present invention.

A first embodiment of the twelfth mode of the present invention will be explained by reference to FIG. 35.

In the first embodiment, the read light generator section 2002 is composed of a laser diode (LD) 2032, a condenser lens 2013, a pinhole 2014, and a collimate lens 2015, the image display section 2001 is composed of a polarized beam splitter 2040 and an electrical-address-type reflection liquid crystal 2031, the Fourier transform optical system 2003 is composed of a Fourier transform lens 2017, the filtering section 2004 is composed of a polarized beam splitter 2041 and an electrical-address-type reflection liquid crystal 2038, the inverse Fourier transform optical system 2005 is composed of an inverse Fourier transform lens 2019, the contrast ratio correcting section 2007 is composed of an unpolarized beam splitter 2146 and a Fourier transform lens 2042, an inverse Fourier transform lens 2043, a fixed mask 2147 made of a high-pass filter, and the filtering image acquiring section 2006 is composed of a CCD camera 2020 and a CCD camera 2145.

In the read light generator section 2002, the light emitted from the LD 2032 is gathered by the condenser lens 2013, passes through the pinhole 2014, and enters the collimate lens 2015, which produces collimated read light.

The read light generated at the read light generator section 2002 passes through the polarized beam splitter 2040, enters the electrical-address-type reflection liquid crystal 2031, and reads the image displayed on the liquid crystal 2031.

The light that has read the image is reflected by the polarized beam splitter 2040 and enters the Fourier transform lens 2017 acting as the Fourier transform optical system 2003.

The light entering the Fourier transform lens 2017 is reflected by the polarized beam splitter 2041 and forms the Fourier transform image on the electrical-address-type reflection liquid crystal 2038 located in the back focal plane of the Fourier transform lens 2017.

The Fourier transform image is superposed on the function displayed on the liquid crystal 2038, thereby filtering the image.

The filtered light is reflected by the liquid crystal 2038, passes through the polarized beam splitter 2041, and enters the inverse Fourier transform lens 2019.

The light entering the inverse Fourier transform lens 2019 is subjected to inverse Fourier transform and enters the contrast ratio correcting section 2007.

The light entering the contrast ratio correcting section 2007 enters the unpolarized beam splitter 2146. Part of the light is reflected by the beam splitter 2146 and forms the filtered image subjected to inverse Fourier transform on the CCD camera 2145 located in such a manner that its image pickup surface aligns with the back focal plane of the inverse Fourier transform lens 2019.

On the other hand, the light passed through the unpolarized beam splitter 2146 passes through the Fourier transform lens 2042, is subjected to Fourier transform again, and forms the Fourier transform image on the fixed mask 2147 placed in the back focal plane of the lens 2042.

The fixed mask 2147 is set to form a high-pass filter as shown in FIG. 26E.

When the filtering section 2004 acts like a high-pass filter that cuts off the region of almost no spatial frequency component, the formed Fourier transform image is an image insufficiently filtered at the contrast ratio of the reflection-type liquid crystal 38.

The fixed mask 2147 cuts off the region of almost no spatial frequency component in the image in which the region with almost no spatial frequency region has not been cut off sufficiently, thereby achieving ideal high-pass filtering.

The light passed through the fixed mask 2147 passes through the inverse Fourier transform lens 2043 and forms a high-accuracy high-pass filtering image on the image pickup surface of the CCD camera 2020 placed in such a manner that the image pickup surface aligns with the back focal plane of the lens 2043.

To filter the region of almost no spatial frequency component, the image from the CCD camera 2020 is obtained. Conversely, to do filtering to permit the region of no spatial frequency component to pass through, the image picked up by the CCD camera 2045 is obtained.

Use of the two CCD cameras enables various types of high-accuracy filtering. In addition, the two images picked up by the CCD camera 2145 and CCD camera 2020 become effective through a recognition process, depending on the type of filtering at the filtering section 2004.

Second Embodiment

Figure 36:
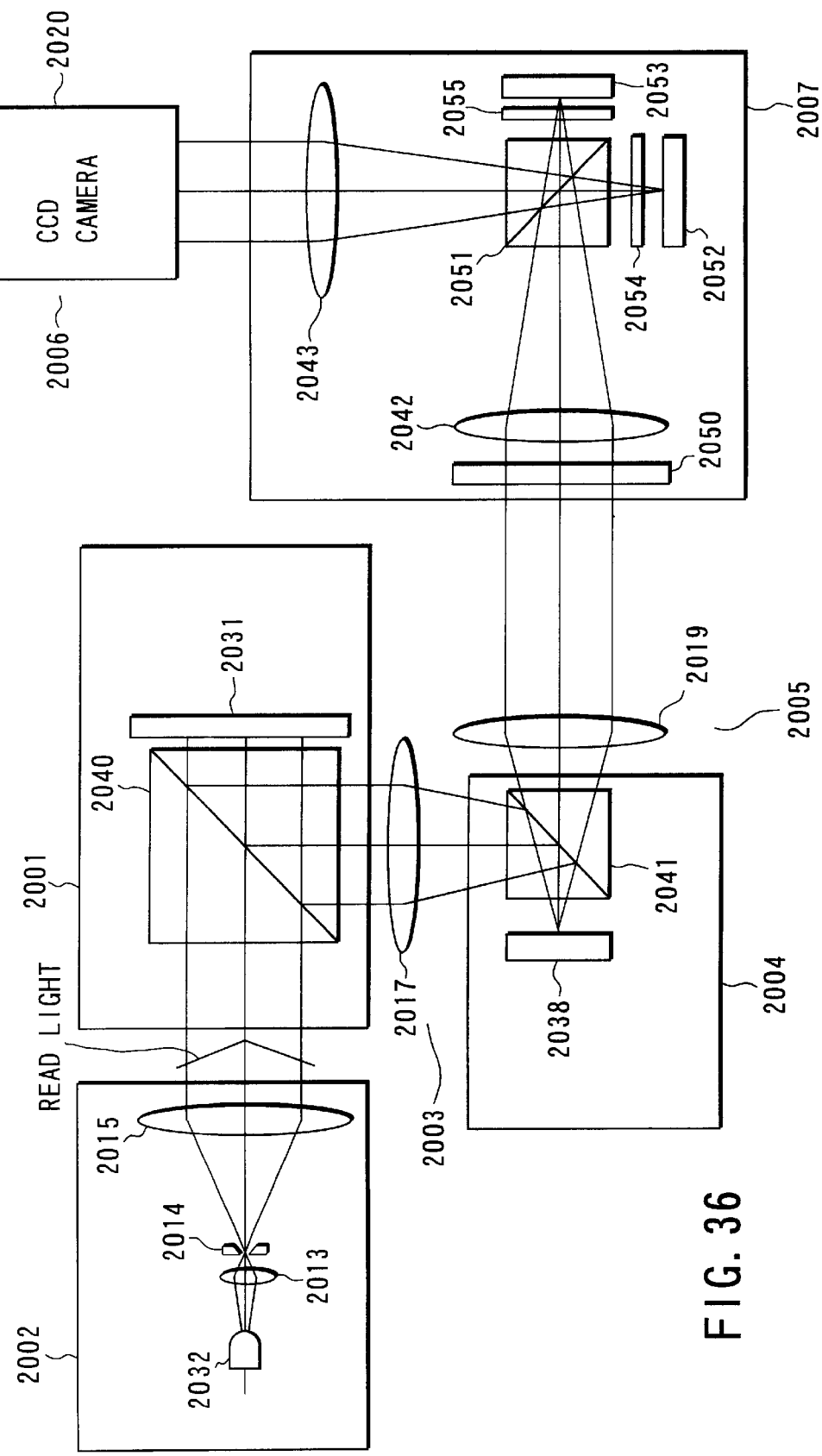
FIG. 36 shows the configuration of a second embodiment of the optical image processing apparatus according to the twelfth mode of the present invention.
Figure 37:
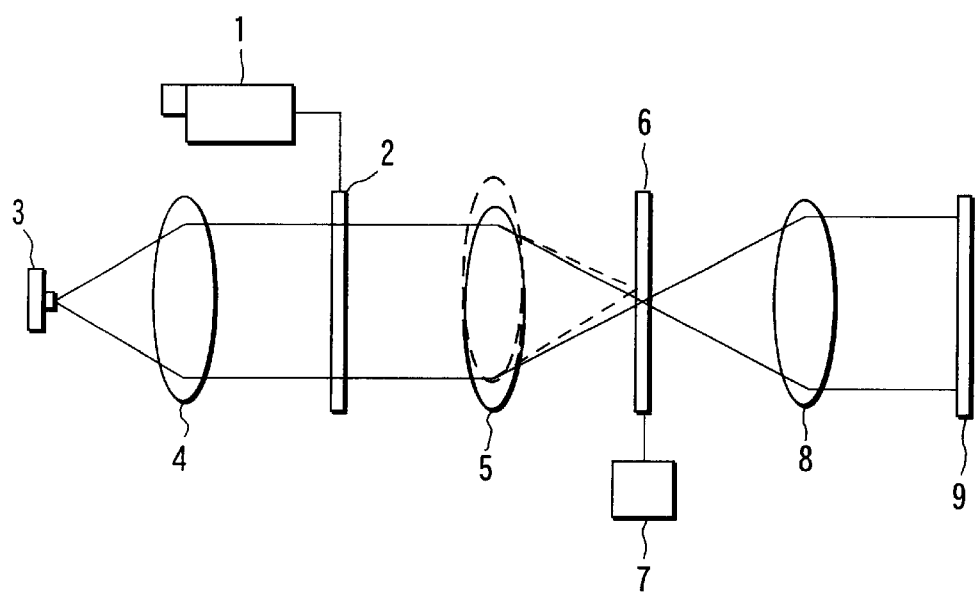
FIG. 37 shows the optical image processing apparatus disclosed in Jpn. Pat. Appln. KOKAI Publication No. 8-129149 as a conventional image processing apparatus.

A second embodiment of the twelfth mode of the present invention will be explained by reference to FIG. 36.

The second embodiment is the same configuration as that of the first embodiment of the twelfth mode of the present invention in the read light generator section 2002, image display section 2001, Fourier transform optical system 2003, filtering section 2004, and inverse Fourier transform optical system 2005. The second embodiment differs from the first embodiment in that the contrast ratio correcting section 2007 is composed of a liquid-crystal shutter 2050, a Fourier transform lens 2042, a polarized beam splitter 2051, a mirror 2052, a filter 2053, a λ/4 plate 2054, a λ/4 plate 2055, and an inverse Fourier transform lens 2043, and the filtering image acquiring section 2006 is composed of a CCD camera 2020.

In the read light generator section 2002, the light emitted from the LD 2032 is gathered by the condenser lens 2013, passes through the pinhole 2014, and enters the collimate lens 2015, which produces collimated read light.

The read light generated at the read light generator section 2002 passes through the polarized beam splitter 2040, enters the electrical-address-type reflection liquid crystal 2031, and reads the image displayed on the liquid crystal 2031.

The light that has read the image is reflected by the polarized beam splitter 2040 and enters the Fourier transform lens 2017 acting as the Fourier transform optical system 2003.

The light entering the Fourier transform lens 2017 is reflected by the polarized beam splitter 2041 and forms the Fourier transform image on the electrical-address-type reflection liquid crystal 2038 located in the back focal plane of the Fourier transform lens 2017.

The Fourier transform image is superposed on the function displayed on the liquid crystal 2038, thereby filtering the image.

The filtered light is reflected by the liquid crystal 2038, passes through the polarized beam splitter 2041, and enters the inverse Fourier transform lens 2019.

The light entering the inverse Fourier transform lens 2019 is subjected to inverse Fourier transform and enters the contrast ratio correcting section 2007.

The light entering the contrast ratio correcting section 2007 enters the liquid-crystal shutter 2050, which controls the direction of polarization of light.

The liquid-crystal shutter 2050 determines whether to permit the light to be reflected by or pass through the polarized beam splitter 2051, by changing the direction of polarization of the incident light.

If the liquid-crystal shutter 2050 is operated so as to permit the polarized beam splitter 2051 to pass through the light, the light will pass through the Fourier transform lens 2042 and further through the polarized beam splitter 2051 and the λ/4 plate 2055, and enter the filter 2053.

Since the filter 2053 is provided with a film that cuts off the region of almost no spatial frequency component as shown in FIG. 26E, the filter 2053 does not reflect the components in the region of almost no spatial frequency component in the light subjected to Fourier transform but reflects the light in the remaining region, thereby effecting high-pass filtering.

The light subjected to high-pass filtering passes through the λ/4 plate 2055 again, which modulates its direction of polarization of light at angle of 90 degrees with respect to that when it passes through the polarized beam splitter 2051.

Accordingly, when the light enters the polarized beam splitter 2051 again, the direction of polarization of light differs from what it was by 90 degrees. Thus, the light is reflected by the polarized beam splitter 2051 and enters the inverse Fourier transform lens 2043.

On the other hand, the light manipulated by the liquid-crystal shutter 2050 in such a manner that it is reflected by the polarized beam splitter 2051 passes through the Fourier transform lens 2042, is reflected by the polarized beam splitter 2051, passes through the λ/4 plate 2054, and enters the mirror 2052.

All the light is reflected by the mirror 2052 and passes through the λ/4 plate 2054 again.

Because the light passes through the λ/4 plate 2055 twice via the mirror 2052, this makes the direction of polarization of the light going from the polarized beam splitter 2051 into the λ/4 plate 2054 differ 90 degrees from the direction of polarization of the light being reflected by the mirror 2052, passing through the λ/4 plate 2054 again, and entering the polarized beam splitter 2051.

Thus, the light entering the polarized beam splitter 2051 again passes through the polarized beam splitter 2051 and enters the inverse Fourier transform lens 2043.

The light passed through the inverse Fourier transform lens 2043 forms the inverse Fourier transform image on the image pickup surface of the CCD camera 2020 whose image pickup surface is positioned in the back focal plane of the lens 2043.

When the filtering section 2004 acts like a high-pass filter that cuts off the region of almost no spatial frequency component, even if the liquid crystal 2038 of the filtering section 2007 were unable to cut off a certain region sufficiently, passing the light through the liquid-crystal shutter 2050 of the contrast ratio correcting section 2009 toward the filter 2053 could achieve ideal filtering, because the filter 2050 cuts off the region of almost no spatial frequency component.

Conversely, when the filtering section 2004 acts like a low-pass filter that permits the region of almost no spatial frequency component to pass thorough, the liquid crystal 2038 of the filtering section 2007 enables filtering with high accuracy.

In that case, when the liquid-crystal shutter 2050 causes the light to go toward the mirror 2052, this enables high-accuracy filtering.

Constructing the contrast ratio correcting section 2007 as describe above makes it possible to compose the filtering image acquiring section 2006 using a single CCD camera, as compared with the first embodiment.

While in the twelfth mode and its embodiments, filtering has been explained using a high-pass filter and a low-pass filter, the present invention is not limited to these and may be applied to all the other Fourier transform based filtering, including Wavelet, Molopholgy, and MSF (Matched Spatial Filter).

While liquid crystal has been used in a spatial optical modulator, the present invention is not restricted to this. For instance, it is apparent that use of an organic spatial optical modulator or a crystalline spatial optical modulator produces the same effect.

As described in the tenth to twelfth modes of the present invention and the related embodiments, providing the contrast ratio correcting section in the image processing apparatus enables the insufficient contrast ratio to be corrected even in a spatial optical modulator with a relatively low contrast ratio usually used in conventional filtering, which enables various types of high-accuracy filtering.

Using a filter composed of a fixed mask for cutting off the region of almost no spatial frequency component as the contrast ratio correcting section enables light to be cut off almost completely in the region where the amount of light is so large that a conventional filtering section was unable to cut off light sufficiently. Therefore, this achieves almost ideal filtering.

As described above, with the tenth to twelfth modes of the present invention, it is possible to provide an image processing apparatus capable of correcting the insufficient contrast ratio of a spatial optical modulator with a relatively low contrast ratio usually used in filtering and of effecting more accurate filtering.

The optical systems may be arranged in a cascade manner and more than one filtering may be used as the first to sixth modes above described. This arrangement enables not only a single filtering process but also more complex filtering processes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical information processing apparatus comprising:
    an image display section for displaying information on an object to be processed as image information;
    an image information reading section for converting a light from a light source into collimate light and projecting the collimate light onto the image display section to read image information;
    a Fourier transform optical system for obtaining the Fourier transform of the image information read by the image information reading section;
    an image dividing section for dividing the image information subjected to Fourier transform at the Fourier transform optical system;
    a filtering section for filtering the phase or amplitude information in one piece of the image information divided by the image dividing section;

an inverse Fourier transform optical system for obtaining the inverse Fourier transform of the image information filtered at the filtering section;

a filtering image information acquiring section for taking in the image information subjected to inverse Fourier transform at the inverse Fourier transform optical system; and a Fourier transform information acquiring section for taking in the other piece of the image information divided by the image dividing section.

2. The optical information processing apparatus according to claim 1, wherein the filtering section is an amplitude-modulation-type spatial optical modulation element which effects filtering by means of a Gabor filter.

3. The optical information processing apparatus according to claim 1, wherein the optical information processing apparatus obtains the correlation between image information on an object to be processed and a reference image, and the filtering section is a phase-modulation-type spatial optical modulation element which effects filtering through phase modulation φ expressed by the following expressions:

$$\phi = 0 \; F_r(u, v) \geq 0$$
$$\phi = \Pi \; F_r(u, v) < 0$$

where $F_r(u, v)$ is the real part of the Fourier transform of the reference image.

4. The optical information processing apparatus according to claim 1, wherein the optical information processing apparatus obtains the correlation between image information on an object to be processed and a reference image, and the filtering section is a phase/amplitude modulation-type spatial optical modulation element which effects filtering through modulation according to the complex conjugate of the Fourier transform of the reference image.

5. The optical information processing apparatus according to claim 1, wherein the optical information processing apparatus obtains the correlation between image information on an object to be processed and a reference image, and the image display section is further operable in a second display mode in which the image information on an object to be processed and the reference image are displayed with a specific distance between them, and in a third display mode in which output of the Fourier transform acquiring section in the second display mode is displayed.

6. An optical information processing apparatus comprising:

an image display section for displaying information on an object to be processed as image information;

an image information reading section for converting a light from a light source into collimate light and projecting the collimate light onto the image display section to read image information;

a first Fourier transform optical system for obtaining the Fourier transform of the image information read by the image information reading section;

an image dividing section for dividing the image information subjected to Fourier transform at the first Fourier transform optical system;

a first filtering section for filtering the phase or amplitude information in one piece of the image information divided by the image dividing section;

a first inverse Fourier transform section for obtaining the inverse Fourier transform of the image information filtered at the first filtering section;

a second Fourier transform optical system for obtaining a Fourier transform of the image information subjected to inverse Fourier transform at the first inverse Fourier transform section;

a second filtering section for filtering the phase or amplitude information in the image information subjected to Fourier transform at the second Fourier transform optical system;

a second inverse Fourier transform section for obtaining the inverse Fourier transform of the image information filtered at the second filtering section;

a filtering image information acquiring section for taking in the image information subjected to inverse Fourier transform at the second inverse Fourier transform section; and a Fourier transform information acquiring section for taking in the other piece of the image information divided by the image dividing section.

7. The optical information processing apparatus according to claim 6, wherein one of the first filtering section and second filtering section is an amplitude-modulation-type spatial optical modulation element and the other is a phase-modulation-type spatial optical modulation element.

8. The optical information processing apparatus according to claim 7, wherein both of the first filtering section and second filtering section are used to apply an SDF filter to the image information displayed on the image display section.

9. The optical information processing apparatus according to claim 7, wherein both of the first filtering section and second filtering section are used to subject the image information displayed on the image display section to Morphological filtering.

10. The optical information processing apparatus according to claim 6, wherein the optical information processing apparatus obtains the correlation between image information on an object to be processed and a reference image, and the first filtering section effects filtering through modulation according to the complex conjugate of the Fourier transform of the reference image and the second filtering section effects filtering through modulation based on the wave front aberration of the optical system.

11. An optical information processing apparatus comprising:

an image display section for displaying information on an object to be processed as image information;

an image information reading section for converting a light from a light source into collimate light and projecting the collimate light onto the image display section to read image information;

a first Fourier transform optical system for obtaining the Fourier transform of the image information read by the image information reading section;

a first filtering section for filtering the phase or amplitude information in the image information subjected to Fourier transform at the first Fourier transform optical system;

a first inverse Fourier transform section for obtaining the inverse Fourier transform of the image information filtered at the first filtering section;

a second Fourier transform optical system for obtaining the Fourier transform of the image information subjected to inverse Fourier transform at the first inverse Fourier transform section;

a second filtering section for filtering the phase or amplitude information in the image information subjected to Fourier transform at the second Fourier transform optical system;

a second inverse Fourier transform section for obtaining the inverse Fourier transform of the image information filtered at the second filtering section; and a filtering image information acquiring section for taking in the image information subjected to inverse Fourier transform at the second inverse Fourier transform section.

12. An optical information processing apparatus comprising:

an image display section for displaying information on an object to be processed as image information;

an image information reading section for converting a light from a light source into collimate light and projecting the collimate light onto the image display section to read image information;

a Fourier transform optical system for obtaining the Fourier transform of the image information read by the image information reading section;

an image dividing section for dividing the image information subjected to Fourier transform at the Fourier transform optical system;

a filtering section for filtering the phase or amplitude information in one piece of the image information divided by the image dividing section;

an inverse Fourier transform optical system for obtaining the inverse Fourier transform of the image information filtered at the filtering section;

a pupil modulation section for filtering the phase or amplitude information in the image information subjected to inverse Fourier transform at the inverse Fourier transform optical system, on the surface conjugate with the display surface of the image display section;

a second Fourier transform optical system for obtaining the Fourier transform of the image information filtered at the pupil modulation section;

a second filtering section for filtering the phase or amplitude information in the image information subjected to Fourier transform at the second Fourier transform optical system;

a second inverse Fourier transform section for obtaining the inverse Fourier transform of the image information filtered at the second filtering section;

a filtering image information acquiring section for taking in the image information subjected to inverse Fourier transform at the second inverse Fourier transform section; and a Fourier transform information acquiring section for taking in the other piece of the image information divided by the image dividing section.

13. The optical information processing apparatus according to claim 12, wherein the optical information processing apparatus applies a WDF filter to image information on the object to be processed, the image display section displays the image obtained by shifting the image information about the object to be processed by a specific amount, the pupil modulation section filters the amplitude information obtained by shifting the image information in the opposite direction by the same amount, and the second filtering section effects filtering using the transfer function of the optical system.

14. The optical information processing apparatus according to claim 13, wherein the lens for converting the light from the light source into the collimate light is also part of the Fourier transform optical system.

15. The optical information processing apparatus according to claim 12, wherein the optical information processing apparatus obtains the correlation between image information on an object to be processed and a reference image, and further comprises a correlation sensing section for sensing a part of the image whose correlation is higher than a threshold value, on the basis of the correlation information given to the filtering information acquiring section, and the filtering section effects filtering on the basis of the reference image and gives information on the correlation between the image information and the reference image to the filtering information acquiring section, and the pupil modulation section effects filtering on the basis of the result of sensing at the correlation sensing section.

16. The optical information processing apparatus according to claim 15, wherein the lens for converting the light from the light source into the collimate light is also part of the Fourier transform optical system.

17. The optical information processing apparatus according to claim 12, wherein the lens for converting the light from the light source into the collimate light is also part of the Fourier transform optical system.

18. An optical information processing apparatus comprising:

an image display section for displaying information on an object to be processed as image information;

an image information reading section for converting a light from a light source into collimate light and projecting the collimate light onto the image display section to read image information;

a Fourier transform optical system for obtaining the Fourier transform of the image information read by the image information reading section;

a filtering section for filtering the phase or amplitude information in the image information subjected to Fourier transform at the Fourier transform optical system;

an inverse Fourier transform section for obtaining the inverse Fourier transform of the image information filtered at the filtering section;

a pupil modulation section for filtering the phase or amplitude information in the image information subjected to inverse Fourier transform at the inverse Fourier transform section, on the surface conjugate with the display surface of the image display section;

a second Fourier transform optical system for obtaining the Fourier transform of the image information filtered at the pupil modulation section;

a second filtering section for filtering the phase or amplitude information in the image information subjected to Fourier transform at the second Fourier transform optical system;

a second inverse Fourier transform section for obtaining the inverse Fourier transform of the image information filtered at the second filtering section; and a filtering image information acquiring section for taking in the image information subjected to inverse Fourier transform at the second inverse Fourier transform section.

19. An optical information processing apparatus comprising:

an image display section for displaying information on an object to be processed as image information;

an image information reading section for converting a light from a light source into collimate light and projecting the collimate light onto the image display section to read image information;

a Fourier transform optical system for obtaining the Fourier transform of the image information read by the image information reading section;

a filtering section for filtering the phase or amplitude information in the image information subjected to Fourier transform at the Fourier transform optical system;

an inverse Fourier transform section for obtaining the inverse Fourier transform of the image information filtered at the filtering section;

a pupil modulation section for filtering the phase or amplitude information in the image information subjected to inverse Fourier transform at the inverse Fourier transform section, on the surface conjugate with the display surface of the image display section;

a second Fourier transform optical system for obtaining the Fourier transform of the image information filtered at the pupil modulation section;

an image dividing section for dividing the image information subjected to Fourier transform at the second Fourier transform optical system;

a second filtering section for filtering the phase or amplitude information in one piece of the image information divided by the image dividing section;

a second inverse Fourier transform section for obtaining the inverse Fourier transform of the image information filtered at the second filtering section;

a filtering image information acquiring section for taking in the image information subjected to inverse Fourier transform at the second inverse Fourier transform optical system; and a Fourier transform information acquiring section for taking in the other piece of the image information divided by the image dividing section.

20. An optical information processing apparatus comprising:

an image display section for displaying information on an object to be processed as image information;

an image information reading section for converting a light from a light source into collimate light and projecting the collimate light onto the image display section to read image information;

a Fourier transform optical system for obtaining the Fourier transform of the image information read by the image information reading section;

a filtering section for filtering the phase or amplitude information in the image information subjected to Fourier transform at the Fourier transform optical system;

an inverse Fourier transform optical system for obtaining the inverse Fourier transform of the image information filtered at the filtering section; and a filtering image information acquiring section for taking in the image information subjected to inverse Fourier transform at the inverse Fourier transform optical system, wherein the filtering section is modularized into a unit according to more than one filtering method and is designed to be capable of changing the filtering method freely by changing the unit.

21. An optical information processing apparatus comprising:

an image display section for displaying information on an object to be processed as image information;

an image information reading section for converting a light from a light source into collimate light and projecting the collimate light onto the image display section to read image information;

a Fourier transform optical system for obtaining the Fourier transform of the image information read by the image information reading section;

a filtering section for filtering the phase or amplitude information in the image information subjected to Fourier transform at the Fourier transform optical system;

an inverse Fourier transform optical system for obtaining the inverse Fourier transform of the image information filtered at the filtering section; and a filtering image information acquiring section for taking in the image information subjected to inverse Fourier transform at the inverse Fourier transform optical system, wherein the image information subjected to Fourier transform at the Fourier transform optical system is divided and the contents of subsequent processes differ, depending on one piece of the image information divided and the other piece of the image information divided.

22. An optical image processing apparatus comprising:

an image display section for displaying an image to be processed;

a read light generator section for generating light to read an image displayed on the image display section;

a Fourier transform optical system for obtaining the Fourier transform of the image read from the image display section by the light from the read light generator section;

a filtering section with a pixel structure for filtering the image subjected to Fourier transform at the Fourier transform optical system;

an inverse Fourier transform optical system for obtaining the inverse Fourier transform of the light filtered by the filtering section; and a filtering image acquiring section for acquiring the image subjected to inverse Fourier transform at the inverse Fourier transform optical system, wherein the display size $W_i$ of the image display section, the wavelength $\lambda$ of the read light, the focal length f of the Fourier transform optical system, the minimum pixel-to-pixel spacing p of the filtering section, the display size $W_p$ and the incident angle $\theta_g$ to the filtering section are so selected that the diffracted light of 0th order generated at the filtering section never overlaps with another n-th order diffracted light.

23. The optical image processing apparatus according to claim 22, wherein the filtering section has two axes crossing at right angles along which a large number of pixels are arranged in a matrix and, when $W_i > W_f$ holds along each of the axes, satisfies the following expression:

$$\arctan(W_i/2f) < \arcsin(\lambda/2p \cos \theta_g).$$

24. The optical image processing apparatus according to claim 23, wherein the filtering section has a display element for displaying a function corresponding to filtering to be done and a diffraction grating adjacent to the display element, with the pitch p of the diffraction grating satisfying $$n \times q = p$$

where n is a natural number, and the diffraction grating aligning with the pixel structure and satisfying the following expression:

$$\arctan(W_s/2f) < \arcsin(\lambda/2q \cos \theta_g).$$

25. An optical image processing apparatus comprising:
an image display section for displaying an image to be processed;
a read light generator section for generating light to read an image displayed on the image display section;
a Fourier transform optical system for obtaining the Fourier transform of the image read by the read light generator section;
a filtering section for filtering the image subjected to Fourier transform at the Fourier transform optical system;
an inverse Fourier transform optical system for obtaining the inverse Fourier transform of the image filtered by the filtering section;
a contrast ratio correcting section for correcting the contrast ratio of the filtering section; and
a filtering image acquiring section for acquiring the image filtered at the filtering section;
wherein the contrast ratio correcting section is composed of a filter whose transmittance makes a nonlinear change with the amount of incident light.

26. The optical image processing apparatus according to claim 25, wherein the contrast ratio correcting section is placed in the vicinity of the Fourier transform surface of the filtering section.

27. The optical image processing apparatus according to claim 26, wherein the contrast ratio correcting section is placed in a position conjugate with the Fourier transform surface of the filtering section.

28. The optical image processing apparatus according to claim 25, wherein the contrast ratio correcting section is placed in a position conjugate with the Fourier transform surface of the filtering section.

29. The optical image processing apparatus according to claim 25, wherein the filter used in the contrast ratio correcting section is composed of a nonlinear filter and a control light source.

30. The optical image processing apparatus according to claim 29, wherein the nonlinear filter is made of material of the silver oxide family.

31. The optical image processing apparatus according to claim 30, further comprising a switching section using a filter.

32. The optical image processing apparatus according to claim 29, wherein the nonlinear filter is made of material of the antimony family.

33. The optical image processing apparatus according to claim 32, further comprising a switching section using a filter.

34. The optical image processing apparatus according to claim 29, wherein the nonlinear filter is made of material of the photochromic family.

35. The optical image processing apparatus according to claim 34, further comprising a switching section using a filter.

36. The optical image processing apparatus according to claim 29, further comprising a switching section using a filter.

37. An optical information processing apparatus comprising:
image display means for displaying information on an object to be processed as image information;
image information reading means for converting a light from a light source into collimate light and projecting the collimate light onto the image display means to read image information;
a Fourier transform optical system for obtaining the Fourier transform of the image information read by the image information reading means;
image dividing means for dividing the image information subjected to Fourier transform at the Fourier transform optical system;
filtering means for filtering the phase or amplitude information in one piece of the image information divided by the image dividing means;
an inverse Fourier transform optical system for obtaining the inverse Fourier transform of the image information filtered at the filtering means;
filtering image information acquiring means for taking in the image information subjected to inverse Fourier transform at the inverse Fourier transform optical system; and
Fourier transform information acquiring means for taking in the other piece of the image information divided by the image dividing means.

38. An optical information processing apparatus comprising:
image display means for displaying information on an object to be processed as image information;
image information reading means for converting a light from a light source into collimate light and projecting the collimate light onto the image display means to read image information;
a first Fourier transform optical system for obtaining the Fourier transform of the image information read by the image information reading means;
image dividing means for dividing the image information subjected to Fourier transform at the first Fourier transform optical system;
first filtering means for filtering the phase or amplitude information in one piece of the image information divided by the image dividing means;
first inverse Fourier transform means for obtaining the inverse Fourier transform of the image information filtered at the first filtering means;
a second Fourier transform optical system for obtaining the Fourier transform of the image information subjected to inverse Fourier transform at the first inverse Fourier transform means;
second filtering means for filtering the phase or amplitude information in the image information subjected to Fourier transform at the second Fourier transform optical system;
second inverse Fourier transform means for obtaining the inverse Fourier transform of the image information filtered at the second filtering means;
filtering image information acquiring means for taking in the image information subjected to inverse Fourier transform at the second inverse Fourier transform means; and Fourier transform information acquiring means for taking in the other piece of the image information divided by the image dividing means.

39. An optical information processing apparatus comprising:

image display means for displaying information on an object to be processed as image information;

image information reading means for converting a light from a light source into collimate light and projecting the collimate light onto the image display means to read image information;

a first Fourier transform optical system for obtaining the Fourier transform of the image information read by the image information reading means;

first filtering means for filtering the phase or amplitude information in the image information subjected to Fourier transform at the first Fourier transform optical system;

first inverse Fourier transform means for obtaining the inverse Fourier transform of the image information filtered at the first filtering means;

a second Fourier transform optical system for obtaining the Fourier transform of the image information subjected to inverse Fourier transform at the first inverse Fourier transform means;

second filtering means for filtering the phase or amplitude information in the image information subjected to Fourier transform at the second Fourier transform optical system;

second inverse Fourier transform means for obtaining the inverse Fourier transform of the image information filtered at the second filtering means; and filtering image information acquiring means for taking in the image information subjected to inverse Fourier transform at the second inverse Fourier transform means.

40. An optical information processing apparatus comprising:

image display means for displaying information on an object to be processed as image information;

image information reading means for converting a light from a light source into collimate light and projecting the collimate light onto the image display means to read image information;

a Fourier transform optical system for obtaining the Fourier transform of the image information read by the image information reading means;

image dividing means for dividing the image information subjected to Fourier transform at the Fourier transform optical system;

filtering means for filtering the phase or amplitude information in one piece of the image information divided by the image dividing means;

an inverse Fourier transform optical system for obtaining the inverse Fourier transform of the image information filtered at the filtering means;

pupil modulation means for filtering the phase or amplitude information in the image information subjected to inverse Fourier transform at the inverse Fourier transform optical system, on the surface conjugate with the display surface of the image display means;

a second Fourier transform optical system for obtaining the Fourier transform of the image information filtered at the pupil modulation means;

second filtering means for filtering the phase or amplitude information in the image information subjected to Fourier transform at the second Fourier transform optical system;

second inverse Fourier transform means for obtaining the inverse Fourier transform of the image information filtered at the second filtering means;

filtering image information acquiring means for taking in the image information subjected to inverse Fourier transform at the second inverse Fourier transform means; and Fourier transform information acquiring means for taking in the other piece of the image information divided by the image dividing means.

41. An optical information processing apparatus comprising:

image display means for displaying information on an object to be processed as image information;

image information reading means for converting a light from a light source into collimate light and projecting the collimate light onto the image display means to read image information;

a Fourier transform optical system for obtaining the Fourier transform of the image information read by the image information reading means;

filtering means for filtering the phase or amplitude information in the image information subjected to Fourier transform at the Fourier transform optical system;

inverse Fourier transform means for obtaining the inverse Fourier transform of the image information filtered at the filtering means;

pupil modulation means for filtering the phase or amplitude information in the image information subjected to inverse Fourier transform at the inverse Fourier transform means, on the surface conjugate with the display surface of the image display means;

a second Fourier transform optical system for obtaining the Fourier transform of the image information filtered at the pupil modulation means;

second filtering means for filtering the phase or amplitude information in the image information subjected to Fourier transform at the second Fourier transform optical system;

second inverse means for obtaining the inverse Fourier transform of the image information filtered at the second filtering means; and filtering image information acquiring means for taking in the image information subjected to inverse Fourier transform at the second inverse Fourier transform means.

42. An optical information processing apparatus comprising:

image display means for displaying information on an object to be processed as image information;

image information reading means for converting a light from a light source into collimate light and projecting the collimate light onto the image display means to read image information;

a Fourier transform optical system for obtaining the Fourier transform of the image information read by the image information reading means;

filtering means for filtering the phase or amplitude information in the image information subjected to Fourier transform at the Fourier transform optical system;

inverse Fourier transform means for obtaining the inverse Fourier transform of the image information filtered at the filtering means;

pupil modulation means for filtering the phase or amplitude information in the image information subjected to inverse Fourier transform at the inverse Fourier transform means, on the surface conjugate with the display surface of the image display means;

a second Fourier transform optical system for obtaining the Fourier transform of the image information filtered at the pupil modulation means;

image dividing means for dividing the image information subjected to Fourier transform at the second Fourier transform optical system;

second filtering means for filtering the phase or amplitude information in one piece of the image information divided by the image dividing means;

second inverse Fourier transform means for obtaining the inverse Fourier transform of the image information filtered at the second filtering means;

filtering image information acquiring means for taking in the image information subjected to inverse Fourier transform at the second inverse Fourier transform means; and a Fourier transform information acquiring section for taking in the other piece of the image information divided by the image dividing means.

43. An optical information processing apparatus comprising:

image display means for displaying information on an object to be processed as image information;

image information reading means for converting a light from a light source into collimate light and projecting the collimate light onto the image display means to read image information;

a Fourier transform optical system for obtaining the Fourier transform of the image information read by the image information reading means;

filtering means for filtering the phase or amplitude information in the image information subjected to Fourier transform at the Fourier transform optical system;

an inverse Fourier transform optical system for obtaining the inverse Fourier transform of the image information filtered at the filtering means; and filtering image information acquiring means for taking in the image information subjected to inverse Fourier transform at the inverse Fourier transform optical system, wherein the filtering means is modularized into a unit according to more than one filtering method and is designed to be capable of changing the filtering method freely by changing the unit.

44. An optical information processing apparatus comprising:

image display means for displaying information on an object to be processed as image information;

image information reading means for converting a light from a light source into collimate light and projecting the collimate light onto the image display means to read image information;

a Fourier transform optical system for obtaining the Fourier transform of the image information read by the image information reading means;

filtering means for filtering the phase or amplitude information in the image information subjected to Fourier transform at the Fourier transform optical system;

an inverse Fourier transform optical system for obtaining the inverse Fourier transform of the image information filtered at the filtering means; and filtering image information acquiring means for taking in the image information subjected to inverse Fourier transform at the inverse Fourier transform optical system, wherein the image information subjected to Fourier transform at the Fourier transform optical system is divided and the contents of subsequent processes differ, depending on one piece of the image information divided and the other piece of the image information divided.

45. An optical image processing apparatus comprising:

image display means for displaying an image to be processed;

read light generator means for generating light to read an image displayed on the image display means;

a Fourier transform optical system for obtaining the Fourier transform of the image read from the image display means by the light from the read light generator means;

filtering means with a pixel structure for filtering the image subjected to Fourier transform at the Fourier transform optical system;

an inverse Fourier transform optical system for obtaining the inverse Fourier transform of the light filtered by the filtering means; and filtering image acquiring means for acquiring the image subjected to inverse Fourier transform at the inverse Fourier transform optical system, wherein the display size $W_i$ of the image display means, the wavelength $\lambda$ of the read light, the focal length f of the Fourier transform optical system, the minimum pixel-to-pixel spacing p of the filtering means, the display size $W_p$, and the incident angle $\theta_g$ to the filtering means are so selected that the diffracted light of 0th order generated at the filtering means never overlaps with another n-th order diffracted light.

* * * * *